US012710366B2

(12) United States Patent
Rurack et al.

(10) Patent No.: US 12,710,366 B2
(45) Date of Patent: Aug. 18, 2026

(54) DYES UNDERGOING CHANGES IN COLOR AND FLUORESCENCE UPON BINDING OF ORGANIC OXO COMPOUNDS

(71) Applicant: Bundesrepublik Deutschland, vertreten durch den Bundesminister für Wirtschaft und Energie, dieser vertreten durch den präsidenten der bundesanstalt für materialforschung un-prüfung, (BAM), Berlin (DE)

(72) Inventors: Knut Rurack, Berlin (DE); Kornelia Gawlitza, Berlin (DE); Virginia Valderrey Berciano, Berlin (DE); Victor Pérez Padilla, Berlin (DE)

(73) Assignee: Bundesrepublik Deutschland, vertreten durch den Bundesminister für Wirtschaft und Energie, dieser vertreten durch den Präsidenten der Bundesanstalt für Materialforschung und -prüfung, (BAM), Berlin (DE)

( * ) Notice: Subject to any disclaimer, the term of this patent is extended or adjusted under 35 U.S.C. 154(b) by 563 days.

(21) Appl. No.: 18/265,833

(22) PCT Filed: Nov. 25, 2021

(86) PCT No.: PCT/EP2021/083021

§ 371 (c)(1),
(2) Date: Jun. 7, 2023

(87) PCT Pub. No.: WO2022/122402

PCT Pub. Date: Jun. 16, 2022

(65) Prior Publication Data

US 2024/0142377 A1 May 2, 2024

(30) Foreign Application Priority Data

Dec. 7, 2020 (DE) ......................... 102020132487.1

(51) Int. Cl.

| | |
|---|---|
| ***G01N 21/64*** | (2006.01) |
| ***C09B 62/523*** | (2006.01) |
| ***C09K 11/06*** | (2006.01) |

(52) U.S. Cl.

CPC ....... *G01N 21/6428* (2013.01); *C09B 62/523* (2013.01); *C09K 11/06* (2013.01); *C09K 2211/1425* (2013.01); *C09K 2211/1433* (2013.01); *C09K 2211/1475* (2013.01); *G01N 2021/6439* (2013.01)

(58) Field of Classification Search

CPC ............... G01N 21/64; G01N 21/6428; G01N 2021/6439; C09B 62/523; C09B 57/00; C09K 11/06; C09K 2211/1425; C09K 2211/1433; C09K 2211/1475; B01J 20/268; C07D 271/12

USPC ..... 436/63, 96, 98, 106, 127, 164, 166, 169, 436/172; 422/420, 82.05, 82.08

See application file for complete search history.

(56) References Cited

U.S. PATENT DOCUMENTS

2011/0319639 A1 * 12/2011 Wessig ................ C07D 317/64 549/338

FOREIGN PATENT DOCUMENTS

WO 2020/187919 A1 * 9/2020

OTHER PUBLICATIONS

Shinde et al. Journal of the American Chemical Society, vol. 137, Sep. 28, 2015, pp. 13908-13912.* de Moliner et al. Frontiers of Chemical Science and Engineering, vol. 16 (1), Sep. 4, 2021, pp. 128-135.*

Valderrey et al. Chemistry—A European Journal, vol. 28, e202104525, Feb. 27, 2022, pp. 1-9.*

* cited by examiner

*Primary Examiner* — Maureen Wallenhorst

(74) *Attorney, Agent, or Firm* — Bachman & LaPointe, P.C.

(57) ABSTRACT

A dye for fluorescence detection of an organic oxo compound, oxo acid or their anion, having a donor-acceptor-donor motif according to formulae (1)

(1)

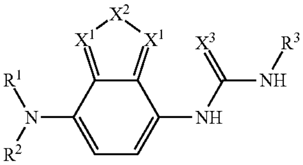

with terms as defined herein for use as molecular probe, in an analyte sensitive layer or molecularly imprinted polymer.

14 Claims, 34 Drawing Sheets

DYES UNDERGOING CHANGES IN COLOR AND FLUORESCENCE UPON BINDING OF ORGANIC OXO COMPOUNDS

FIELD

The present invention refers to electron donor-acceptor-donor (D-A-D) dyes and their use as indicators for an analyte selected from an organic oxo compound in particular an organic oxoacid and the corresponding anion thereof.

BACKGROUND

Oxoacid and oxoanion sensing are of the utmost importance since roughly 25% of all commercialized pharmaceuticals and about 40% of all marketed crop protection agents bear a carboxylic acid function. Well-known carboxylic acid containing drugs are statins, β-lactam antibiotics and non-steroidal anti-inflammatory drugs (NSAIDs) while glyphosate and auxin mimics as well as perfluoroalkyl acids (PFAAs) are widespread families of carboxylic, sulfonic and phosphonic acids comprising herbicides and pollutants, respectively, which need to be monitored.

The fluorescent sensor molecules for anions described up to now mainly focus on controlling electron and charge transfer (PET, CT) (e.g., Gunnlaugsson et al., Org. Biomol. Chem. 2004, 2, 1856-1863 or Thiagarajan et al., Org. Lett. 2005, 7, 657-660) or excimer/exciplex (e.g., Nishizawa et al., J. Chem. Soc. Perk. Trans. 2 1998, 2325-2327) processes. However, most of these sensor molecules limit their response to changes in fluorescence emission intensity, quenching or enhancement, but do not show spectral shifts of the absorption and/or emission bands upon anion binding. This severely limits their applicability in areas in which reference measurements correcting for instrument fluctuations (detector drift, light source fluctuations) cannot be easily realized (handheld devices) or in which focused detection for lateral resolution is important (fluorescence microscopy).

Some examples of fluorescent probes which have been reported to date for the fluorescence sensing of oxoacids and oxoanions are listed below:

Examples for oxoanion sensing in polar solvents which provide intensity changes based on fluorescence intensity modulations as a result of the formation of a complex between a single guest and a single receptor site on a host or fluorescence intensity modulations as a result of the cooperative binding of multiple binding units in the fluorophore structure giving the possibility to form complexes with multiple stoichiometries are given by, e.g., Kang et al., Tetrahedron Lett 2005, 46, 6079-6082.

Examples for oxoanion sensing in polar solvents which provide spectral band changes in absorption and/or emission upon anion binding in combination with fluorescence intensity modulations either with a single receptor—fluorophore architecture are, e.g., Wu et al., J. Org. Chem. 2007, 72, 62-70; with a multiple receptor—single fluorophore, e.g., Lee et al., Angew. Chem. Int. Ed. 2004, 43, 4777-4780; with a multiple receptor—multiple fluorophore architecture, e.g., Zyryanov et al., Angew. Chem. Int. Ed. 2007, 46, 7849-7852; or with an architecture in which receptor and fluorophore are identical, e.g., Sessler et al., Org. Biomol. Chem. 2003, 1, 4113-4123.

Examples of oxoacid sensing in polar solvents which provide spectral band changes upon oxoacid binding based on an emission quenching are, e.g., Munusamy et al., Sens. Actuators B Chem. 2017, 244, 175-181; and based on an emission enhancement in non-polar solvents are, e.g., Goswami et al., Org. Lett. 2009, 11, 4350-4353. However, band shifts are not reported in any of the examples.

SUMMARY OF THE INVENTION

Against this background, the object of the invention is to provide a fluorescent dye which is basic or which is adapted for hydrogen-bonding and can act as a robust sensor molecule for analytes comprising an oxo compound, in particular an oxoanion and/or an oxoacid. Its use as molecular sensor, molecular probe or indicator is compatible with polar, aqueous mixtures and thus applicable in aqueous media.

It is an aim of the invention to provide dyes designed to serve as sensor molecules for electron-rich analyte molecules (oxoacids and oxoanions) especially in polar solvents, aqueous mixtures and/or aqueous environments by providing prominent changes of fluorescence emission upon analyte binding. According to typical embodiments an electron-accepting benzodiazole (fluorophore as electron acceptor) is electronically coupled to two electron-donating functional groups (electron donor), wherein at least one of the groups is either a urea, a thiourea, a guanidine or a guanidinium, which are able to bind an electron-rich molecule such as the indicated analyte molecules. Favorably, at least another moiety can be included into the suggested fluorescent dye comprising the D-A-D motif, wherein said moiety enables covalent coupling of the dye to a solid substrate or its incorporation into a polymer, preferably into a molecularly imprinted polymer.

According to an embodiment a fluorescent push-pull-push dye, i.e. a dye comprising an electron donor—electron acceptor—electron donor motif, designated herein as donor-acceptor-donor motif or—for brevity as D-A-D motif, wherein the donor-acceptor-donor motif comprises a structure according to any of formulae: (1), (2), (3), (4), (5), (6), (7), (8) shown below:

(1)

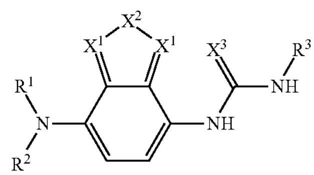

(2)

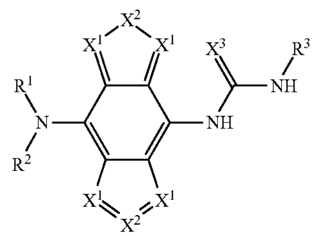

-continued (3)

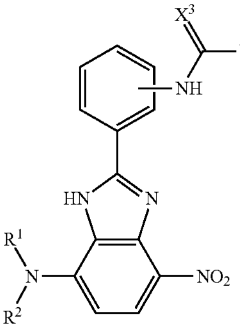

(4)

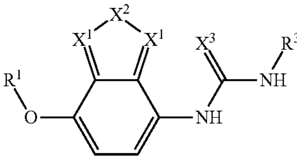

(5)

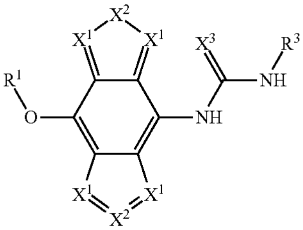

(6)

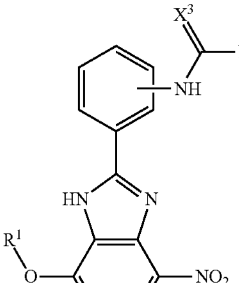

(7)

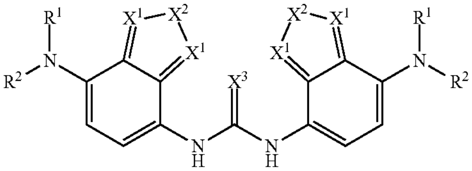

(8)

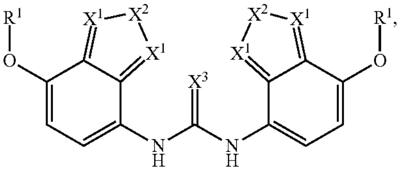

wherein, $R^1$=H, $C_nF_{2n+1}$, $C_5NH_4$, $C_4N_2H_3$, $(CH_2)_nQ$, $(C_6H_{5-m})Q_m$ or $(OCH_2CH_2)_nQ$, wherein m=1, 2, 3 or 4, and Q is selected from:

H, $C(H)=CH_2$, $OC(O)C(H){=}CH_2$, $OC(O)C(CH_3){=}CH_2$, $N(H)CC(H){=}CH_2$, $N(H)CC(CH_3){=}CH_2$, $Si(OH)_3$, $Si(OCH_3)_3$, $Si(OC_2H_5)_3$,

OH, SH, $NH_2$, $NO_2$, CN, $CF_3$, C≡CH, $N{=}N^+{=}N^-$, F, Cl, Br, I, $C_2H_3O$, $C_6H_5$,

C(O)F, C(O)Cl, C(O)Br, C(O)I, $CF_3SO_3$, $B(OZ)_2$, OZ, C(O)Z, C(O)OZ, C(O)NHZ, $C(O)NZ_2$, and SSZ, wherein Z=H, $C_nH_{2n+1}$, $C_nF_{2n+1}$, $C_nH_{2n}C(H){=}CH_2$, $C_nH_{2n}C{\equiv}CH$, $C_6H_4C(H){=}CH_2$, $C_6H_5$, $CH_2C_6H_5$, $C_5NH_4$ or $C_4N_2H_3$, wherein n=1 to 20;

$R^2$=H, $C_nF_{2n+1}$, $C_5NH_4$, $C_4N_2H_3$, $(CH_2)_nQ$ or $(C_6H_{5-m})Q_m$, wherein m=1, 2, 3 or 4, and Q is selected from:

H, $C(H){=}CH_2$, $OC(O)C(H){=}CH_2$, $OC(O)C(CH_3){=}CH_2$, $N(H)CC(H){=}CH_2$, $N(H)CC(CH_3){=}CH_2$, $Si(OH)_3$, $Si(OCH_3)_3$, $Si(OC_2H_5)_3$,

OH, SH, $NH_2$, $NO_2$, CN, $CF_3$, C≡CH, $N{=}N^+{=}N^-$, F, Cl, Br, I, $C_2H_3O$, $C_6H_5$,

C(O)F, C(O)Cl, C(O)Br, C(O)I, $CF_3SO_3$, $B(OZ)_2$, OZ, C(O)Z, C(O)OZ, C(O)NHZ, $C(O)NZ_2$, and SSZ, wherein Z=H, $C_nH_{2n+1}$, $C_nF_{2n+1}$, $C_nH_{2n}C(H){=}CH_2$, $C_nH_{2n}C{\equiv}CH$, $C_6H_4C(H){=}CH_2$, $C_6H_5$, $CH_2C_6H_5$, $C_5NH_4$ or $C_4N_2H_3$, wherein n=1 to 20;

$R^3$=H, $C_nF_{2n+1}$, $C_5NH_4$, $C_4N_2H_3$, $C(O)C_6H_5$, $C(S)C_6H_5$, $(CH_2)_nQ$ or $(C_6H_{5-m})Q_m$, wherein m=1, 2, 3 or 4, and Q is selected from:

H, $C(H){=}CH_2$, $OC(O)C(H){=}CH_2$, $OC(O)C(CH_3){=}CH_2$, $N(H)CC(H){=}CH_2$, $N(H)CC(CH_3){=}CH_2$, $Si(OH)_3$, $Si(OCH_3)_3$, $Si(OC_2H_5)_3$,

OH, SH, $NH_2$, $NO_2$, CN, $CF_3$, C≡CH, $N{=}N^+{=}N^-$, F, Cl, Br, I, $C_2H_3O$, $C_6H_5$,

C(O)F, C(O)Cl, C(O)Br, C(O)I, $CF_3SO_3$, $B(OZ)_2$, OZ, C(O)Z, C(O)OZ, C(O)NHZ, $C(O)NZ_2$, and SSZ, wherein Z=H, $C_nH_{2n+1}$, $C_nF_{2n+1}$, $C_nH_{2n}C(H){=}CH_2$, $C_nH_{2n}C{\equiv}CH$, $C_6H_4C(H){=}CH_2$, $C_6H_5$, $CH_2C_6H_5$, $C_5NH_4$ or $C_4N_2H_3$, wherein n=1 to 20;

$X^1$=N, C(CN), C(COOEt) or $C(NO_2)$;

$X^2$=$C(CH_3)_2$, $Si(CH_3)_2$, O, S, Se or Te;

$X^3$=O, S, NH or $NH_2^+X^-$, wherein $X^-$ is selected from: $F^-$, $Cl^-$, $Br^-$, $I^-$, $NO_3^-$, $PF_6^-$, $ClO_4^-$, $BF_4^-$, $B[3,5\text{-}(CF_3)_2C_6H_3]_4^-$, $B(C_6H_5)_4^-$, $Al[OC(CF_3)_3]_4^-$, $H_2BO_3^-$, $BrO_3^-$, $HCO_3^-$, $H_2NCO_2^-$, $C_6H_5CO_2^-$, $C_6H_5CH_2^-$, and $RCOO^-$, wherein R=saturated alkyl or unsaturated alkyl or aryl.

Accordingly, if the anion $X^-$ of $NH_2^+X^-$ above would be chosen as indicated, the resulting dye would comprise a corresponding structure like $[\sim NH_2^+/F^-]$, $[\sim NH_2^+/Cl^-]$, $[\sim NH_2^+/Br^-]$, $[\sim NH_2^+/I^-]$, $[\sim NH_2^+/NO_3^-]$, $[\sim NH_2^+/PF_6^-]$, $[\sim NH_2^+/ClO_4^-]$, $[\sim NH_2^+/BF_4^-]$, $[\sim NH_2^+/B_4^-]$, $[\sim NH_2^+/B[3,5\text{-}(CF_3)_2C_6H_3]_4^-]$, $[\sim NH_2^+/B(C_6H_5)_4^-]$, $[\sim NH_2^+/Al[OC(CF_3)_3]_4^-]$, $[\sim NH_2^+/H_2BO_3^-]$, $[\sim NH_2^+/BrO_3^-]$, $[\sim NH_2^+/HCO_3^-]$, $[\sim NH_2^+/H_2NCO_2^-]$, $[\sim NH_2^+/C_6H_5CO_2^-]$, $[\sim NH_2^+/C_6H_5CH_2^-]$, and $[\sim NH_2^+/CH_3COO^-]$ (in the event that in $X^3$=$NH_2^+X^-$ the anion $X^-$=$RCOO^-$ and R is a saturated alkyl, particularly a methyl group), respectively. Therein the sign "~" stands for the remaining part of the molecule.

According to an embodiment a molecular probe for detection of an analyte comprising an organic oxo compound, an organic oxo acid and/or an anion thereof is suggested, wherein the molecular probe comprises the above dye comprising the donor-acceptor-donor motive, wherein the molecular probe is adapted to indicate the presence of the analyte by changing a fluorescence property selected from: a fluorescence band position, a fluorescence band shape, a fluorescence intensity, a fluorescence lifetime, and/or a fluorescence yield.

According to an embodiment an analyte-sensitive layer for detection of an analyte, comprising an organic oxo compound, an organic oxo acid and/or an anion thereof is suggested, wherein the analyte-sensitive layer comprises the above dye comprising the donor-acceptor-donor motif corresponding to the molecular probe above, wherein the dye corresponding to the molecular probe is adsorbed at, covalently bound to and/or sterically entrapped within a matrix, wherein the matrix comprises: a glass, a semiconductor, a ceramic, or a polymer. Particularly, the matrix may comprise a porous glass, a glass wool or glass fibers, a ceramic, a synthetic organic polymer, a cellulose, a nitrocellulose, a paper or mesh comprising one of the listed materials, a woven textile comprising one of the listed materials, a non-woven textile comprising one of the listed materials, or a hydrogel.

According to an embodiment a molecularly imprinted polymer for detection of an analyte comprising an organic oxo compound, an organic oxo acid and/or an anion thereof is suggested, wherein the molecularly imprinted polymer comprises the above dye encompassing the donor-acceptor-donor motif or the above molecular probe encompassing the donor-acceptor-donor motif described above.

According to an embodiment a sensor arrangement for detection of an analyte in a liquid sample, the liquid sample comprising a sought for organic oxo compound, an organic oxo acid and/or an anion thereof (i.e. analyte) is suggested, wherein the sensor arrangement comprises the analyte-sensitive layer comprising the dye encompassing the electron donor -electron acceptor -electron donor motif as described above.

According to an embodiment a use of the above dye comprising a donor-acceptor-donor motif is suggested for:

a microscopic imaging of a sample selected from a cell (of plant, microbiological, animal, or human origin), a tissue (of plant, animal or human origin), a body fluid of an animal or a human, wherein the sample presumably contains an analyte selected from an organic oxo compound, an organic oxo acid and/or an anion thereof, and wherein the dye has been in contact with the sample before or is brought in contact with the sample during the microscopic imaging;

a flow-through analysis of a particle suspension, wherein the particles of the suspension comprise the above donor-acceptor-donor dye and had been in contact with a sample which presumably contains an analyte selected from an organic oxo compound, an organic oxo acid and/or an anion thereof, and/or a flow-through analysis of a liquid sample, wherein a wall of a channel or of a tube of the flow-through device is coated with a matrix that comprises the above donor-acceptor-donor dye so that it comes in contact with the sample which presumably contains an analyte selected from an organic oxo compound, an organic oxo acid and/or an anion thereof, and/or a dip-stick analysis of a liquid sample, wherein the stick (or any other solid supporting substrate) is coated on one side or on both sides, either in total or in a selected area, with a matrix that comprises the dye. In other words, the stick or a test strip comprises the analyte-sensitive layer suggested above. Advantageously, upon fluidic contact with a sample containing an analyte selected from an organic oxo compound, an organic oxo acid and/or an anion thereof, a fluorescence property of the dye changes and/or a color of the matrix (of the analyte-sensitive layer) changes in a way that is observable by a naked eye. A further suggested use comprises:

a quantitative and/or qualitative detection of an analyte selected from an organic oxo compound, an organic oxo acid and/or an anion thereof in an liquid sample or in an organic extract thereof, wherein the sample presumably contains an analyte selected from an organic oxo compound, an organic oxo acid and/or an anion thereof, wherein the detection is based on an optical measurement of a fluorescence property of the dye.

Resulting advantages correspond to the ones already mentioned above.

BRIEF DESCRIPTION OF THE DRAWINGS

A full and enabling disclosure of the present invention, including the best mode thereof, to one of ordinary skill in the art, is set forth more particularly in the remainder of the description, including reference to the accompanying figures.

Figure 1:
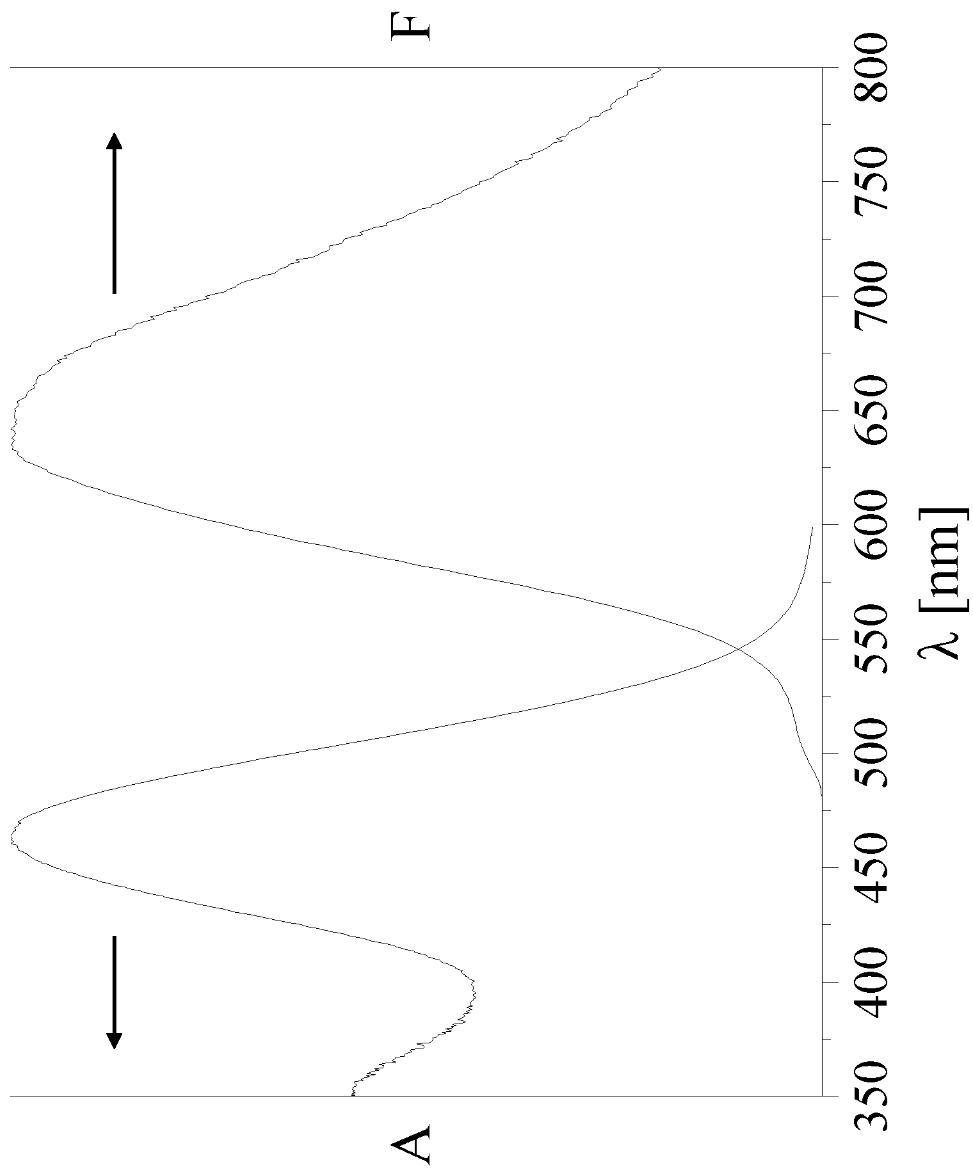
FIG. 1 shows the normalized UV/vis absorption and emission spectra of thiourea-based compound 19 (c[19]=$2.2\times10^{-5}$ M) in chloroform ($CHCl_3$). Absorption and emission are separated by a Stokes shift of >170 nm. Therein the expression "c[19]" stands for the concentration of the compound 19.
Figure 2:
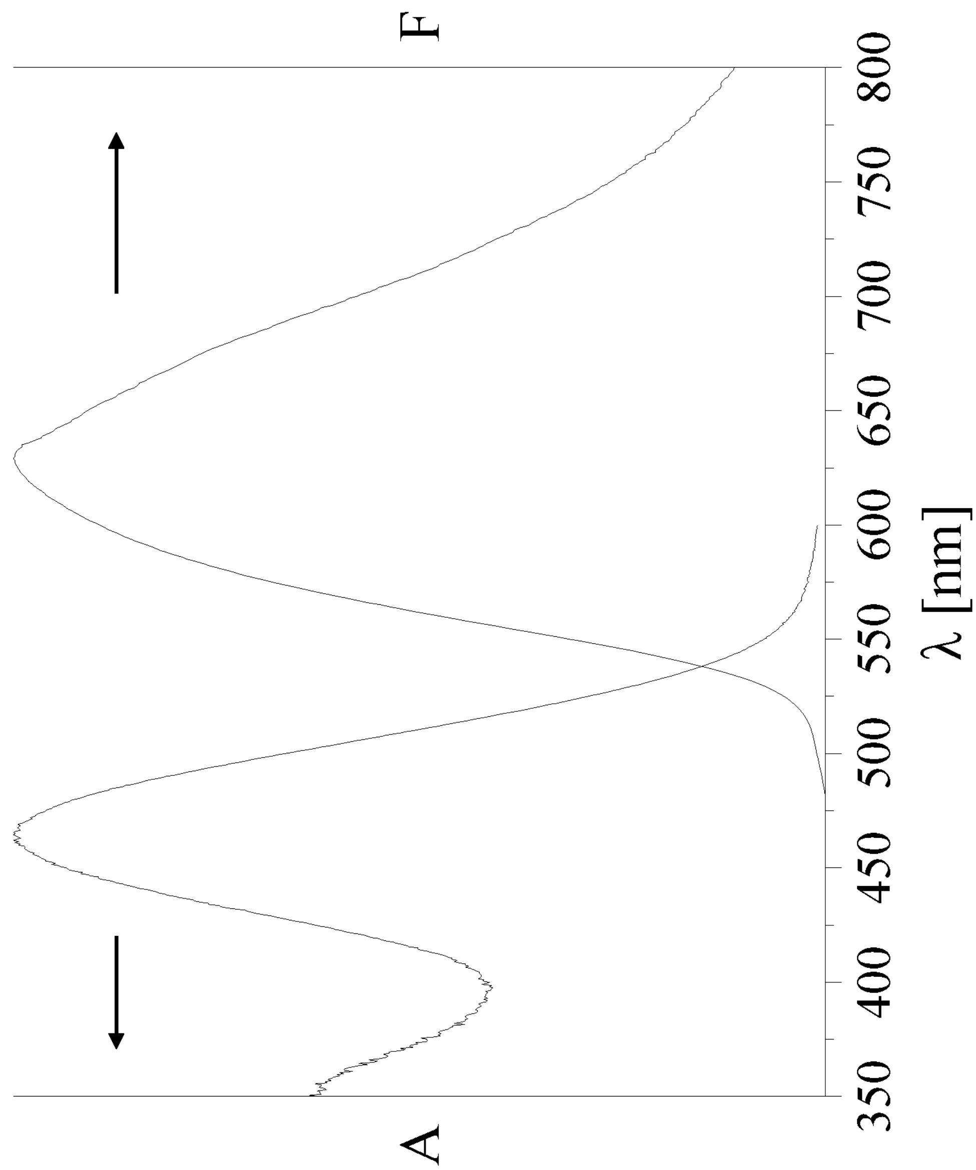
FIG. 2 shows the normalized UV/vis absorption and emission spectra of thiourea-based compound 19 (c[19]=$2.2\times10^{-5}$ M) in toluene. Absorption and emission are separated by a Stokes shift of >160 nm.
Figure 3:
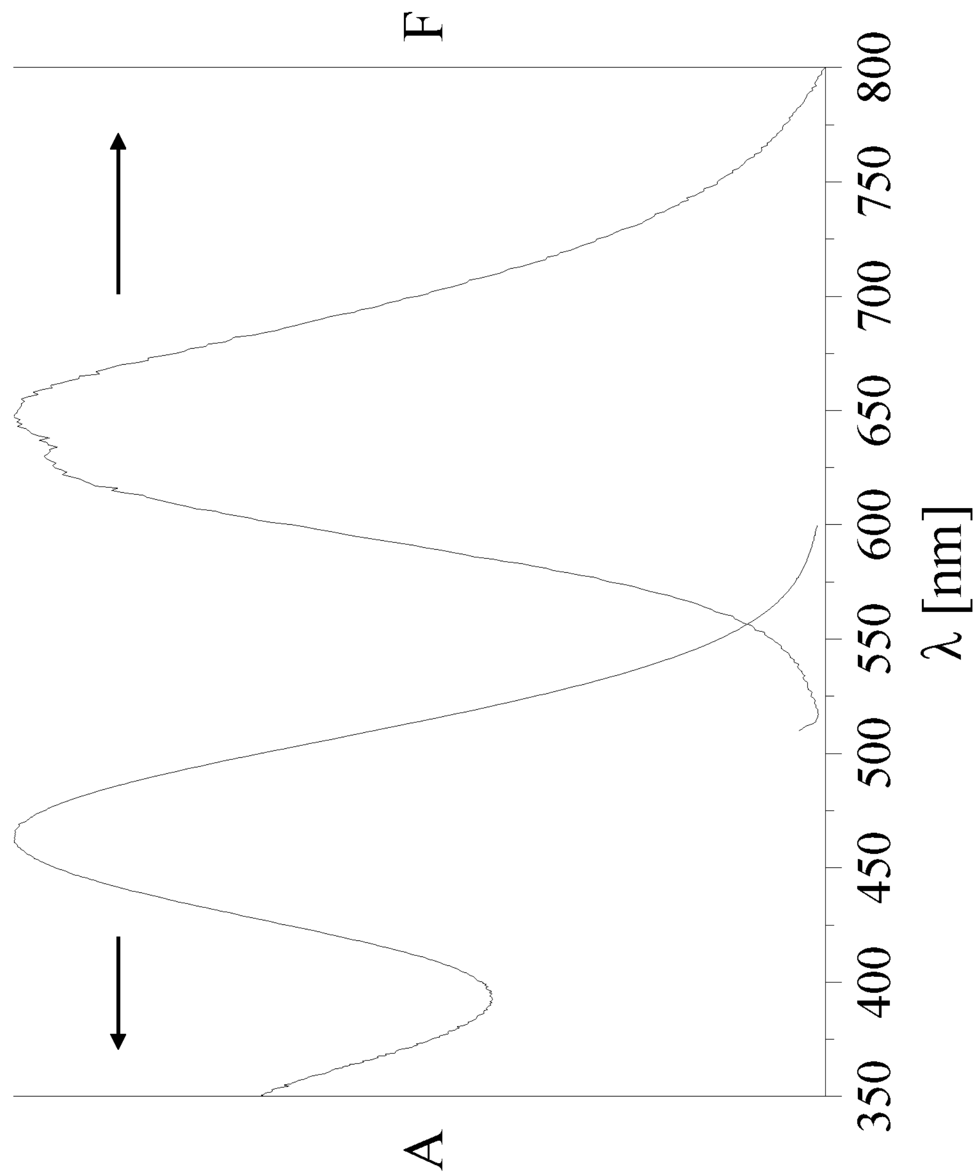
FIG. 3 shows the normalized UV/vis absorption and emission spectra of thiourea-based compound 19 (c[19]=$2.2\times10^{-5}$ M) in acetonitrile (MeCN). Absorption and emission are separated by a Stokes shift of >180 nm.
Figure 4:
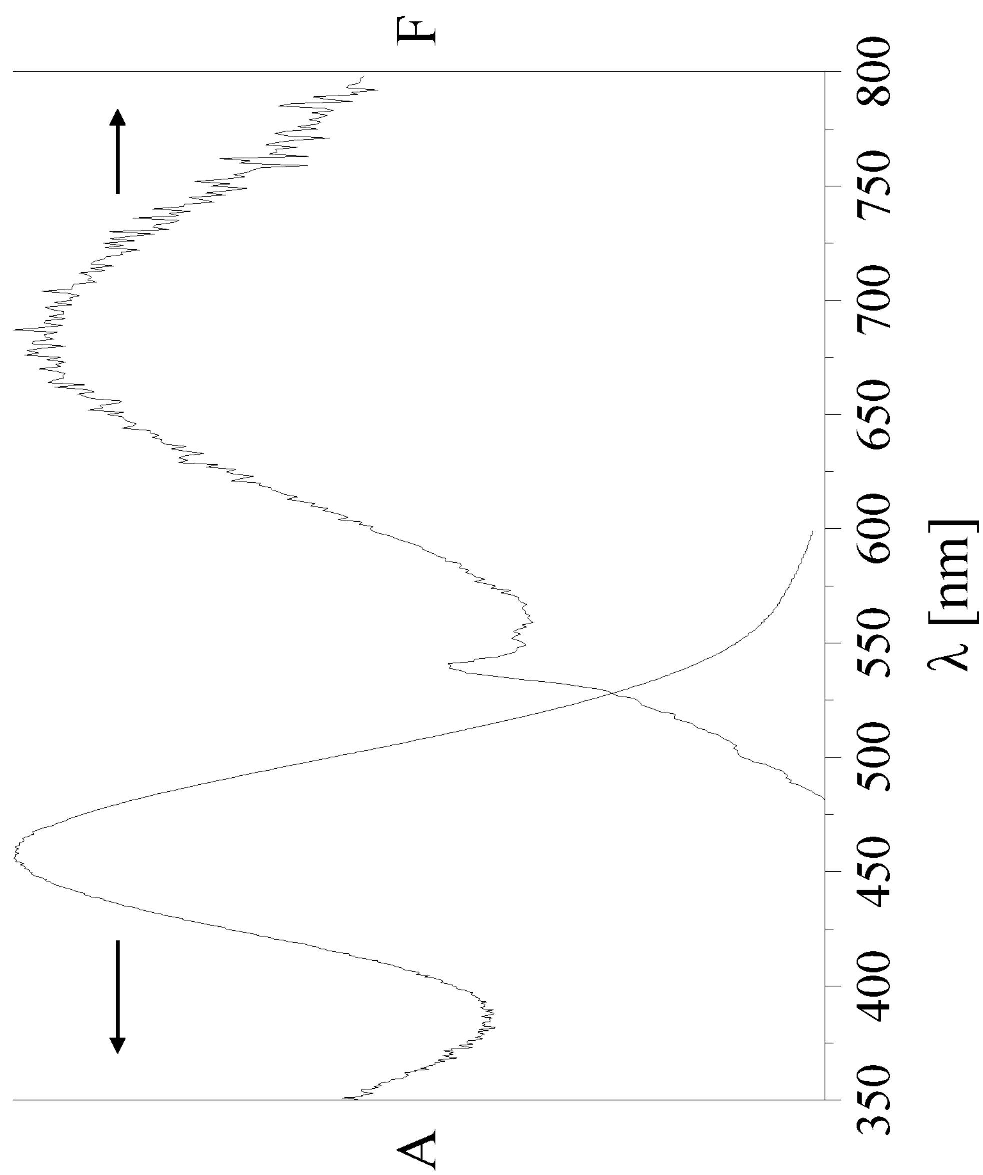
FIG. 4 shows the normalized UV/vis absorption and emission spectra of thiourea-based compound 19 (c[19]=$2.2\times10^{-5}$ M) in methanol (MeOH). Absorption and emission are separated by a Stokes shift of >230 nm.

In the following detailed description, reference is made to the accompanying figures, which form a part hereof, and which show by way of illustration specific embodiments and features of the invention. It is to be understood that other embodiments may be utilized, and structural or logical changes may be made without departing from the scope of the present invention. The following detailed description, therefore, is not to be taken in a limiting sense, and the scope of the present invention is defined by the appended claims.

DETAILED DESCRIPTION

As used in this description (above and below) and claims, the use of the word "a" or "an" when used in conjunction with the term "comprising" in the claims and/or the specification may mean "one", but it is also consistent with the meaning of "one or more", "at least one", and "one or more than one".

As used in this description (above and below) and claims, the use of the expression "n=1 to 20" means that "n" is selected from 1, 2, 3, 4, 5, 6, 7, 8, 9, 10, 11, 12, 13, 14, 15, 16, 17, 18, 19, and 20.

As used in this description (above and below) and claims, the use of the word "or" in the claims is used to mean "and/or" unless explicitly indicated to refer to alternatives only or the alternatives are mutually exclusive, although the disclosure supports a definition that refers to only alternatives and "and/or".

As used in this description (above and below) and claims, the used word "about" before a numerical value indicates a range of numerical values encompassing, i.e. including, a deviation from the indicated numerical value by ±5%.

As used in this description (above and below) and claims, the words "comprising" (and any form of comprising, such as "comprise" and "comprises"), "having" (and any form of having, such as "have" and "has"), "including" (and any form of including, such as "includes" and "include"), "containing" (and any form of containing, such as "contains" and "contain") or "encompassing" (and any form of encompassing, such as "encompass" and "encompasses") are inclusive or open-ended and do not exclude additional, unrecited elements or method steps.

Usually, the term "molecularly imprinted polymer" relates to polymer networks comprising quasi inorganic building blocks and/or organic polymers consisting of the elements carbon, oxygen, hydrogen, and possibly nitrogen, phosphorus, and sulphur, the building blocks being generated in the presence of a special molecular template. Purely inorganic MIPs do not really exist, except for the very first examples of ca. 100 years ago (which yet had not been termed "MIP" then), in which only tetraethyl orthosilicate (TEOS) was used so that the resulting polymer was a $SiO_2$ polymer. Imprinted silicas today are "quasi-inorganic" MIPs because, at least up to now, always various organically modified silanes are used as monomer and/or crosslinker units.

For the sake of clarity, in the present description and claims molecularly imprinted silicas, referred to as MISs are not a subject. Against this background MIPs as used in this description, drawings, and claims will be understood to comprise only organic polymers which typically are prepared without any functional silanes. Generally, MIPs are highly cross-linked polymers which are prepared from monomers and crosslinkers in the presence of a target molecule serving as template. The organic polymers consist typically of chemical elements selected from C, H, O, N, S, and P. After removal of the template molecule, a specific three-dimensional recognition site, cavity, or 'pocket' that is complementary in size, shape, and specific interaction signature to the template molecule is retained in the polymer network. MIPs thus can combine strong affinity to an analyte corresponding to the template molecule with high selectivity, mimicking natural receptors such as antibodies or substrate recognition sites of enzymes. However, especially the chemical and thermal stabilities make MIPs more suitable for many applications compared to their natural analogues. In addition, starting materials for MIPs are often abundant, considerably cheap and preparation times are on the order of days rather than weeks or months typically required for obtaining high-performance biological receptors, e.g. monoclonal antibodies. Various methods including radical polymerization, metathesis, and living polymerization such as reversible addition-fragmentation chain transfer (RAFT) and metal-catalyzed atom transfer radical polymerization (ATRP) have been adopted for MIP preparation and can be used here as well.

As used in this description (above and below) and claims, i.e. herein, the terms "fluorescence", "fluorescent", "fluorescence measurement", "fluorescent dye", "fluorescent particle", "fluorescent ion", "fluorescent probe", "fluorescent indicator", "fluorescent monomer", "fluorescent probe monomer", "fluorescent indicator monomer", "fluorescent crosslinker", "fluorescent probe crosslinker", "fluorescent indicator crosslinker" and any related thereto term is to be understood as comprising an optical property or its detection, e.g., an excitation wavelength, an emission wavelength, a fluorescence intensity, a fluorescence quantum yield, a fluorescence lifetime or decay, a fluorescence quenching or bleaching and/or a ratio of any of their values and its(their) detection.

As used herein, the term "indicator" is used synonymously to "probe", "molecular probe", "chemosensor", "molecular sensor", "molecular chemosensor" and "sensor molecule". An indicator (at least for the analytes as discussed here) always contains a group that can react or bind with the analyte and/or a group of the analyte and changes a measurable property, the expression or degree of said change being influenced by the analyte binding event. If an indicator is only sterically incorporated into a matrix of a sensor, e.g. into a polymer network of a MIP, it does not need to have any other functional group. However, if incorporation or binding of the indicator into or with the matrix of a sensor is attempted covalently, the indicator should also contain at least one polymerizable or reactive group.

As used herein, the term "carrier" is to be understood as "substrate". Particularly, a carrier may be selected from the group consisting of: an inorganic material such as a glass, e.g. a surface of glass fiber, a channel wall or recess in a glass component of a microfluidic system; a silica ($SiO_2$), e.g. a silica particle or a silica layer or silica shell on a solid body such as the silica layer of a core-shell particle; ceramic surface, e.g. an alumina ($Al_2O_3$); a metal surface, e.g. a metal electrode; and an organic material consisting of elements selected from: C, O, H, N, P, and S. Said organic material may be a polymer chain, a polymer network, a plastic—especially a surface of a component of a microfluidic system, e.g. a channel wall of such a microfluidic system. In a sensor arrangement or in a microfluidic system the carrier can be represented by a polymer layer, wherein the indicator can be bound covalently and/or non-covalently, e.g. sterically entrapped in or adsorbed to a matrix of the polymer=a polymer matrix. Thus, the term "carrier" encompasses a "matrix of a sensor" as well as a microfluidic component, or a microfluidic "chip" and a molecularly imprinted polymer (MIP) disposed thereon.

As used herein, the word "medium", used for instance in the term "polar medium" or "polar media" and "non-polar medium" and "non-polar media", is to be understood as a "solution"; a "solvent"; a "gel"; a "membrane", a "layer" or a "coating" comprising same; which provide the corresponding condition, i.e. environment, of being polar or non-polar, respectively. Examples of non-polar solvents are cyclopentane, cyclohexane, heptane, hexane, pentane, benzene, carbon tetrachloride, toluene, o-/m-/p-xylene, 1,2-dichlorobenzen, 1,4-dioxane, dialkyl ethers (with alkyl=methyl, ethyl, n-propyl, n-/t-butyl, n-pentyl, n-hexyl or combinations thereof), diethylene glycol dimethyl ether, 1,2-dimethoxyethane, diethylene glycol diethyl ether. Examples of polar aprotic solvents are chloroform, dichloromethane, tetrahydrofuran, ethyl acetate, cyclohexanone, 4-methyl 2-pentanone, 2-pentanone, 2-butanone, acetone, N,N-dimethylformamide (DMF), N,N-dimethylacetamide, N-methylformamide, N-methylacetamide, cyanobenzene, propanenitrile, acetonitrile, dimethyl sulfoxide, nitromethane, propylene carbonate. Examples of polar protic solvents are glycerin, diethylene glycol, 1,2-ethanediol, benzyl alcohol, cyclohexanol, n-pentanol, n-butanol, 2-methyl 2-propanol, isopropyl alcohol, n-propanol, ethanol, methanol, water.

As used herein, the word "sensing" is to be understood as comprising a detection, a determination, an establishing (of an amount or a concentration), an indication, a probing and/or a signaling with respect to a substance of interest, i.e. an analyte.

As used herein, the word "increase", used for instance in connection with a signal or response with respect to the analyte is to be considered as an enhancement, a growth or an amplification of a respective output (value) of a measuring device. Correspondingly, the word "decrease" encompasses a reduction, a diminution of a signal, e.g. a quenching of a fluorescence or a quenching of a fluorescence signal. In relation to absorption spectra, the word "increase" is to be understood as corresponding to a "hyperchromic" effect or an "increase in absorbance". Correspondingly, the word "decrease" is to be understood as corresponding to a "hypochromic" effect or a "decrease in absorbance".

As used herein, the expression "push-pull", used for instance in the term "push-pull system", is to be understood as "electron push-electron pull", "electron push-pull", "electron rich-electron poor", "donor-acceptor", "electron donor-acceptor", "electron donor-electron acceptor", "electron donating-accepting", and "electron donating-electron accepting".

As used herein the term "pendant group" is to be understood as corresponding to or equivalent with "neighboring group" or "attached group" or "fused group", the word group relating to a chemical group or moiety.

As used herein the terms "peak" or "wavelength peak" are to be understood as corresponding to or equivalent with "band maximum", the terms relating to the maximum of an absorption or fluorescence band in an emission or excitation spectrum.

As used herein the terms "red shift" and "blue shift" are to be understood as corresponding to or equivalent with "bathochromic shift" and "hypsochromic shift" or "shift to longer wavelengths" and "shift to shorter wavelengths", the terms relating to the analyte-induced displacement of a band or band maximum.

As used herein, the term "polymerizable" is used for a molecule, preferably for a dye comprising an electron donor-acceptor-donor motif, i.e. a D-A-D motif, which is equivalent to a $D_1$-A-$D_2$ motif and which comprises at least one, two, or even three substituents (residues $R^x$ with x=1, 2 or 3) which comprise at least a vinyl residue, a styryl residue, a residue of a methacrylic acid, a residue of an acrylic acid or an epoxide residue. Alternatively, at least two, or even three substituents (residues $R^x$ with x=1, 2 or 3) which comprise at least alcohols, amines, thiols and carboxylic acids or carboxylic acid derivatives.

Typically, the suggested molecular probe comprises at least one reactive group when addition polymerization (chain growth polymerization), which can proceed either via radical polymerization or ring opening polymerization, is intended or two reactive groups when the dye should be polymerized by condensation (step growth polymerization).

Dyes containing any reactive group can be sterically incorporated into matrices, e.g., polymers or be used as simple molecular probes in monophasic spectroscopic titrations and biphasic extraction experiments or in microfluidic analytical systems and sensor arrangements.

Against this background according to an embodiment a fluorescent push-pull-push dye, i.e. a dye comprising an electron donor-acceptor-electron donor motif, designated herein as donor-acceptor-donor motif or D-A-D motif, in particular a $D_1$-A-$D_2$ motif, wherein the donor-acceptor-donor motif comprises a structure according to any of formulae: (1), (2), (3), (4), (5), (6), (7), (8) as shown below:

(1)

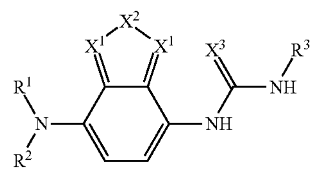

(2)

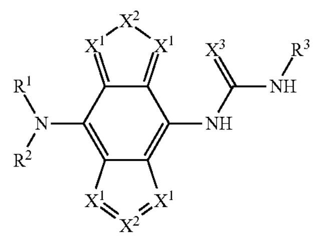

(3)

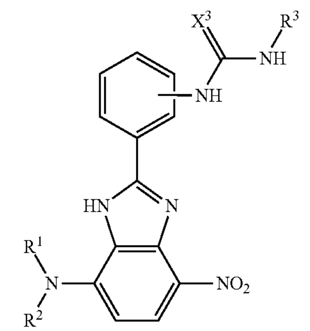

(4)

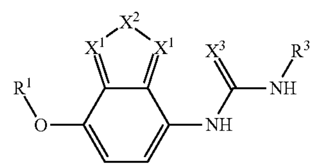

(5)

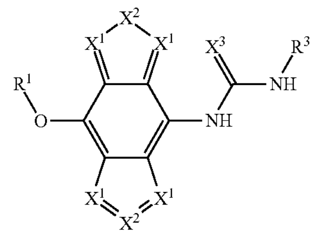

-continued (6)

(7)

(8)

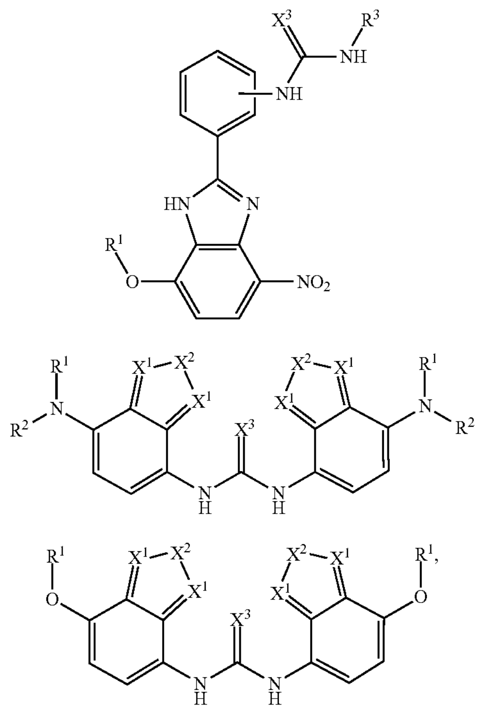

wherein, independently from each other, $R^1$=H, $C_nF_{2n+1}$, $C_5NH_4$, $C_4N_2H_3$, $(CH_2)_nQ$, $(C_6H_{5-m})Q_m$ or $(OCH_2CH_2)_nQ$, wherein m=1, 2, 3 or 4, and Q is selected from:

H,

C(H)=$CH_2$,

OC(O)C(H)=$CH_2$, OC(O)C($CH_3$)=$CH_2$,

N(H)CC(H)=$CH_2$, N(H)CC($CH_3$)=$CH_2$, $Si(OH)_3$, $Si(OCH_3)_3$, $Si(OC_2H_5)_3$,

OH, SH, $NH_2$, $NO_2$, CN, $CF_3$, C≡CH, N=$N^+$=$N^-$, F, Cl, Br, I, $C_2H_3O$, $C_6H_5$,

C(O)F, C(O)Cl, C(O)Br, C(O)I, $CF_3SO_3$, $B(OZ)_2$, OZ, C(O)Z, C(O)OZ, C(O)NHZ, C(O)$NZ_2$, and SSZ, wherein Z=H, $C_nH_{2n+1}$, $C_nF_{2n+1}$, $C_nH_{2n}$C(H)=$CH_2$, $C_nH_{2n}$C≡CH, $C_6H_4$C(H)=$CH_2$, $C_6H_5$, $CH_2C_6H_5$, $C_5NH_4$ or $C_4N_2H_3$, wherein n=1 to 20;

$R^2$=H, $C_nF_{2n+1}$, $C_5NH_4$, $C_4N_2H_3$, $(CH_2)_nQ$ or $(C_6H_{5-m})Q_m$ wherein m=1, 2, 3 or 4, and Q is selected from:

H,

C(H)=$CH_2$,

OC(O)C(H)=$CH_2$, OC(O)C($CH_3$)=$CH_2$,

N(H)CC(H)=$CH_2$, N(H)CC($CH_3$)=$CH_2$, $Si(OH)_3$, $Si(OCH_3)_3$, $Si(OC_2H_5)_3$,

OH, SH, $NH_2$, $NO_2$, CN, $CF_3$, C≡CH, N=$N^+$=$N^-$, F, Cl, Br, I, $C_2H_3O$, $C_6H_5$,

C(O)F, C(O)Cl, C(O)Br, C(O)I, $CF_3SO_3$, $B(OZ)_2$, OZ, C(O)Z, C(O)OZ, C(O)NHZ, C(O)$NZ_2$, and SSZ, wherein Z=H, $C_nH_{2n+1}$, $C_nF_{2n+1}$, $C_nH_{2n}$C(H)=$CH_2$, $C_nH_{2n}$C≡CH, $C_6H_4$C(H)=$CH_2$, $C_6H_5$, $CH_2C_6H_5$, $C_5NH_4$ or $C_4N_2H_3$, wherein n=1 to 20;

$R^3$=H, $C_nF_{2n+1}$, $C_5NH_4$, $C_4N_2H_3$, C(O)$C_6H_5$, C(S)$C_6H_5$, $(CH_2)_nQ$ or $(C_6H_{5-m})Q_m$, wherein m=1, 2, 3 or 4, and Q is selected from:

H,

C(H)=$CH_2$,

OC(O)C(H)=$CH_2$, OC(O)C($CH_3$)=$CH_2$,

N(H)CC(H)=$CH_2$, N(H)CC($CH_3$)=$CH_2$, $Si(OH)_3$, $Si(OCH_3)_3$, $Si(OC_2H_5)_3$,

OH, SH, $NH_2$, $NO_2$, CN, $CF_3$, C≡CH, N=$N^+$=$N^-$, F, Cl, Br, I, $C_2H_3O$, $C_6H_5$,

C(O)F, C(O)Cl, C(O)Br, C(O)I, $CF_3SO_3$, $B(OZ)_2$, OZ, C(O)Z, C(O)OZ, C(O)NHZ, C(O)$NZ_2$, and SSZ, wherein Z=H, $C_nH_{2n+1}$, $C_nF_{2n+1}$, $C_nH_{2n}$C(H)=$CH_2$, $C_nH_{2n}$C≡CH, $C_6H_4$C(H)=$CH_2$, $C_6H_5$, $CH_2C_6H_5$, $C_5NH_4$ or $C_4N_2H_3$, wherein n=1 to 20;

$X^1$=N, C(CN), C(COOEt) or C($NO_2$);

$X^2$=C$(CH_3)_2$, Si$(CH_3)_2$, O, S, Se or Te;

$X^3$=O, S, NH or $NH_2^+X^-$, wherein $X^-$ is selected from:

$F^-$, $Cl^-$, $Br^-$, $I^-$, $NO_3^-$, $PF_6^-$, $ClO_4^-$, $BF_4^-$, B[3,5-$(CF_3)_2C_6H_3]_4^-$, $B(C_6H_5)_4^-$, Al[OC$(CF_3)_3]_4^-$, $H_2BO_3^-$, $BrO_3^-$, $HCO_3^-$, $H_2NCO_2^-$, $C_6H_5CO_2^-$, $C_6H_5CH_2^-$, and $RCOO^-$, wherein R=saturated alkyl or unsaturated alkyl or aryl.

Advantageously, fluorescence properties of the above dyes indicate the presence of the sought for electron rich analyte, i.e. the organic oxo compound in a solution which is in contact with the D-A-D motif (electron donor-electron acceptor-electron donor motif). Alternatively, the dye allows—with a suitable calibration—establishing a concentration of the electron rich analyte, e.g. an organic oxo compound, in a solution which is in contact with the D-A-D motif. By measuring a fluorescence property—such as e.g. the intensity at an emission wavelength peak, a shift of a fluorescence related peak, or a change thereof—a concentration of the corresponding analyte in a sample can be detected.

According to an embodiment in the suggested dye the donor-acceptor-donor motif is selected according to: formulae (1), (2), (3), (4), (5) or (6), comprising a polymerizable monomer when $R^1$ is $(CH_2)_nQ$, $(C_6H_{5-m})Q_m$ or $(OCH_2CH_2)_nQ$ with m=1, 2, 3 or 4, and wherein Q is selected from: C(H)=$CH_2$, OC(O)C(H)=$CH_2$, OC(O)C($CH_3$)=$CH_2$, N(H)CC(H)=$CH_2$, N(H)CC($CH_3$)=$CH_2$, $C_2H_3O$, wherein n=1 to 20. Alternatively, the donor-acceptor-donor motif is selected according to formulae (1), (2), (3), (4), (5) or (6), comprising a polymerizable monomer when $R^1$ is $(CH_2)_nQ$ or $(C_6H_{5-m})Q_m$ with m=1, 2, 3 or 4, and wherein Q is selected from: C(H)=$CH_2$, OC(O)C(H)=$CH_2$, OC(O)C($CH_3$)=$CH_2$, N(H)CC(H)=$CH_2$, N(H)CC($CH_3$)=$CH_2$, $C_2H_3O$, wherein n=1 to 20.

Advantageously, due to e.g. vinyl, styryl, acrylate, methacrylate, acrylamide or methacrylamide functional groups, the above dye can be polymerized by chain growth polymerization as a monomer, being covalently integrated into a polymer as functional unit protruding from the polymer chain, thus allowing to employ the dye comprising the D-A-D motif to indicate the presence of the sought for electron rich analyte, e.g. an organic oxo compound in a solution which is in contact with a polymer matrix comprising the D-A-D motif (the dye).

According to an embodiment the donor-acceptor-donor motif is selected according to:

formulae (1), (2) or (3), comprising a polymerizable crosslinker when both substituents $R^1$ and $R^2$ or $R^1$ and $R^3$ are $(CH_2)_nQ$ or $(C_6H_{5-m})Q_m$ with m=1, 2, 3 or 4, and wherein Q is selected from: $C(H)=CH_2$, $OC(O)C(H)=CH_2$, $OC(O)C(CH_3)=CH_2$, $N(H)CC(H)=CH_2$, $N(H)CC(CH_3)=CH_2$, $C_2H_3O$, wherein n=1 to 20;

or, alternatively, according to formulae (4), (5) or (6), comprising a polymerizable crosslinker when both substituents $R^1$ and $R^3$ are $(CH_2)_nQ$ or $(C_6H_{5-m})Q_m$ with m=1, 2, 3 or 4, and wherein Q is selected from: $C(H)=CH_2$, $OC(O)C(H)=CH_2$, $OC(O)C(CH_3)=CH_2$, $N(H)CC(H)=CH_2$, $N(H)CC(CH_3)=CH_2$, $C_2H_3O$, wherein n=1 to 20;

or, alternatively, according to formula (7), comprising a polymerizable crosslinker when substituents $R^1$ or $R^2$ or both substituents $R^1$ and $R^2$ are $(CH_2)_nQ$ or $(C_5H_{5-m})Q_m$ with m=1, 2, 3 or 4, and wherein Q is selected from: $C(H)=CH_2$, $OC(O)C(H)=CH_2$, $OC(O)C(CH_3)=CH_2$, $N(H)CC(H)=CH_2$, $N(H)CC(CH_3)=CH_2$, $C_2H_3O$, wherein n=1 to 20;

or, alternatively, according to formula (8), comprising a polymerizable crosslinker when substituent $R^1$ is $(CH_2)_nQ$ or $(C_5H_{5-m})Q_m$ with m=1, 2, 3 or 4, and wherein Q is selected from: $C(H)=CH_2$, $OC(O)C(H)=CH_2$, $OC(O)C(CH_3)=CH_2$, $N(H)CC(H)=CH_2$, $N(H)CC(CH_3)=CH_2$, $C_2H_3O$, wherein n=1 to 20.

Advantageously, the above dye due to its styryl, vinyl, acrylate, methacrylate, acrylamide, methacrylamide or epoxide groups can be polymerized by chain growth polymerization or as a crosslinker, being covalently integrated into a polymer as functional unit crosslinking the polymer chains, respectively, thus allowing to employ the dye encompassing the D-A-D motif to indicate the presence of the sought for electron rich analyte, e.g. an organic oxo compound in a solution which is in contact with a polymer matrix that contains the D-A-D dye tightly fixed in the matrix.

In other words, according to an embodiment either two or three of the substituents in $R^1$, $R^2$ or $R^3$ are a-vinyl, a-styrene, an-acrylate, a-methacrylate, an-acrylamide or a -methacrylamid or an -epoxide. Advantageously the dye can be polymerized by chain growth polymerization as a crosslinker.

Furthermore, the dyes comprising the D-A-D motif upon analyte binding will typically show a red-shifted absorption spectrum and a fluorescence emission spectrum with large Stokes shifts that will be accompanied by spectral changes. Advantages are obvious.

According to an embodiment where, $R^3$ is an electron-withdrawing functional group that renders the protons of the urea, thiourea or guanidinium binding unit more acidic, enhancing their binding affinity towards electron-rich molecules such as oxoanions.

According to an embodiment, the suggested dyes may be adapted to possess a urea, thiourea, guanidine or guanidinium binding unit which is advantageously a stronger hydrogen-bond donor as compared with the unsubstituted binding unit.

According to an embodiment, in the dye linked to guanidines, the substituent $R^3$ can present different electronic characteristics which advantageously allow to fine-tune the basicity of the guanidine. Advantageously, those D-A-D dyes will be selective towards acids depending of their acidity.

According to an embodiment, in the corresponding dye $X^2$ may be selected from $C(CH_3)_2$, $Si(CH_3)_2$, Se and Te. Advantageously, the D-A-D dye will show a red-shifted absorption and emission spectra as compared with a benzoxadiazole dye.

According to an embodiment the donor-acceptor-donor motif of the suggested dye is selected according to:

formulae (1), (2), (3), (4), (5), (6), (7) and (8), and comprises a silane derivative when one of the substituents $R^1$ or $R^3$ or $R^1$ and $R^3$ is or are $(CH_2)_nQ$ or $(C_6H_{5-m})Q_m$, wherein m=1, 2, 3 or 4, and Q is selected from: $Si(OH)_3$, $Si(OCH_3)_3$ or $Si(OC_2H_5)_3$.

Advantageously, the above D-A-D dye can be covalently bound to or incorporated in a silica material by Stöber-type sol-gel chemistry, thus allowing to employ the dye encompassing the D-A-D motif to indicate the presence of the sought for electron rich analyte, e.g. an organic oxo compound in a solution which is in contact with a sol-gel matrix that contains the D-A-D dye. Also, due to the reactivity of silanes towards metal surfaces, e.g. a gold surface, the dye can be covalently bound to an electrode. Such may allow alternative detection strategies and may be used to increase the reliability of a sensor arrangement by employing different detection mechanisms simultaneously.

According to an embodiment two of the substituents in $R^1$, $R^2$ and $R^3$ are an alcohol, an amine, a thiol or a carboxylic acid derivative. Advantageously the corresponding dye can be polymerized by step growth polymerization as a monomer.

According to an embodiment all the substituents in $R^1$, $R^2$ and $R^3$ are an alcohol, an amine, a thiol or a carboxylic acid derivative. Advantageously the corresponding dye can be polymerized by step growth polymerization as a crosslinker.

According to an embodiment the donor-acceptor-donor motif of the dye is selected from formula (1) shown above or—in other words—selected according to formula (1).

Advantageously the corresponding dye(s) possesses large Stokes shifts.

According to an embodiment the donor-acceptor-donor motif is selected according to formula (2).

Advantageously the corresponding dye(s) possess(es) a bathochromically shifted absorption and fluorescence spectra.

According to an embodiment the donor-acceptor-donor motif is selected according to formula (3).

Advantageously the corresponding dye(s) possess(es) an acceptor which is reinforced by a $NO_2$ group.

According to an embodiment the donor-acceptor-donor motif is selected according to formula (4).

Advantageously the corresponding dye(s) possess(es) an oxygen-type donor that is not prone to protonation.

According to an embodiment the donor-acceptor-donor motif is selected according to formula (5).

Advantageously the corresponding dye(s) possess(es) an oxygen-type donor that is not prone to protonation and bathochromically shifted absorption and fluorescence spectra.

According to an embodiment the donor-acceptor-donor motif is selected according to formula (6).

Advantageously the corresponding dye(s) possess(es) an oxygen-type donor that is not prone to protonation and an acceptor which is reinforced by a $NO_2$ group.

According to an embodiment the donor-acceptor-donor motif is selected according to formula (7).

Advantageously the corresponding dye(s) possess(es) a high molar absorption coefficient and electron-poor receptor units.

According to an embodiment the donor-acceptor-donor motif is selected according to formula (8).

Advantageously the corresponding dye(s) possess(es) a high molar absorption coefficient, and comprise an oxygen-type donor that is not prone to protonation and electron-poor receptor units.

According to an embodiment the dye comprises a D-A-D motif selected from formulae 1-8, wherein

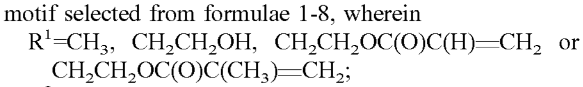
$R^1$=$CH_3$, $CH_2CH_2OH$, $CH_2CH_2OC(O)C(H){=}CH_2$ or $CH_2CH_2OC(O)C(CH_3){=}CH_2$;

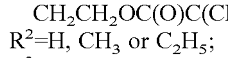
$R^2$=H, $CH_3$ or $C_2H_5$;

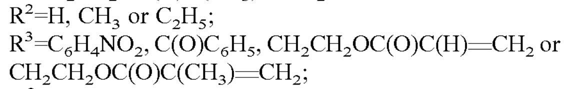
$R^3$=$C_6H_4NO_2$, $C(O)C_6H_5$, $CH_2CH_2OC(O)C(H){=}CH_2$ or $CH_2CH_2OC(O)C(CH_3){=}CH_2$;

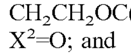
$X^2$=O; and

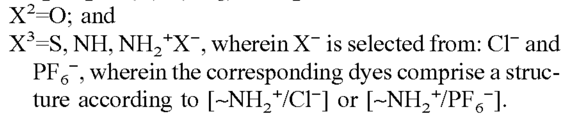
$X^3$=S, NH, $NH_2^+X^-$, wherein $X^-$ is selected from: $Cl^-$ and $PF_6^-$, wherein the corresponding dyes comprise a structure according to [$\sim NH_2^+/Cl^-$] or [$\sim NH_2^+/PF_6^-$].

Advantageously the corresponding dye(s) have large Stokes shifts and prominent fluorescence modulations upon analyte binding in polar solvent media.

According to an embodiment a molecular probe for detection of an analyte comprising an organic oxo compound, an organic oxo acid and/or an anion thereof is suggested, wherein the molecular probe comprises the dye comprising the donor-acceptor-donor motive above, wherein the molecular probe is adapted to indicate the presence of the analyte by changing a fluorescence property selected from: a fluorescence band position, a fluorescence band shape, a fluorescence intensity, a fluorescence lifetime, and/or a fluorescence yield.

Advantageously, the molecular probe can either be used in free solution or be integrated into an analyte sensitive layer and be used in a sensor set-up or in a detection method useful for monitoring an analyte concentration.

According to an embodiment the analyte is selected from: a perfluoroalkyl acid (PFAA) or perfluoroalkyl carboxylic acid (PFCA), a perfluoroalkyl sulfonic acid (PFSA), a perfluoroalkyl phosphonic acid (PFPA), a perfluoroalkyl phosphinic acid (PFPiA), a N-Alkyl perfluoroalkane sulphonamido acetic acid (FASAA), a perfluoroether sulphonic acid (PFESA), a perfluoroether carboxylic acid (PFECA), a fluorotelomer sulphonic acid (FTSA), a fluorotelomer carboxylic acid (FRCA), a fluorotelomer unsaturated carboxylic acid (FTUCA); a herbicide or its degradation product selected from: a glyphosate analyte selected from glyphosate (GPS); methylphosphonic acid (MPA); aminomethylphosphonic acid (AMPA), 3-methylphosphinicopropionic acid (MPPA), and butylphosphonic acid (BPA); an auxin mimic selected from: dicamba, MCPA, 2,4-D, aminopyralid, tridopyr, 2,4-DP, MCPB, 2,4-DB, quinclorac, naptalam, MCPP/CMPP, clopyralid, picloram and diflufenzopyr and their alkali, alkaline earth, transition, post-transition and metalloid metal salts; enoxacin (ENOX), ampicillin, amoxicillin, sialic acid, ciprofloxacin, cetirizine, atorvastatin, flurbiprofen, ragaglitazar, γ-aminobutyric acid, (S)glutamic acid, ibotenic acid, thioibotenic acid, baclofen, phaclofen, saclofen, oseltamivir active principle, lovastatin active principle, losartan active principle, clopidogrel active principle and their alkali, alkaline earth, transition, post-transition and metalloid metal salts.

Due to the toxicity of the listed analytes their monitoring allows to minimize or eradicate detrimental influence on environment and human health.

According to an embodiment an analyte-sensitive layer for detection of an organic oxo compound, an organic oxo acid and/or an anion thereof is suggested, wherein the analyte-sensitive layer comprises the dye comprising the donor-acceptor-donor motif above or the molecular probe above, wherein the dye or the molecular probe is adsorbed at, covalently bound to and/or sterically entrapped within a matrix, wherein the matrix comprises: a glass, a semiconductor, a ceramic, or a polymer. Particularly, the matrix may comprise a porous glass, a glass wool or glass fibers, a ceramic, a synthetic organic polymer, a cellulose, a nitrocellulose, a paper or mesh comprising one of the listed materials, a woven textile comprising one of the listed materials, a non-woven textile comprising one of the listed materials, or a hydrogel.

Advantages are apparent.

According to an embodiment the matrix of the suggested analyte-sensitive layer is a polymer and the polymer is a molecularly imprinted polymer.

The advantages of molecularly imprinted polymers are well known, for instance they are easier/cheaper to obtain in comparison to biological receptors and much more stable.

According to an embodiment the molecularly imprinted polymer of the above embodiment is disposed on a solid substrate selected from: a polymer, a silica, or a polymer core/silica shell particle, wherein the polymer of the polymer core is preferably a polystyrene.

Corresponding core/shell particles can be tuned with respect to their optical (fluorescence) properties, their density, size, and surface chemistry, to name a few. Also, their core can be coded using a different dye or label. They also can be furnished with a magnetic layer and hence easily (automatically) be handled. Accordingly, different detection platforms comprising said core/shell particles can be designed, including multiplex assay formats.

According to an embodiment a molecularly imprinted polymer for detection of an analyte comprising an organic oxo compound, an organic oxo acid and/or an anion thereof is suggested, wherein the molecularly imprinted polymer comprises the dye encompassing a donor-acceptor-donor motif according to any of formulae 1-8 or the molecular probe encompassing any of said donor-acceptor-donor motifs.

According to an embodiment a sensor arrangement for detection of an analyte in a liquid sample, the liquid sample comprising an organic oxo compound, an organic oxo acid and/or an anion thereof is suggested, wherein the sensor arrangement comprises the analyte-sensitive layer comprising the dye encompassing the donor-acceptor-donor motif as described above.

Typically, corresponding analytes are water soluble. Therefore, their detection, e.g. in surface waters, in liquids in the pharmaceutical industry or in liquid foodstuff is highly desirable.

According to an embodiment the suggested sensor arrangement further comprises:

- a light source, adapted for emitting light in a wavelength range from 400-500 nm, preferably from 400-480 nm, e.g. an LED and optionally a band pass filter;
- a measuring device for detecting and/or quantifying a fluorescence light in a wavelength range from 500-700 nm, preferably from 550-675 nm and outputting an output signal, e.g. a photoelement, a photodiode, a photomultiplier, or an avalanche photomultiplier; and
- a control and processing unit (CPU) adapted to calculate an amount of the analyte corresponding to the output signal and/or to quantitatively evaluate a concentration of the analyte in the sample.

According to a typical embodiment the sensor arrangement may comprise a mobile wireless telecommunication terminal such as a mobile phone, a smartphone, or a handheld reader, wherein these devices comprise an appropriate software, e.g. a so-called app. The suggested sensor arrangement typically comprises a microfluidic system adapted to measure a defined volume of the liquid sample or to measure along a defined measurement path, i.e. a defined thickness of a liquid volume.

Advantageously the suggested sensor arrangement can be used for the above described monitoring.

According to an embodiment a use of the above donor-acceptor-donor dye is suggested for:

- a microscopic imaging of a sample selected from a cell (of plant, microbiological, animal, or human origin), a tissue (of plant, animal or human origin), a body fluid of an animal or a human, wherein the sample presumably contains an analyte selected from an organic oxo compound, an organic oxo acid and/or an anion thereof, and wherein the dye has been in contact with the sample before or is brought in contact with the sample during the microscopic imaging;
- a flow-through analysis of a particle suspension, wherein the particles of the suspension comprise the above donor-acceptor-donor dye and had been in contact with a sample which presumably contains an analyte selected from an organic oxo compound, an organic oxo acid and/or an anion thereof, and/or
- a flow-through analysis of a liquid sample, wherein the walls of the channels or tubes of the flow-through device are coated with a matrix that comprises the above donor-acceptor-donor dye so that it comes in contact with the sample which presumably contains an analyte selected from an organic oxo compound, an organic oxo acid and/or an anion thereof, and/or
- a dip-stick analysis of a liquid sample, wherein the stick is coated on one side or on both sides, either in total or in a selected area, with a matrix that comprises the above donor-acceptor-donor dye so that it comes in contact with the sample which presumably contains an analyte selected from an organic oxo compound, an organic oxo acid and/or an anion thereof, and/or
- a quantitative and/or qualitative detection of an analyte selected from an organic oxo compound, an organic oxo acid and/or an anion thereof in an liquid sample or in an organic extract thereof, wherein the sample presumably contains an analyte selected from an organic oxo compound, an organic oxo acid and/or an anion thereof.

Each embodiment described above may be combined with any other embodiment or embodiments disclosed herein unless clearly indicated to the contrary.

Further, several aspects of the disclosed embodiments will be discussed. Particularly, the incorporation of the suggested dyes comprising the proposed D-A-D motif in polymers and matrices to endow an analyte-sensitive layer comprising the D-A-D dye with selectivity for a specific analyte comprising the organic oxo compound and/or to provide a carrier (or substrate) for a repeated use of the D-A-D dyes for analysis will be described. We suggest using the described dyes as molecular probes for diagnostic and analytical purposes of corresponding analyte residues in food and feed, biology, medicine, and environmental monitoring.

As disclosed by the examples given below and the spectral data provided, the suggested fluorescent dyes are applicable for oxoacid or oxoanion sensing and 1) do not suffer from low association constants towards neutral electron rich molecules or anions in polar solvents.
2) possess a good solubility in polar organic solvents or water.
3) provide large Stokes shifts and sufficiently large emission wavelengths allowing the use of the probes in the so called "biological window", well above the ultraviolet-to-green region of the electromagnetic spectrum currently known dyes are limited to. Therefore, the suggested dyes are well adapted to biological, environmental, and food chemical studies and/or analysis.
4) provide prominent fluorescence increase or decrease response upon binding in combination with spectral band shifts and said large Stokes shifts.

The suggested photoluminescence detection methods can be an easy-to-operate, portable, cost-effective and hence, a user-friendly alternative for the non-specialist user when compared with other conventional methods of oxoacid/oxoanion detection such as laboratory-based high-performance liquid chromatography and mass spectrometry. In addition, photoluminescence is well-recognized by its low detection limits (high sensitivity) and real-time responses.

Dye Architecture

The electron push-pull-push fluorescent dyes (i.e. the above dyes comprising a D-A-D motif, or as sometimes synonymously called, the D-A-D dyes) proposed here are based on a benzodiazole (BD) core functionalized with two electron-donating groups ($D_1$ and $D_2$) in direct electronic conjugation with the BD core. The BD core acts as the acceptor unit (A), constituting a $D_1$-A-$D_2$ or "push-pull-push" it-electron system.

The suggested push-pull-push fluorescent dyes can be used as sensor molecules for oxo compounds and/or their corresponding anions in polar solvents, aqueous mixtures and/or aqueous environments and incorporated into materials.

The suggested push-pull-push fluorescent dyes, based on intramolecular or internal charge transfer (ICT) processes, exhibit red-shifted absorption bands and sizable Stokes shifts compared to previously reported dyes. The expression sizable Stokes shift indicates a Stokes shift of at least 80 nm.

Sizable Stokes shifts lead to a reduced overlap between the absorption and emission bands, reducing self-quenching effects and increasing the signal-to-noise ratio. These are beneficial characteristics in utmost fluorescence applications from imaging to sensing.

An approach to obtain spectral shifts for fluorescent anion and acid sensor molecules operated by an ICT mechanism is to introduce an anion or acid binding unit as one of the donor sites of a donor-acceptor-donor ($D_1$-A-$D_2$) system. Thus, at least one of the donor groups is an anion or acid binding unit to obtain spectral shifts for ICT fluorescent anion and acid sensor molecules.

Hydrogen-bonding or basic moieties directly connected to the molecular skeleton of push-pull-push dyes render them as potential fluorescent sensor molecules for hydrogen-bonding acceptor guests such as oxoanions, acidic guests such as oxoacids or other electron-rich molecules. In this invention, the hydrogen bond donor moieties are mainly ureas, thioureas and guanidiniums while the basic moieties are guanidines.

These functional groups have two functions, namely being the electron-donating functional moiety (constituting the $D_1$-A-$D_2$ π-electron system) and at the same time the recognition site for the various target molecules. For the covalent integration of a fluorescent reporter into a polymeric matrix, a small receptor-single fluorophore architecture is preferable to a receptor-multi fluorophore architecture when the assembly of functional monomers and template form the cavity.

Dye Syntheses

All chemicals were obtained from commercial suppliers and were used without further purification. 4-Chloro 7-nitro 2,1,3-benzoxadiazole (99%), 2-aminoethyl methacrylate hydrochloride (90%) and iodomethane (99%) were obtained from Sigma-Aldrich; sodium hydroxide (≥99.0%) from Merck; triethylamine (99.50%) from Applichem; and iron powder (99%) from Alfa Aesar.

The solvents used for the synthesis were used as received from the supplier. Acetic acid glacial (≥99.0%), acetonitrile (≥99.95%), acetone (≥99.0%), dichloromethane (≥99.9%), ethanol 96% (≥95.1%), ethanol absolute (≥99.9%), ethyl acetate (≥99.5%), hydrochloric acid (37%) and N,N-dimethylformamide (≥99.9%) were purchased from Th. Geyer.

The suggested D-A-D dyes are synthesized according to the following general procedure. For selected examples, a first step comprises the functionalization of the commercially available 4-chloro 7-nitro 2,1,3-benzoxadiazole core with an electron-donating group via a nucleophilic aromatic substitution. The functionalization can lead to either amine or alkoxy derivatives.

Synthesis of 2-((7-nitrobenzo[c][1,2,5]oxadiazol 4-yl) amino)ethyl methacrylate according to formula (9):

(9)

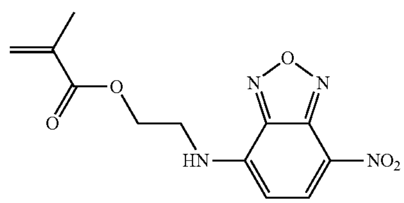

4-Chloro 7-nitro 2,1,3-benzoxadiazole (4.00 g, 19.84 mmol) was dissolved in 200 mL of MeCN. Then, 2-aminoethyl methacrylate chloride (3.65 g, 19.84 mmol) was suspended in the reaction mixture by means of ultrasonication. Afterwards, triethylamine (5.53 mL, 39.69 mmol) was dropwise added and the reaction mixture was stirred overnight at room temperature. The reaction mixture was concentrated and purified by silica column chromatography with $CH_2Cl_2$ as the mobile phase. Compound 9 was obtained as a yellow solid (2.14 g, 37% yield). $^1$H-NMR (400 MHz, $CDCl_3$): δ(ppm)=8.48 (d, 1H), 6.63 (bs, 1H), 6.26 (d, 1H), 6.15 (m, 1H), 5.64 (m, 1H), 4.54 (t, 2H), 3.84 (q, 2H), 1.95 (s, 3H). $^{13}$C-NMR (100 MHz, $CDCl_3$): δ(ppm)=183.10, 167.53, 144.27, 143.51, 136.05, 135.43, 127.04, 98.93, 61.97, 43.26, 29.66, 18.23. HRMS (ESI−): m/z calculated for $C_{12}H_{12}N_4O_5$ ($[M-H]^-$291.0729, found ($[M-H]^-$291.0744. UPLC: tR=3.99 min (100% peak area).

In a second step, if an amine is inserted, it can be further substituted by nucleophilic substitution reactions.

Synthesis of 2-(methyl(7-nitrobenzo[c][1,2,5]oxadiazol 4-yl)amino)ethyl methacrylate according to formula (10):

(10)

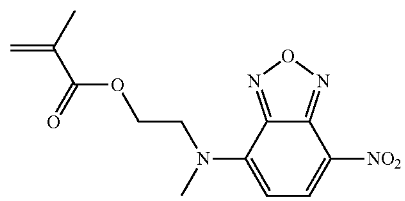

Compound 9 (1.00 g, 3.42 mmol) was dissolved in 5 mL of DMF, followed by the addition of $K_2CO_3$ (0.71 g, 5.13 mmol). Afterwards, iodomethane (0.45 mL, 7.18 mmol) was dropwise added and the reaction was stirred for 4 hours at room temperature. Later, the reaction mixture was diluted with 200 mL of EtOAc. Then, the organic phase was extracted with 200 mL of deionized $H_2O$ (3×) and with 200 mL of brine (1×). The organic phase was collected, dried over $MgSO_4$ and concentrated in a vacuum. Compound 10 was obtained as a red solid (1.03 g, 98% yield). $^1$H-NMR (400 MHz, $CDCl_3$): δ(ppm)=8.46 (d, 1H), 6.18 (d, 1H), 5.92 (m, 1H), 5.52 (m, 1H), 4.525 (m, 4H), 3.48 (s, 3H), 1.82 (s, 3H). $^{13}$C-NMR (100 MHz, $CDCl_3$): δ(ppm)=166.82, 145.28, 144.61, 144.52, 135.49, 135.09, 126.39, 101.76, 61.99, 54.19, 42.04, 18.23. HRMS (ESI+): m/z calculated for $C_{13}H_{14}N_4O_5$ ($[M+H]^+$307.1042, found ($[M+H]^+$ 307.1077. UPLC: tR=3.06 min (100% peak area).

In a third step, the nitrobenzoxadiazoles are reduced to the amine analogues.

Synthesis of 2-((7-aminobenzo[c][1,2,5]oxadiazol 4-yl) oxy)ethanol according to formula (11):

(11)

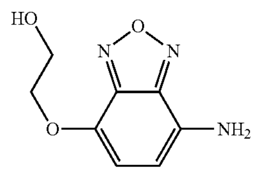

2((7-nitrobenzo[c][1,2,5]oxadiazol 4-yl)oxy)ethanol (0.098 g, 0.44 mmol), synthesized as described by Cummins et al., P Natl Acad Sci 2013, 110, 5812-5817, was suspended in 2.5 mL of concentrated HCl. Later, powdered Fe (0.273 g, 4.88 mmol) was added and the reaction mixture was stirred for one hour at room temperature. A NaOH (2M) aqueous solution was added until pH=7 was reached. The reaction mixture was extracted with 40 mL of $CH_2Cl_2$ (5×) and the organic phase was concentrated in a vacuum. Compound 11 was obtained as a brown solid (0.04 g, 46% yield). $^1$H-NMR (400 MHz, $CDCl_3$): δ(ppm)=6.47 (d, 1H), 6.26 (d, 1H), 4.23 (t, 2H), 4.03 (t, 2H).

$N^4$,$N^4$-dimethylbenzo[c][1,2,5]oxadiazole 4,7-diamine according to formula (12):

(12)

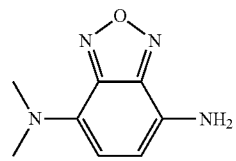

N,N-dimethyl 7-nitrobenzo[c][1,2,5]oxadiazol 4-amine (0.208 g, 1.00 mmol), synthesized as described by Matsunaga et al., Analyst 1997, 122, 931-936, was suspended in 3.0 mL of $CH_3COOH$. Afterwards, powdered Fe (0.167 g, 3.0 mmol) was added and the reaction mixture was stirred for one hour at room temperature. The reaction mixture was diluted with 20 mL of EtOAc and the organic phase was extracted with 20 mL of saturated $NaHCO_3$ (3×) and with 20 mL of brine (1×). The organic phase was collected, dried over $MgSO_4$ and concentrated in a vacuum. The reaction mixture was purified by silica column chromatography with EtOAc as the mobile phase. Compound 12 was obtained as a red solid (0.144 g, 81% yield). $^1$H-NMR (400 MHz, $CDCl_3$): δ(ppm)=6.31 (d, 1H), 6.11 (d, 1H), 4.00 (bs, 2H), 3.08 (s, 6H).

Synthesis of 2-((7-aminobenzo[c][1,2,5]oxadiazol 4-yl) amino)ethyl methacrylate according to formula (13):

(13)

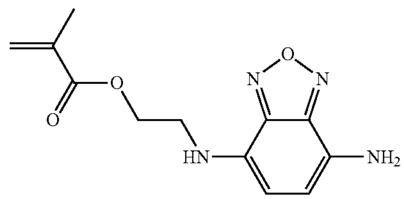

Compound 9 (0.132 g, 0.45 mmol) was suspended in 4.0 mL of $CH_3COOH$. Afterwards, powdered Fe (0.45 g, 8.10 mmol) was added and the reaction mixture was stirred for one hour at room temperature. The reaction mixture was diluted with 20 mL of EtOAc and the organic phase was extracted with 20 mL of saturated $NaHCO_3$ (3×) and with 20 mL of brine (1×). The organic phase was collected, dried over $MgSO_4$ and concentrated in a vacuum. The reaction mixture was purified by silica column chromatography with EtOAc as the mobile phase. Compound 13 was obtained as a red solid (0.10 g, 87% yield). $^1$H-NMR (400 MHz, $CDCl_3$): δ(ppm)=6.32 (d, 1H), 6.13 (m, 1H), 6.07 (d, 1H), 5.59 (m, 1H), 4.42 (m, 2H), 3.55 (m, 2H), 1.95 (s, 3H). $^{13}$C-NMR (100 MHz, $CDCl_3$): δ(ppm)=167.53, 145.47, 144.26, 143.48, 135.89, 127.86, 126.20, 110.57, 104.75, 62.80, 42.84, 18.23. HRMS (ESI+): m/z calculated for $C_{12}H_{14}N_4O_3$ ($[M+H]^+$263.1144, found ($[M+H]^+$263.1155. UPLC: tR=2.19 min (100% peak area).

Synthesis of 2-((7-aminobenzo[c][1,2,5]oxadiazol 4-yl) (methyl)amino)ethyl methacrylate according to formula (14):

(14)

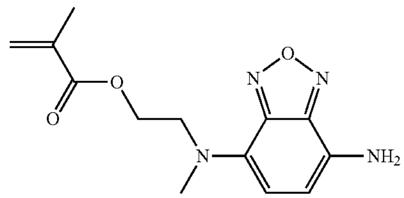

Compound 10 (0.50 g, 1.63 mmol) was suspended in 15 mL of $CH_3COOH$. Afterwards, powdered Fe (1.64 g, 29.34 mmol) was added and the reaction mixture was stirred for one hour at room temperature. The reaction mixture was diluted with 100 mL of EtOAc and the organic phase was extracted with 100 mL of saturated $NaHCO_3$ (3×) and with 100 mL of brine (1×). The organic phase was collected, dried over magnesium sulfate and concentrated in a vacuum. The reaction mixture was then purified by silica column chromatography with EtOAc as the mobile phase. Compound 14 was obtained as a red solid (0.38 g, 85% yield). 1H-NMR (400 MHz, $CDCl_3$): δ(ppm)=6.31 (d, 1H), 6.09 (d, 1H), 5.87 (m, 1H), 5.45 (m, 1H), 4.35 (t, 2H), 4.07 (t, 2H), 3.99 (bs, 2H), 3.05 (s, 3H), 1.79 (s, 3H). $^{13}$C-NMR (100 MHz, $CDCl_3$): δ(ppm)=167.14, 145.94, 145.80, 135.96, 130.88, 125.54, 110.12, 109.76, 62.49, 52.56, 39.58, 18.09. HRMS (ESI+): m/z calculated for $C_{13}H_{16}N_4O_3$ ($[M+H]^+$277.1303, found ($[M+H]^+$277.1349. UPLC: tR=2.19 min (100% peak area).

In a fourth step, the aminobenzoxadiazoles react with either an isocyanate, an isothiocyanate or cyanamide to give a urea, a thiourea or a guanidine, respectively. Examples 1-5 correspond to the formation of ureas and thioureas. In a fifth step, thioureas can be converted to guanidines as in Examples 6-9. In a sixth step, guanidines can be reacted with Bronsted acids to give the guanidinium analogues, as in Examples 10-11.

Spectroscopic Properties and Titrations

The suggested push-pull-push dyes absorb in the visible (350-550 nm) and emit in the visible (550-850 nm) and NIR spectral range near to or within the biological window (650-900 nm) with large Stokes shifts (80-260 nm), as can be seen in Examples 12-14. Anion binding results in a favorable red shift in both absorption (yellow to orange) and fluorescence; while acid binding results in a favorable desired blue shift (red/orange to yellow) both in absorption and fluorescence. The analytes strongly bind to the suggested D-A-D dyes with ca. log ≈3-7 in polar solvents and in aqueous mixtures. In general, urea, thiourea and guanidinium-based D-A-D dyes as suggested can bind oxoanions, exhibiting a decrease and a bathochromic shift both in absorption and emission; while guanidine-based D-A-D dyes as suggested can bind oxoacids, exhibiting an increase and a hypsochromic shift both in absorption and emission.

Guanidines are strongly basic, usually more basic than organic amines. Among others, guanidines interact with acids via ion-pairing (acid-base reactions leading to the protonation of the guanidine group). Although not directional, electrostatic interactions are among the strongest supramolecular interactions (200-300 kJ $mol^{-1}$). The guanidines of the suggested D-A-D dyes are both directly conjugated to the BD core, an electron-poor group, and to a pendant group such as benzoyl, nitro-phenyl, phenyl and alkyl, among others. The pendant group favorably allows to fine-tune the basicity of the guanidine. Nitro-phenyl and benzoyl lower the basicity of the guanidine, being selective towards strong acids; while phenyl and alkyl increase the basicity of the guanidine, being reactive towards weaker acids. Hence, the pendant groups endow the guanidine of the suggested D-A-D dyes with intrinsic/inherent binding selectivity.

As an example, compound 19 can interact with oxoanions (e.g. ENOX-TBA). Titration experiments of compound 19, a thiourea-based fluorescent monomer, with ENOX-TBA in MeCN can be found in Example 15. In MeCN, an increase in emission can be observed.

As an example, compound 23 can interact with strong oxoacids (e.g. PFOA) but it does not interact with weak acids (e.g. acetic acid, methacrylic acid and fatty acids). Titration experiments of compound 23, a guanidine-based fluorescent monomer, with PFOA in a variety of solvents can be found in Example 16. The protonation of guanidine to guanidinium leads to an increase and a blue shift in absorption in a variety of solvents such as EtOAc, MeCN and MeCN/$H_2O$ mixtures (1, 5, 10 and 25 vol % $H_2O$).

Guanidinium groups carry a positive charge formally ascribed to the primary ammonium subunit at the central C atom, —NH—C(=$NH_2^+X^-$)—NH—, to donate charge assisted hydrogen bonds (salt bridge). Hence, guanidinium groups are stronger hydrogen bond donors if compared to their guanidine counterparts. In addition, nitro-phenyl and benzoyl moieties play a dual role, as already mentioned they lower the basicity of the guanidine but also increase the acidity of the guanidinium protons, the substituted guanidiniums being even better hydrogen bond donors.

As an example, compound 25 can interact with oxoanions (e.g. tetrabutylammonium acetate (TBA-OAc)) in non-polar and polar solvents. Titration experiments of the guanidinium-based fluorescent monomer 25 with TBA-OAc in MeCN can be found in Example 17. The interaction of the guanidinium with the carboxylate leads to a red shift and decrease in absorption as well as a red shift and decrease in emission in $CHCl_3$ and MeCN as a result of a more effective CT process. The carboxylate pushes the chloride, injecting electron density and converting the guanidinium into a better electron-donor group.

Inorganic oxoanions that do not interfere with the binding of the organic oxoanion or oxoacid to the fluorescent reporter (i.e. the suggested dye) at relevant concentrations are $HCO_3$, $CO_3^{2-}$, $ClO^-$, $ClO_3^-$, $ClO_4^-$, $NO_2^-$, $NO_3^-$, $OH^-$, $O_2^-$, $O_2^{2-}$, $SiO_3^{2-}$, $SiO_4^{4-}$, $HSO_3^-$, $HSO_4^-$, $SO_3^{2-}$, $SO_4^{2-}$, $S_2O_3^{2-}$, $H_2PO_4^-$, $HPO_4^{2-}$, $PO_4^{3-}$, $P_2O_7^{4-}$ and $AlSiO_4^-$.

Inorganic oxoanions that might interfere with the analytical response when present at higher concentrations are colored anions such as $CrO_4^{2-}$, $Cr_2O_7^{2-}$ and $MnO_4^-$.

Dye Incorporation into Materials and Matrices

According to several embodiments the suggested D-A-D dyes—if configured as monomers comprising at least one polymerizable group—can advantageously be incorporated into various materials and matrices such as polymers, polymer films, coatings, polymer fibers, porous polymer membranes, polymer particles and molecularly imprinted polymers. Particularly, the suggested fluorescent monomers can be directly incorporated into the backbone or grafted by reversible addition-fragmentation chain transfer polymerization (RAFT). They can be bound to a glass, glass beads/silica particles and to mesoporous silica, to alumina or to titanium oxide material (e.g., $SiO_2$ type MCM-41, HMS, MSU-n, MSU-V, FSM-16, KSW-2, SBA-n (n=1, 2, 3, 8, 11-16), UVM-7, UVM-8, $Al_2O_3$ type MCM-41, $TiO_2$ type MCM-41 or SBA-15) provided, e.g., as a shell of a polymer core/inorganic shell particle. They can also be bound to a glass fiber, to a cellulose and to a nitro-cellulose paper.

According to an embodiment the suggested D-A-D dyes can advantageously be incorporated into mesoporous silica by using coupling agents such as 3-(trimethoxysilyl)propyl methacrylate, 3-(triethoxysilyl)propyl methacrylate, 3-(trimethoxysilyl)propyl acrylate, 3-(triethoxysilyl)propyl acrylate, 3-(trichlorosilyl)propyl methacrylate or 3-(dimethylchlorosilyl)propyl methacrylate. (Meth)acrylate-containing silanes can be used as effective coupling agents to covalently bind the D-A-D dyes to mesoporous silica. The mesoporous silica can be further functionalized to tune the microenvironment (for instance polarity, pH, hydrophilicity, hydrophobicity, fluorine interactions, etc.) inside of the pores. An example of this functionalization is the use of fluorinated silanes to create a local hydrophobic fluorinated layer for PFCAs sensing.

The following approach can be used to functionalize all classes of silica materials. Functionalization of SBA-15 particles can for instance be done when a mixture containing a perfluorinated silane and a silane methacrylate are added to an ethanol or toluene suspension of SBA-15 particles. The ratio between the perfluorinated silane and the silane methacrylate must be such that the perfluorinated silane is always in excess. The molar ratio can vary from 2:1 to 36:1, perfluorinated silane to methacrylate silane. In this manner, homopolymerization of the silane methacrylate is prevented. Typically, the mixture is stirred at room temperature for 48 h.

For further coupling of a D-A-D dye containing at least one polymerizable unit, the methacrylate groups on the surface of the mesoporous material can be activated by using a radical initiator such as AIBN in a 1:1 molar ratio or lower at 60-90° C. for 1-4 h before a D-A-D dye containing at least one polymerizable unit is added in a 1:1 molar ratio or lower and left stirring at 60-90° C. for 1-4 h.

Examples of fluorine-fluorine interaction forming silanes are triethoxy(3,3,4,4,5,5,6,6,7,7,8,8,8-tridecafluorooctyl)silane, triethoxy(3,3,4,4,5,5,6,6,7,7,8,8,9,9,10,10,10-heptadecafluorodecyl)silane, trichloro(3,3,4,4,5,5,6,6,7,7,8,8,8-tridecafluorooctyl)silane, and trichloro(3,3,4,4,5,5,6,6,7,7,8,8,9,9,10,10,11,11,12,12,12-henicosafluorododecyl)silane.

Examples of PEGylated silanes are ethylene glycol silane and poly(ethylene glycol) silanes with Mn=100-10000 g $mol^{-1}$.

According to an embodiment the suggested D-A-D dyes can also be introduced in molecularly imprinted polymers (MIPs) for selective recognition of an analyte which had been used as the template during synthesis of the MIP (cf. Example 18). MIPs are polymers cured in the presence of a template to form complementary imprinted cavities. Complementary imprinted cavities typically present good selectivity and interferent discrimination, resembling an artificial antibody paratope. Despite the dye having a binding unit with an intrinsic selectivity i.e. guanidine towards acids, the MIPs provide additional selectivity based on size and shape of the analyte. However, some anions could interfere with the analyte detection when the free dye is used in solution, among them deeply colored anions i.e. $CrO_4^{2-}$, $Cr_2O_7^{2-}$, $MnO_4^-$. Other, potentially oxidizing or reducing inorganic anions play merely a marginal role for samples containing the sought for analytes and are therefore omitted here.

The MIP is built from a mixture of functional monomers and crosslinkers. Monomers and crosslinkers can be used in their acrylate, methacrylate, vinyl or styrene form. Functional monomers can be monomers with hydrogen or halogen bonds forming units, fluorine-fluorine interactions, ion-ion interactions, ion-dipole interactions, dipole-dipole interactions, π-π stacking units, n-ion interactions, hydrophobic and/or fluorescent monomers.

MIPs can be generated by several methods such as the precipitation polymerization or reversible addition-fragmentation transfer (RAFT) polymerization. Other controlled radical polymerizations (CRP), also known as reversible-deactivation radical polymerizations (RDRP), can be used, e.g. stable free radical polymerization (SFRP) or nitroxide mediated polymerization (NMP) and atom transfer radical polymerization (ATRP).

The synthesis of MIPs can be performed with thermal or photochemical initiation. MIPs can be polymerized in solution, on a surface of a planar and/or curved substrate, or on the surface of particles used as a core. The core particles can be in the nano, microscale or larger. Examples are silica (MIP@$SiO_2$), polystyrene (MIP@PS) or polystyrene core/silica shell (MIP@$SiO_2$@PS) particles.

The molecularly imprinted polymers can be generated by a polymerization of at least one type of a monomer selected from: acrylamide, vinyl pyridine, N-isopropylacrylamide, methoxy polyethylene glycol methacrylate, polypropylene glycol monomethacrylate, 2-hydroxyethyl methacrylate, methyl methacrylate, benzyl methacrylate, methacrylate, methacrylamide, N,N'-dimethyl methacrylamide, trifluoromethyl acrylate, 2-aminoethyl methacrylate, methacrylic acid, vinylalcohol, vinylimidazole, vinylphenyl boronic acid, amino-substituted vinylphenyl boronic acid, vinyl benzaldehyde, vinyl aniline; with a cross-linking agent selected from: ethylene dimethacrylate, ethylene glycol (n=1-13) dimethacrylate, N,N'-methylenebisacrylamide, divinylbenzene, tetramethylene dimethacrylate, poly(acrylic acid), a bis(-hydroxyethyl) sulfone, trimethylolpropane trimethacrylate, pentaerythritol triacrylate, 2,2,3,3,4,4,5,5-octafluorohexane 1,6-dimethacrylate and N,N'-(1,2-dihydroxyethylene)bisacrylamide.

The use of fluorine-fluorine interaction forming monomers (R—X . . . X—R') provides specific interactions for the detection of fluorinated substances if compared to fully hydrogenated monomers (R—H . . . F—R'). A specific example would be the detection of PFCAs in which fluorine-fluorine interactions (R—F . . . F—R') increase the selectivity for fluorinated substances.

Examples of fluorine-fluorine interaction forming acrylates are 2-(trifluoromethyl)acrylic acid, methyl 2-(trifluoromethyl)acrylate, 2,2,2-trifluoroethyl acrylate, 2,2,3,3-tetrafluoropropyl methacrylate, 2,2,3,3,3-pentafluoropropyl acrylate, 1,1,1,3,3,3-hexafluoro-2-propanyl acrylate, 2,2,3,4,4,4-hexafluorobutyl acrylate, 2,2,3,3,4,4,4-heptafluorobutyl acrylate, 2,2,3,3,4,4,5,5-octafluoropentyl acrylate, 2,2,3,3,4,4,5,5,6,6,7,7-dodecafluoroheptyl acrylate, 3,3,4,4,5,5,6,6,7,7,8,8,8-tridecafluorooctyl acrylate, 3,3,4,4,5,5,6,6,7,7,8,8,9,9,10,10,10-heptadecafluorodecyl acrylate, 3,3,4,4,5,5,6,6,7,7,8,8,9,9,10,10,11,11,12,12,12-henicosafluorododecyl acrylate, 2-chloroethyl acrylate, methyl 2-(chloromethyl)acrylate, methyl 2-(bromomethyl) acrylate, ethyl 2-(bromomethyl)acrylate, methyl 2-bromoacrylate, pentabromobenzyl acrylate, 2-(bromomethyl) acrylic acid and 2-bromoacrylic acid Examples of fluorine-fluorine interaction forming methacrylates are 2,2,2-trifluoroethyl methacrylate, 2,2,3,3-tetrafluoropropyl methacrylate, 2,2,3,3,3-pentafluoropropyl methacrylate, 1,1,1,3,3,3-hexafluoro 2-propanyl methacrylate, 2,2,3,4,4,4-hexafluorobutyl methacrylate, 2,2,3,3,4,4,4-heptafluorobutyl methacrylate, 2,2,3,3,4,4,5,5-octafluoropentyl methacrylate, 3,3,4,4,5,5,6,6,7,7,8,8,8-tridecafluorooctyl methacrylate, 2,2,3,3,4,4,5,5,6,6,7,7,8,8,8-pentadecafluorooctyl methacrylate, 3,3,4,4,5,5,6,6,7,7,8,8,9,9,10,10,10-heptadecafluorodecyl methacrylate, 3-chloro-2-hydroxypropyl methacrylate and pentabromobenzyl methacrylate and 2-bromoethyl methacrylate.

Examples of PEGylated monomers are ethylene glycol acrylate, methacrylate, allyl and styryl and poly(ethylene glycol) acrylate, methacrylate, allyl and styryl with Mn=100-10000 g $mol^{-1}$.

Areas of Application/Advantages

As indicated above, detection of PFAAs is a relevant case in which advantage is drawn from the use of the suggested guanidine-based D-A-D dyes in aqueous samples and mixtures, particularly in waters and extracts of environmental samples to be monitored for PFAAs. PFAAs are a family of compounds that consist of a fully perfluorinated carbon backbone and a charged functional moiety (mainly a carboxylate, sulfonate or phosphonate). When the functional group is a carboxylic acid, they are better known as perfluoroalkyl carboxylic acids (PFCAs). Two ubiquitous PFCAs are the eight-carbon perfluorooctanoic acid (PFOA) and perfluorooctane sulfate (PFOS). Since PFCAs pose an environmental threat and PFCAs have been classified as substances of very high concern (SVHC) by the European Chemical Agency (ECHA, REACH regulations) there is the prevailing need to provide fast and sensitive detection methods and/or quick and easy to operate sensors targeting PFCAs. Currently, PFCAs are mainly analyzed by either GC-MS, HPLC-MS or tandem HPLC-MS/MS, HRMS such as Orbitrap, fast atom bombardment-(FAB) or time-of-flight (TOF)-MS. Alternatively, capillary zone electrophoresis is used although its sensitivity is lower. However, these techniques are rather laborious, corresponding equipment is not portable, expensive and requires trained personnel. Hence, the prevailing need to provide novel analytical methods that solve the aforementioned issues can advantageously be responded to with the suggested D-A-D dyes.

The state of the art on photoluminescent PFCAs detection is either based on the use of quantum dots, functionalized NPs (e.g., Walekar et al., Mikrochim Acta 2019, 186, Art.-No. 278) or fluorescent dyes (e.g., Cheng et al., Spectrochim. Acta A 2018, 201, 281-287). Current methodologies present drawbacks as the use of toxic heavy metals (e.g. Cd), a poor discrimination between PFCAs and analogous fatty acids, a poor discrimination among PFCAs themselves, turn ON or OFF fluorescence responses limiting their applicability and often moderately high limits of detection.

Advantageously, the absorption and emission of the suggested D-A-D dyes are above 440 nm, for example the dye-according to formula 23 absorbs at 447 nm and emits at 674 nm in MeCN. In addition, the suggested dyes show a considerably large Stokes shift of 80 nm to 260 nm. Thiourea-and guanidinium-based dyes bind stronger to oxoanions than urea-based dyes in non-polar environments. Furthermore, thiourea-and guanidinium-based dyes are able to bind to oxoanions in polar solvents. The suggested D-A-D dyes comprising guanidine can also interact with oxoacids. To our knowledge, there are no benzodiazole (BD) based D-A-D dyes containing both a (meth)acrylate and either a urea, thiourea, guanidine or guanidinium in the same molecular structure. Favorably, polymerizable units within the suggested D-A-D dye allow the introduction of the dyes in various material matrices while urea, thiourea, guanidine and guanidinium groups allow the recognition of oxoanions and oxoacids.

The suggested electron push-pull-push fluorescent dyes can advantageously be used as indicators, i.e. molecular probes, for the mentioned analytes dissolved in non-polar solvents, polar solvents, aqueous mixtures and/or aqueous environments by detecting a change in light absorption and/or in a color and/or by measuring a fluorescence emission spectral shift and/or by measuring an intensity change and/or a lifetime shift in the visible to near infrared (NIR) spectral range upon binding of or complexation with said oxoacid or oxoanion.

Fluorescent dyes which exhibit electronic absorption bands in the near ultraviolet and preferably in the visible or MR spectral range and Stokes-shifted emission bands in the visible or the MR (>780 nm) spectral range and which provide absorption and/or emission spectral shifts upon interaction with either oxoacids or oxoanions in polar media, are desirable molecular sensors with potential application in fields ranging from material science to biology, medicine, food and environmental sciences. The suggested embodiments provide sensitive detection for many compounds bearing groups such as carboxylic acids, carboxylates phosphoric acids and phosphates, among other oxocompounds.

Examples of oxoacids analytes in the agrochemical and environmental field are the family of perfluoroalkyl acids (perfluoroalkyl carboxylic acids (PFCAs), perfluoroalkyl sulfonic acids (PFSAs), perfluoroalkyl phosphonic acids (PFPAs), perfluoroalkyl phosphinic acids (PFPiAs), N-Alkyl perfluoroalkane sulphonamido acetic acids (FASAAs), perfluoroether sulphonic acids (PFESAs), perfluoroether carboxylic acids (PFECAs), fluorotelomer sulphonic acids (FTSAs), fluorotelomer carboxylic acids (FRCAs) and fluorotelomer unsaturated carboxylic acids (FTUCAs)), glyphosate, auxin mimics (dicamba, MCPA, 2,4-D, aminopyralid, tridopyr, 2,4-DP, MCPB, 2,4-DB, quinclorac, naptalam, MCPP/CMPP, clopyralid, picloram and diflufenzopyr) and their alkali, alkaline earth, transition, post-transition and metalloid metal salts.

Examples of oxoacid analytes in the biomedical fields are penicillin, diclofenac, enoxacine, levoxacin, ampicillin, amoxicillin, sialic acid, ciprofloxacin, cetirizine, atorvastatin, flurbiprofen, ragaglitazar, γ-aminobutyric acid, (S)glutamic acid, ibotenic acid, thioibotenic acid, baclofen, phaclofen, saclofen, oseltamivir active principle, lovastatin active principle, losartan active principle, clopidogrel active principle and their alkali, alkaline earth, transition, post-transition and metalloid metal salts.

Hence, the suggested push-pull-push fluorescent dyes can be used as molecular sensors for a wide variety of compounds of high interest in fields ranging from material science to biology, medicine, food industry and environmental science.

In other words, the present invention refers to push-pull-push dyes and their use as fluorescent and colorimetric sensor molecules for organic oxo compounds and/or their corresponding anions in polar solvents and when incorporated into or attached to materials serving as carriers. The combination of two types of electron-donating groups (namely urea, thiourea and guanidinium as well as namely oxygen and alkyl-substituted amines) into a molecular dye structure in which one electron-donating group simultaneously acts as a hydrogen bond donor towards oxoanalytes constituting the recognition unit of the sensor is a prominent feature of the present invention. The perturbation of the electronic configuration of the dye by the hydrogen bonded analyte produces changes in the ground and excited states of the dye and will be translated into, a priori, hypsochromic shifts in absorbance as well as in fluorescence.

Main advantages of the internal charge transfer (ICT) based organic oxo compound sensor molecules as suggested here are:

1) High association constants towards neutral electron rich molecules or anions in polar solvents by decorating the dyes with strong hydrogen-bond donors such as thioureas and guanidiniums which are additionally functionalized with electron-withdrawing groups like benzoyl and para-nitro phenyl groups.
2) Improved solubility in polar organic solvents and water by introducing charges or polar groups in the molecular dye framework specially in the case of using guanidiniums as binding units.
3) Red-shifted absorption spectra as a result of the "push-pull-push" electronic nature of the dyes, making them compatible with biological studies.
4) Large Stokes shifts (ca. 200 nm) as consequence of the effective internal charge transfer process established in the excited state.
5) Spectral shifts of the dye emission bands upon the target analyte binding as a consequence of the reconfiguration of the two interacting internal charge transfer processes in the two single $D_1$-A and $D_2$-A arms of the asymmetric D-A-D dyes, because binding occurs only at one of the two donor (D) units. With respect to the fluorophore as the acceptor unit, all dyes suggested here are asymmetric so that the two interacting internal charge transfer (ICT) processes: $D_1 \rightarrow A$ and $D_2 \rightarrow A$ are of a different strength, $D_1$ relating to either $NR^1R^2$ or $OR^1$ and $D_2$ relating to $N(H)C(X^3)N(H)R^3$. Because the binding unit is only integrated into one of these donor units, the overall "push-pull-push" nature is reconfigured upon analyte binding. That allows to achieve distinct changes in spectral band position and intensity without compromising the large Stokes shifts which are used according to the embodiments mentioned herein.
6) Real-time sensing by color change of the dye upon anion binding detected even by naked eye (mainly changes from yellow to orange).
7) Furthermore, the range of application of these fluorescent probes can be expanded from solution to solid matrixes that are applicable in fields ranging from material science to biology, environmental science, medicine, and environmental monitoring.

PRACTICAL EXAMPLES

Practical examples demonstrate synthesis and fluorescence-related properties of some typical embodiments.

All chemicals were obtained from commercial suppliers and were used without further purification. 4-Chloro 7-nitro 2,1,3-benzoxadiazole (99%), 2-aminoethyl methacrylate hydrochloride (90%), iodomethane (99%), hexamethyldisilazane (>99%), 3-(trimethoxysilyl)propyl methacrylate (98%), (3-aminopropyl)triethoxysilane (APTES) (>98%), tetrabutylammonium hydroxide (TBA-OH) 30-hydrate (≥98%), 2,2'-azobisisobutyronitrile (AIBN) (98%), 2-hydroxyethylmethacrylate (HEMA) (99%), ethylene glycol dimethacrylate (EGDMA) (98%), and Pluronic F-123 were obtained from Sigma-Aldrich; sodium hydroxide (≥99.0%) from Merck; triethylamine (99.50%) and ammonia solution (32%) from AppliChem; iron powder (99%), mercury(II) oxide (99%) and enoxacin (99.9%) from Alfa Aesar; 4-nitrophenyl isothiocyanate (98%) from Acros; ammonia (7N) in methanol and tetraethylorthosilicate (TEOS) (>99%) from Honeywell; ethyl chloroformate (≥98.0%) from Fluka Analytics; benzoyl isothiocyanate (98%) and N-(3-dimethylaminopropyl)-N'-ethylcarbodiimide hydrochloride (≥ % 98.0) from Chempur; (heptadecafluoro-1,1,2,2-tetrahydrodecyl)trimethoxysilane (95%) and 4-cyano-4-(phenylcarbonothioylthio)pentanoic acid (CPDB) (97%) from abcr; 2,2'-azobis(2,4-dimethylvaleronitrile) (ABDV) from Wako; and perfluorooctanoic acid (98%) from J&K.

The solvents used for the synthesis were used as received from the supplier. Acetic acid glacial (≥99.0%), acetonitrile (≥99.95%), acetone (≥99.0%), dichloromethane (≥99.9%), ethanol 96% (≥95.1%), ethanol absolute (≥99.9%), ethyl acetate (≥99.5%), hydrochloric acid (37%), methanol (≥99.8%), N,N-dimethylformamide (≥99.9%), tetrahydrofuran (≥99.9%) and toluene (≥99.5) were purchased from Th. Geyer; n-hexane (>95%) from Merck; and anhydrous tetrahydrofuran (99.5%) from Acros Organics.

The solvents used for spectroscopic titrations were used as received from the supplier. Toluene (Uvasol®), ethyl acetate (Uvasol®), chloroform (Uvasol®), acetonitrile (Uvasol®) and methanol (Uvasol®) were purchased from Merck. Ultrapure reagent water was obtained by running demineralized water (by ion exchange) through a Milli-Q® ultrapure water purification system (Millipore Synthesis A10).

Absorption and fluorescence spectroscopy, thermogravimetric analysis, transmission electron microscopy, $N_2$ adsorption-desorption measurements, dynamic light scattering (DLS), mass spectrometry and NMR techniques were employed to characterize the synthesized molecules and materials and test their behavior towards the corresponding analytes.

$^1H$ and $^{13}C$ NMR spectra were recorded with a Varian Mercury 400 NMR spectrometer. Samples were dissolved in ($CDCl_3$), using residual proton signals as internal standards ($^1H$: δ[$CDCl_3$]=7.26 ppm and $^{13}C$: δ[$CDCl_3$]=77.16 ppm). Chemical shifts are represented in δ (ppm). Ultra-high-performance liquid chromatography electro-spray ionization mass spectrometry (UPLC-ESI-MS) was performed on a Waters Acquity UPLC (gradient mixtures of acetonitrile/water) with a Waters LCT Premier XE mass detector. Additionally, a Waters Alliance System with Waters Separations Module 2695, a Waters Diode Array Detector 996 and a Waters Mass Detector ZQ 2000 were used. Chromatographic separations were performed with a gradient of acetonitrile in water with 0.1% formic acid.

Absorption spectra and spectrophotometric titrations were acquired with a Specord 210 Plus spectrometer (Analytik Jena), using dilute solutions with an absorbance of about 0.1 at the absorption maximum. The binding constants were assessed with BindFit v0.5 software. Fluorescence spectra and titrations were carried out on a FluoroMax 4 spectrofluorometer (Horiba Jobin-Yvon).

Transmission electron microscopy (TEM) measurements were done with a FEI Talos™ F 200S operating at 200 kV. Samples were prepared on carbon thin film-modified copper grids (200 mesh) by drying 10 μL of a 0.1% (w/v) dispersion in ethanol. ImageJ software (National Institute of Health, US) was used for calculating the average diameter of the silica core particles and the shell thickness of the core-shell hybrids. Thermogravimetric analyses were carried out on a STA7200 (Hitachi High-Tech Analytical Science) thermobalance, using in a first step an oxidizing synthetic air atmosphere (80 mL $min^{-1}$) with a heating program consisting of a ramp of 10° C. $min^{-1}$ from 25° C. to 1000° C. and in a second step an isotherm (synthetic air, 80 mL $min^{-1}$) at 1000° C. for 10 min. $N_2$ adsorption-desorption isotherms were recorded with a Micromeritics ASAP2010 automated sorption analyzer. The samples were degassed for 3 h at 200° C. in a vacuum. The specific surface areas were calculated from the adsorption data in the low-pressure range using the Brunauer-Emmett-Teller (BET) model. DLS studies were conducted using a Malvern Zetasizer Nano ZS.

Example 1

Synthesis of N-((7-(2-hydroxyethoxy)benzo[c][1,2,5]oxadiazol 4-yl)carbamothioyl)benzamide according to formula (15):

(15)

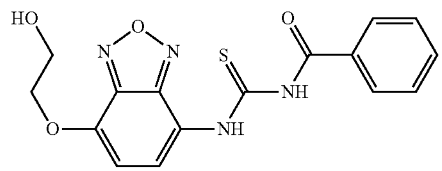

Compound 11 (0.025 g, 0.13 mmol) was dissolved in 1.6 mL of acetone. Benzoyl isothiocyanate (0.018 mL, 0.13 mmol) was added and a precipitate was formed. The precipitate was filtered, and compound 15 was obtained as a yellow solid (0.020 g, 43% yield). $^1H$-NMR (400 MHz, $CDCl_3$): δ(ppm)=13.49 (bs, 1H), 9.13 (bs, 1H), 8.75 (d, 1H), 7.94 (d, 2H), 7.68 (t, 1H), 7.57 (t, 2H), 6.66 (d, 1H), 4.36 (t, 2H), 4.10 (t, 2H). $^{13}C$-NMR (100 MHz, $CDCl_3$): δ(ppm)=183.29, 177.22, 167.02, 146.85, 145.23, 144.82, 134.07, 131.24, 129.20, 127.26, 122.37, 119.33, 109.71, 107.36, 71.03, 60.98. HRMS (ESI+): m/z calculated for $C_{16}H_{15}N_4O_4S$ ($[M+H]^+$359.0814, found ($[M+H]^+$ 359.0786. UPLC: tR=4.06 min (100% peak area).

Example 2

Synthesis of 2-((7-(3-benzoylthioureido)benzo[c][1,2,5]oxadiazol-4-yl)(dimethyl) according to formula (16):

(16)

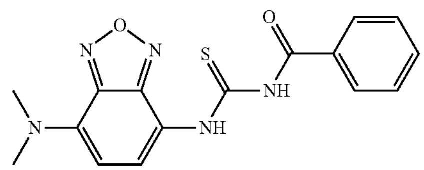

Compound 12 (0.145 g, 0.70 mmol) was dissolved in 4.0 mL of acetone. Benzoyl isothiocyanate (0.095 mL, 0.70 mmol) was added and a precipitate was formed. The precipitate was filtered, and compound 16 was obtained as a red solid (0.11 g, 50% yield). $^1H$-NMR (400 MHz, $CDCl_3$): δ(ppm)=13.18 (bs, 1H), 9.11 (bs, 1H), 8.49 (d, 1H), 7.94 (d, 2H), 7.66 (t, 1H), 7.56 (t, 2H), 6.09 (d, 1H), 3.34 (s, 6H). $^{13}C$-NMR (100 MHz, $CDCl_3$): δ(ppm)=176.74, 166.88, 146.97, 145.42, 138.09, 133.75, 131.55, 129.22, 127.58, 125.44, 113.54, 104.17, 42.05. HRMS (ESI+): m/z calculated for $C_{16}H_{15}N_5O_2S$ ($[M+H]^+$342.1025, found ($[M+H]^+$ 342.1072. UPLC: tR=5.03 min (100% peak area).

Example 3

Synthesis of 2-((7-(3-(4-nitrophenyl)thioureido)benzo[c][1,2,5]oxadiazol-4-yl)amino)ethyl methacrylate according to formula (17):

(17)

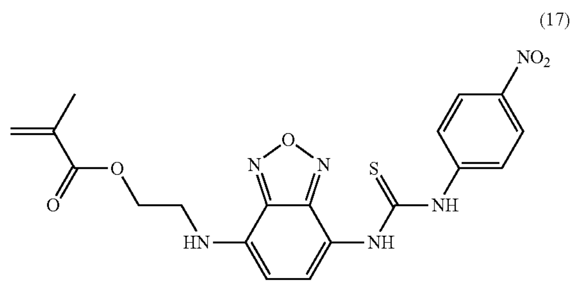 [SMILES: C=C(C)C(=O)OCCNc1ccc(NC(=S)Nc2ccc([N+](=O)[O-])cc2)c2nonc12]

Compound 13 (0.079 g, 0.22 mmol) was dissolved in 4.0 mL of acetone. 4-Nitrophenyl isothiocyanate (0.040 mL, 0.22 mmol) was added and a precipitate was formed. The precipitate was filtered, and compound 17 was obtained as an orange solid. (0.040 g, 43% yield). $^1$H-NMR (400 MHz, $CDCl_3$): δ(ppm)=8.25 (d, 2H), 8.00 (bs, 2H), 7.68 (d, 2H), 7.56 (d, 1H), 6.20 (d, 1H), 6.14 (m, 1H), 5.63 (m, 1H), 5.46 (m, 1H), 4.48 (m, 2H), 3.68 (m, 2H), 1.96 (m, 3H). $^{13}$C-NMR (100 MHz, $CDCl_3$): δ(ppm)=181.24, 167.20, 146.99, 137.09, 136.78, 125.85, 124.67, 122.62, 101.31, 99.41, 62.87, 43.29, 30.50, 18.26. HRMS (ESI+): m/z calculated for $C_{19}H_{19}N_6O_5S$ ($[M+H]^+$443.1138, found ($[M+H]^+$443.1156. UPLC: tR=4.43 min (100% peak area).

Example 4

Synthesis of 2-((7-(3-benzoylthioureido)benzo[c][1,2,5]oxadiazol-4-yl)amino)ethyl methacrylate according to formula (18):

(18)

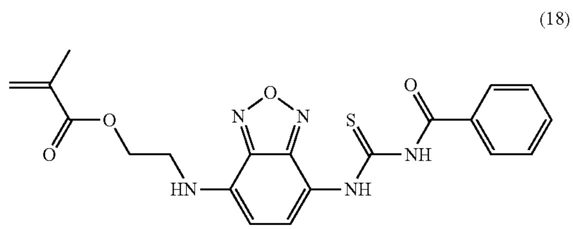 [SMILES: C=C(C)C(=O)OCCNc1ccc(NC(=S)NC(=O)c2ccccc2)c2nonc12]

Compound 13 (0.102 g, 0.39 mmol) was dissolved in 5.0 mL of acetone. Benzoyl isothiocyanate (0.056 mL, 0.39 mmol) was added and a precipitate was formed. The precipitate was filtered, and compound 18 was obtained as an orange solid (0.1 g, 60% yield). $^1$H-NMR (400 MHz, $CDCl_3$): δ(ppm)=13.14 (bs, 1H), 9.11 (bs, 1H), 8.45 (d, 1H), 7.93 (m, 2H), 7.66 (t, 1H), 7.55 (t, 2H), 6.22 (d, 1H), 6.14 (m, 1H), 5.62 (m, 1H), 5.27 (m, 1H), 4.47 (m, 2H), 3.67 (m, 2H), 1.96 (s, 3H). $^{13}$C-NMR (100 MHz, $CDCl_3$): δ(ppm)=167.24, 146.65, 145.04, 136.10, 134.66, 134.13, 131.79, 129.56, 127.84, 126.75, 126.43, 101.59, 62.77, 55.34, 42.94, 31.20, 18.61. HRMS (ESI+): m/z calculated for $C_{20}H_{19}N_5O_4S$ ($[M+H]^+$426.1236, found ($[M+H]^+$426.1236. UPLC: tR=4.16 min (100% peak area).

Example 5

Synthesis of 2-((7-(3-benzoylureido)benzo[c][1,2,5]oxadiazol-4-yl)(methyl)amino)ethyl methacrylate according to formula (19):

(19)

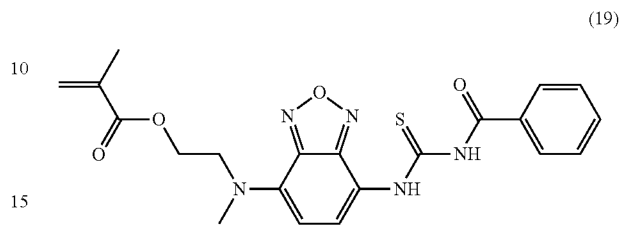

Compound 14 (0.50 g, 1.81 mmol) was dissolved in 5.0 mL of acetone. Benzoyl isothiocyanate (0.25 mL, 1.81 mmol) was added and a precipitate was formed. The precipitate was filtered, and compound 19 was obtained as a red solid (0.72 g, 90% yield). $^1$H-NMR (400 MHz, $CDCl_3$): δ(ppm)=8.53 (d, 1H), 7.95 (d, 2H), 7.67 (t, 1H), 7.56 (t, 2H), 6.15 (d, 1H), 5.88 (s, 1H), 5.47 (s, 1H), 4.43 (t, 2H), 4.31 (t, 2H), 3.24 (s, 3H), 1.88 (s, 3H). $^{13}$C-NMR (100 MHz, $CDCl_3$): δ(ppm)=176.68, 167.05, 166.88, 146.88, 144.97, 136.72, 135.79, 133.76, 131.46, 129.19, 127.56, 125.88, 125.19, 113.96, 104.64, 62.58, 52.84, 40.07, 18.13. HRMS (ESI+): m/z calculated for $C_2H_{22}N_5O_4S$ ($[M+H]^+$440.1392, found ($[M+H]^+$440.1441. UPLC: tR=4.41 min (100% peak area).

Example 6

Synthesis of 2-((7-(3-benzoylguanidino)benzo[c][1,2,5]oxadiazol-4-yl)(dimethyl) according to formula (20):

(20)

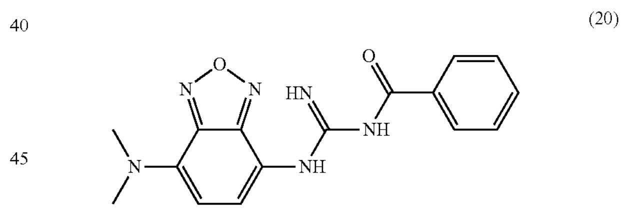

Compound 16 (0.085 g, 0.25 mmol) was suspended in 5.0 mL of a mixture of dry $MeCN/CH_2Cl_2$ (2:1). The suspension was cooled to 0° C. and hexamethyldisilazane (0.52 mL, 2.50 mmol) was added. Afterwards, N-(3-dimethylaminopropyl)-N'-ethylcarbodiimide hydrochloride (EDC) (0.24 g, 2.5 mmol) was added to the suspension and the reaction mixture was stirred overnight at room temperature. The reaction mixture was diluted with 20 mL of EtOAc and extracted with 20 mL of $H_2O$ (3×). The organic phase was collected, dried over $MgSO_4$ and concentrated in a vacuum. Compound 20 was obtained as an orange solid after purification by silica column chromatography eluting with EtOAc (14 mg, 17% yield). $^1$H-NMR (400 MHz, $CDCl_3$): δ(ppm)=8.06 (d, 2H), 7.47 (m, 1H), 7.41 (t, 2H), 7.10 (d, 1H), 3.29 (s, 6H). $^{13}$C-NMR (100 MHz, $CDCl_3$): δ(ppm)=175.94, 157.17, 147.81, 145.94, 137.78, 131.97, 131.53, 128.31, 127.97, 127.24, 126.48, 104.97, 42.10. HRMS (ESI+): m/z calculated for $C_{16}H_{16}N_6O_2$ ($[M+H]^+$325.1413, found ($[M+H]^+$325.1436. UPLC: tR=3.15 min (100% peak area).

Example 7

Synthesis of 2-((7-(3-(4-nitrophenyl)guanidino)benzo[c][1,2,5]oxadiazol-4-yl)amino)ethyl methacrylate according to formula (21):

(21)

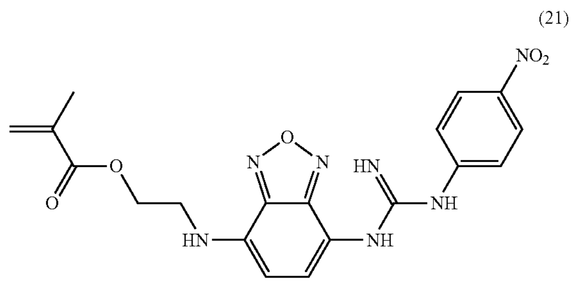 [SMILES: C=C(C)C(=O)OCCNc1ccc(NC(=N)Nc2ccc([N+](=O)[O-])cc2)c2nonc12]

Compound 21 was synthesized according to the described procedure by Blight et al., Nat. Chem. 2011, 3, 244-248 applied for the synthesis of other guanidines. Compound 17 (0.50 g, 1.13 mmol) was dissolved in $CHCl_3$ (10.0 mL). To this solution HgO (0.350 g, 1.60 mmol) and methanolic ammonia (2M, 7 mL) were added. The reaction mixture was stirred overnight at room temperature. It was then filtered through celite and concentrated under pressure. The resulting solid was dissolved in acetic acid (2M, 30 mL) and stirred for 1 h, then filtered through celite and adjusted to pH 8.0 by addition of NaOH (10 M). The precipitate was collected, washed with water and dried in a vacuum. The solid was suspended in $Et_2O$:MeOH (7.5:1, 50 mL) and then filtered and concentrated under reduced pressure. Compound 21 was obtained as a red solid (0.034 g, 7% yield). $^1$H-NMR (400 MHz, $CDCl_3$): δ(ppm)=8.18 (dt, 2H), 7.37 (dt, 2H), 7.22 (d, 1H), 6.15 (m, 1H), 6.14 (m, 1H), 5.62 (m, 1H), 4.45 (t, 2H), 3.64 (q, 2H), 2.04 (s, 3H). $^{13}$C-NMR (100 MHz, $CDCl_3$): δ(ppm)=167.42, 152.00, 146.88, 145.17, 143.68, 135.70, 134.20, 126.53, 125.50, 122.39, 114.3, 101.68, 62.26, 42.60, 18.30. HRMS (ESI+): m/z calculated for $C_{19}H_{19}N_7O_5$ ($[M+H]^+$426.1526, found ($[M+H]^+$ 426.1551. UPLC: tR=1.61 min (100% peak area).

Example 8

Synthesis of 2-((7-(3-benzoylguanidino)benzo[c][1,2,5]oxadiazol-4-yl)amino)ethyl methacrylate according to formula (22):

(22)

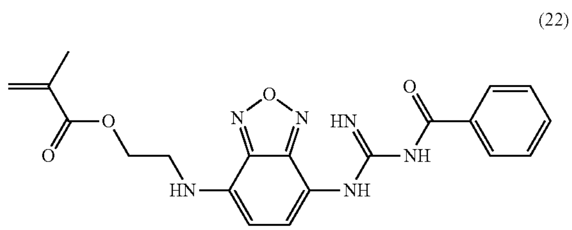 [SMILES: C=C(C)C(=O)OCCNc1ccc(NC(=N)NC(=O)c2ccccc2)c2nonc12]

Compound 18 (0.098 g, 0.23 mmol) was suspended in 7 mL of a mixture of dry $MeCN/CH_2Cl_2$ (2:1). The suspension was cooled to 0° C. and hexamethyldisilazane (0.482 mL, 2.30 mmol) was added. Afterwards, EDC (0.22 g, 1.15 mmol) was added to the suspension and the reaction mixture was stirred at room temperature for two days. The reaction mixture was diluted with 40 mL of EtOAc and extracted with 100 mL of $H_2O$ (3×). The organic phase was collected, dried over $MgSO_4$ and concentrated in a vacuum. Compound 18 was obtained as an orange solid after purification by silica column chromatography with mobile phase $CH_2Cl_2$/EtOAc 3:7 (52 mg, 55% yield). $^1$H-NMR (400 MHz, $CDCl_3$): δ(ppm)=8.06 (d, 2H), 7.53 (t, 1H), 7.45 (m, 2H), 7.88 (d, 1H), 6.19 (d, 1H), 6.15 (m, 1H), 5.62 (m, 1H), 5.18 (t, 1H), 4.47 (t, 2H), 3.66 (m, 2H), 1.96 (s, 1H). $^{13}$C-NMR (100 MHz, $CDCl_3$): δ(ppm)=173.17, 167.38, 155.57, 146,97, 145.24, 135.76, 134.77, 134.23, 132.46, 128,46, 128.41, 127.73, 126.44, 101.63, 62.40, 42.63, 18.29. HRMS (ESI+): m/z calculated for $C_{20}H_{20}N_6O_4$ ($[M+H]^+$ 409.1624, found ($[M+H]^+$409.1669. UPLC: tR=2.45 min (100% peak area).

Example 9

Synthesis of 2-((7-(3-benzoylguanidino)benzo[c][1,2,5]oxadiazol-4-yl)(methyl)amino)ethyl methacrylate according to formula (23):

(23)

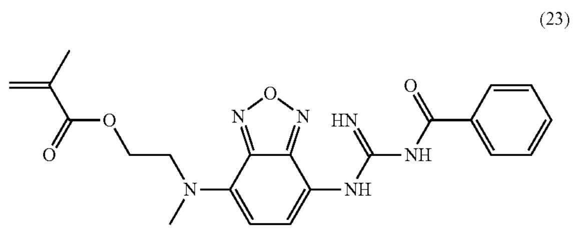 [SMILES: C=C(C)C(=O)OCCN(C)c1ccc(NC(=N)NC(=O)c2ccccc2)c2nonc12]

Compound 19 (0.91 mmol, 0.40 g) and EDC (4.55 mmol, 0.89 g) were dissolved in a mixture of dry MeCN (15 mL) and $CH_2Cl_2$ (6 mL). Afterwards, hexamethyldisilazane (9.10 mmol, 2.12 mL) was dropwise added at 0° C. and the reaction mixture was stirred overnight at room temperature. The solution was diluted with 100 mL of EtOAc and the organic phase was extracted with 100 mL of deionized water (3×). The organic phase was collected, dried over $MgSO_4$ and concentrated in a vacuum. The reaction mixture was then purified by silica column chromatography with a mixture of $CH_2Cl_2$:EtOAc (9:1) as the mobile phase to give compound 23 as a red solid (0.34 g, 88% yield). $^1$H-NMR (400 MHz, $CDCl_3$): δ(ppm)=8.07 (d, 2H), 7.51 (t, 1H), 7.43 (t, 2H), 7.09 (d, 1H), 6.10 (d, 1H), 5.89 (s, 1H), 5.47 (m, 1H), 4.42 (t, 2H), 4.29 (t, 2H), 3.12 (s, 3H), 1.81 (s, 3H). $^{13}$C-NMR (100 MHz, $CDCl_3$): δ(ppm)=174.74, 167.05, 156.55, 147.82, 145.60, 136.29, 136.16, 135.87, 131.79, 128.33, 128.20, 126.54, 125.80, 115.94, 105.43, 62.67, 52.79, 40.13, 18.12. HRMS (ESI+): m/z calculated for $C_{21}H_{23}N_6O_4$ ($[M+H]^+$422.1703, found ($[M+H]^+$423.1843. UPLC: tR=1.38 min (100% peak area).

Example 10

Synthesis of benzamido((7((2-(methacrycrykoyloxy)ethypamino)benzo[c][1,2,5]oxadiazol-4-yl)amino))methaniminium chloride according to formula (24):

(24)

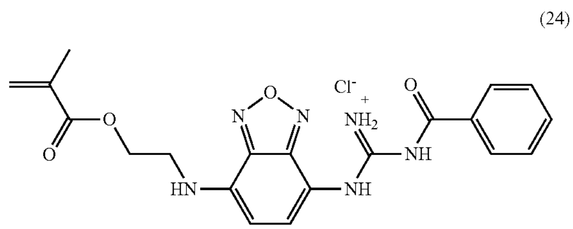 [SMILES: C=C(C)C(=O)OCCNc1ccc(NC(=N)NC(=O)c2ccccc2)c2nonc12 ; [Cl-]]

Compound 22 (0.011 g, 0.27 mmol) was suspended in 2 mL of HCl (1M) by means of ultrasonication and stirred at room temperature for 4 h to obtain a yellow suspension. The suspension was diluted with $CH_2Cl_2$ and extracted with 100 mL of $H_2O$ (3×). The organic phase was collected, dried over $MgSO_4$ and concentrated in a vacuum. Compound 24 was obtained as an orange solid (0.008 g, 67% yield). $^1$H-NMR (400 MHz, $CDCl_3$): δ(ppm)=8.19 (d, 2H), 7.59 (t, 1H), 7.50 (m, 2H), 7.22 (d, 1H), 6.20 (d, 1H), 6.15 (m, 1H), 5.63 (m, 1H), 5.36 (t, 1H), 4.48 (t, 2H), 3.68 (m, 2H), 1.96 (s, 1H). $^{13}$C-NMR (100 MHz, $CDCl_3$): δ(ppm)=175.60, 158.92, 147.86, 145.99, 137.81, 136.47, 132.00, 131.66, 128.50, 128.49, 128.40, 127.31, 127.01, 104.98, 54.84, 42.05, 18.15. HRMS (ESI+): m/z calculated for $C_{16}H_{16}N_6O_2$ ([M−Cl])$^+$409.1624, found ([M−Cl])$^+$ 409.1644. UPLC: tR=3.15 min (100% peak area).

Example 11

Synthesis of benzamido((7-((2-(methacrycrykoyloxy) ethyl)(methyl)amino)benzo[c][1,2,5]oxadiazol-4-yl)amino) methaniminium chloride according to formula (25):

(25)

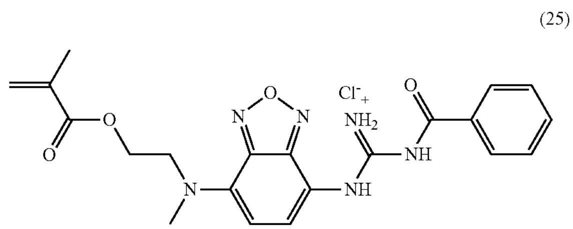 [SMILES: C=C(C)C(=O)OCCN(C)c1ccc(NC(=N)NC(=O)c2ccccc2)c2nonc12 ; [Cl-]]

Compound 23 (0.12 mmol, 0.05 g) was suspended in 15 mL of HCl (1M) by means of ultrasonication. The reaction mixture was stirred overnight at room temperature followed by dilution with 10 mL of $H_2O$. The aqueous phase was then extracted with 20 mL of $CH_2Cl_2$ (3×). The organic phase was collected, dried over $Na_2SO_4$ and concentrated in a vacuum. Compound 23 was obtained as a yellow solid (0.046, 84% yield). $^1$H-NMR (400 MHz, $CDCl_3$): δ(ppm)=8.415 (d, 2H), 7.68 (t, 1H), 7.58 (t, 2H), 7.44 (d, 1H), 6.13 (d, 1H), 5.93 (s, 1H), 5.51 (m , 1H), 4.45 (t, 2H), 4.34 (t, 2H), 3.29 (s, 3H), 1.83 (s, 3H). $^{13}$C-NMR (100 MHz, $CDCl_3$): δ(ppm)=169.71, 167.03, 155.34, 146.90, 145.41, 139.14, 135.77, 134.43, 131.79, 130.47, 120.08, 128.56, 127.30, 106.27, 103.84, 62.69, 53.29, 40.70, 18.14. HRMS (ESI-): m/z calculated for $C_{12}H_{12}N_4O_5$ ([M−H])$^-$458.1469, found ([M−H])$^-$457.1371. UPLC: tR=2.13 min (100% peak area).

Example 12

Normalized UV/vis absorption and emission ($\lambda_{ex}$=465 nm) spectra at a fixed concentration of thiourea-based compound 19 were recorded in $CHCl_3$, toluene, acetonitrile (MeCN) and methanol (MeOH), yielding Stokes shifts between 160 nm and 230 nm, respectively. This positive solvatochromism is ascribed to the effective intramolecular charge transfer from the two electron-donating groups (thiourea and tertiary amine) to the electron-accepting benzodiazole as the solvent polarity increases (FIG. 1-4).

Example 13

Figure 5:
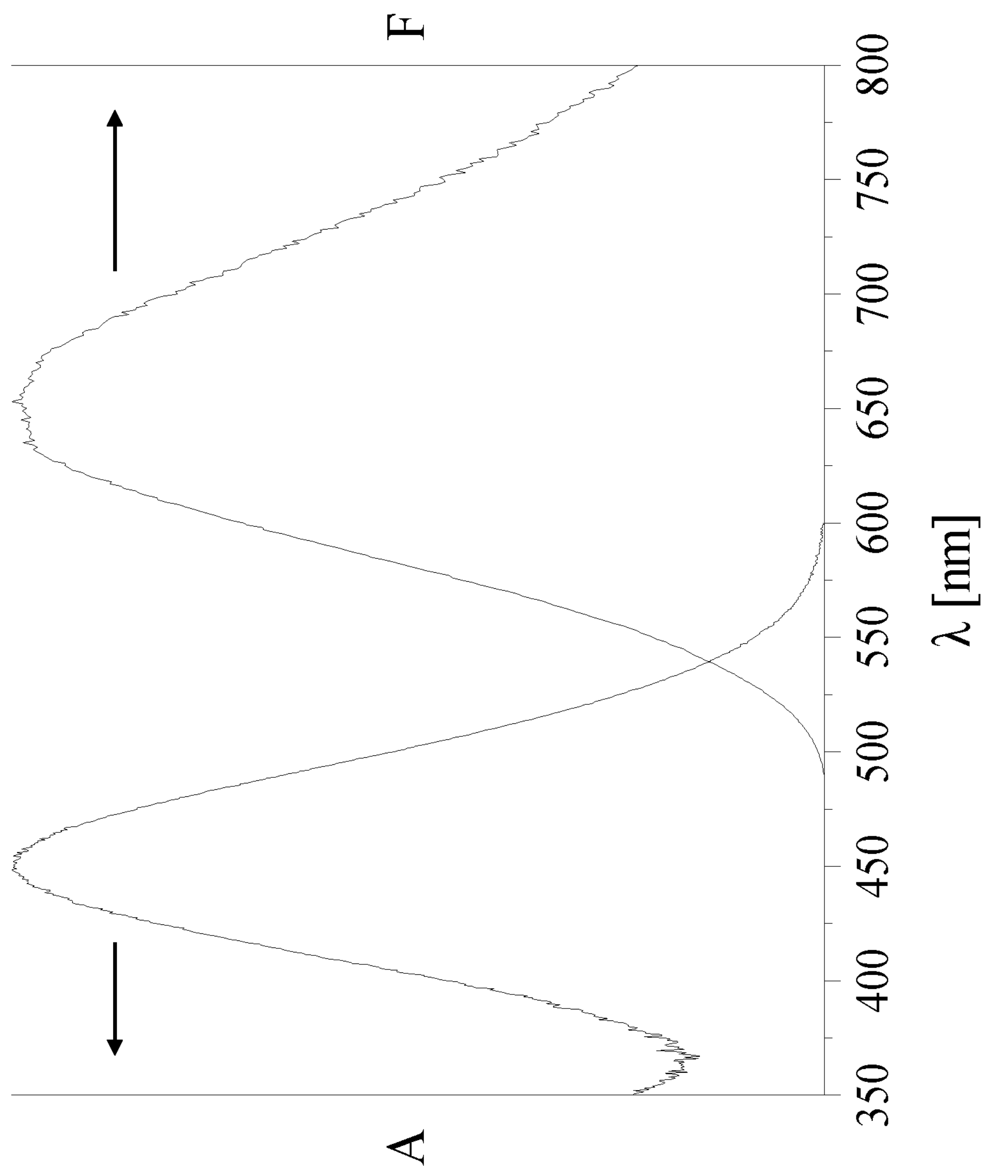
FIG. 5 shows the normalized UV/vis absorption and emission spectra of guanidine-based compound 23 (c[23]=$1\times10^{-5}$ M) in ethyl acetate (EtOAc). Absorption and emission are separated by a Stokes shift of >200 nm. Therein the expression "c[23]" stands for the concentration of the compound 23.
Figure 6:
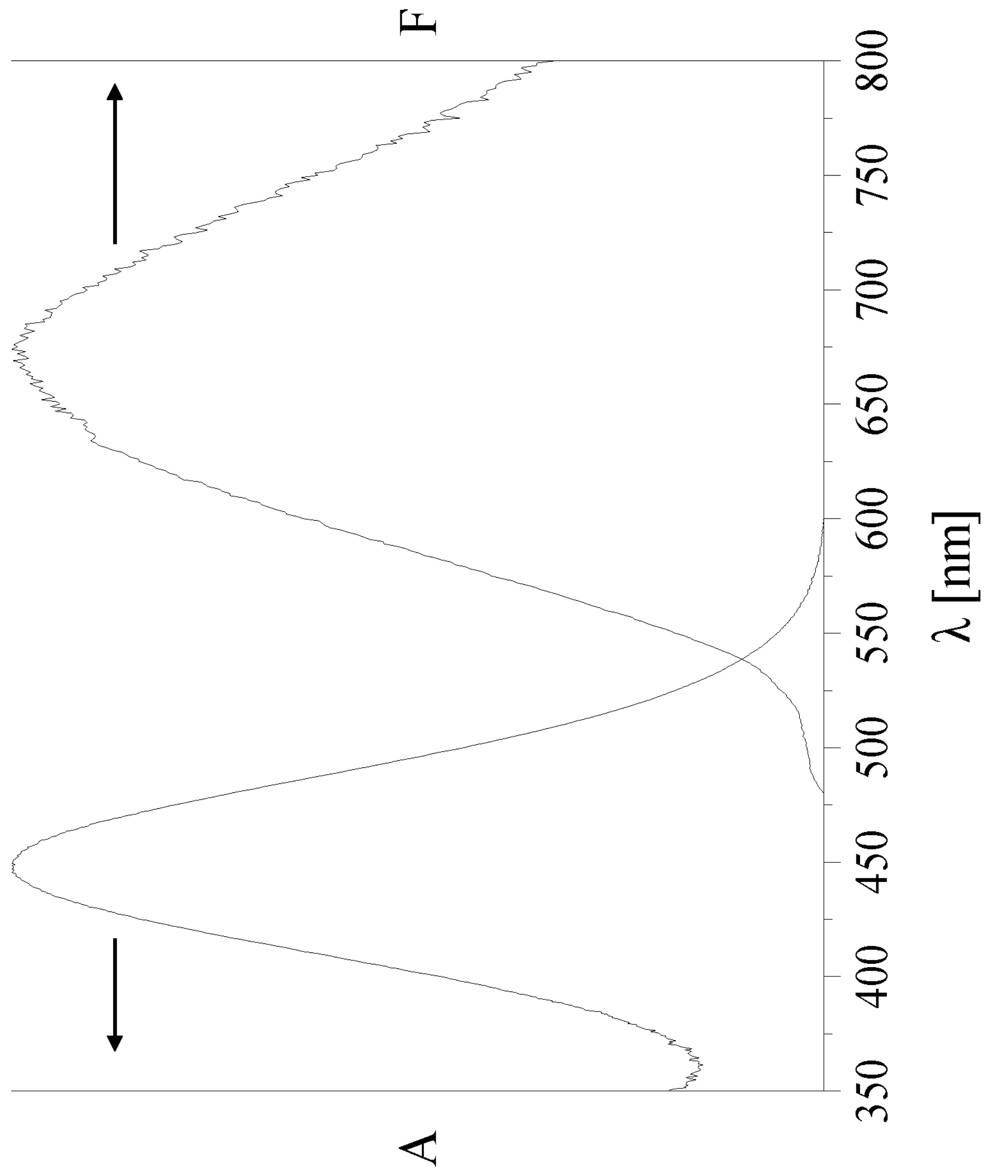
FIG. 6 shows the normalized UV/vis absorption and emission spectra of guanidine-based compound 23 (c[23]=$1\times10^{-5}$ M) in MeCN. Absorption and emission are separated by a Stokes shift of >220 nm.
Figure 7:
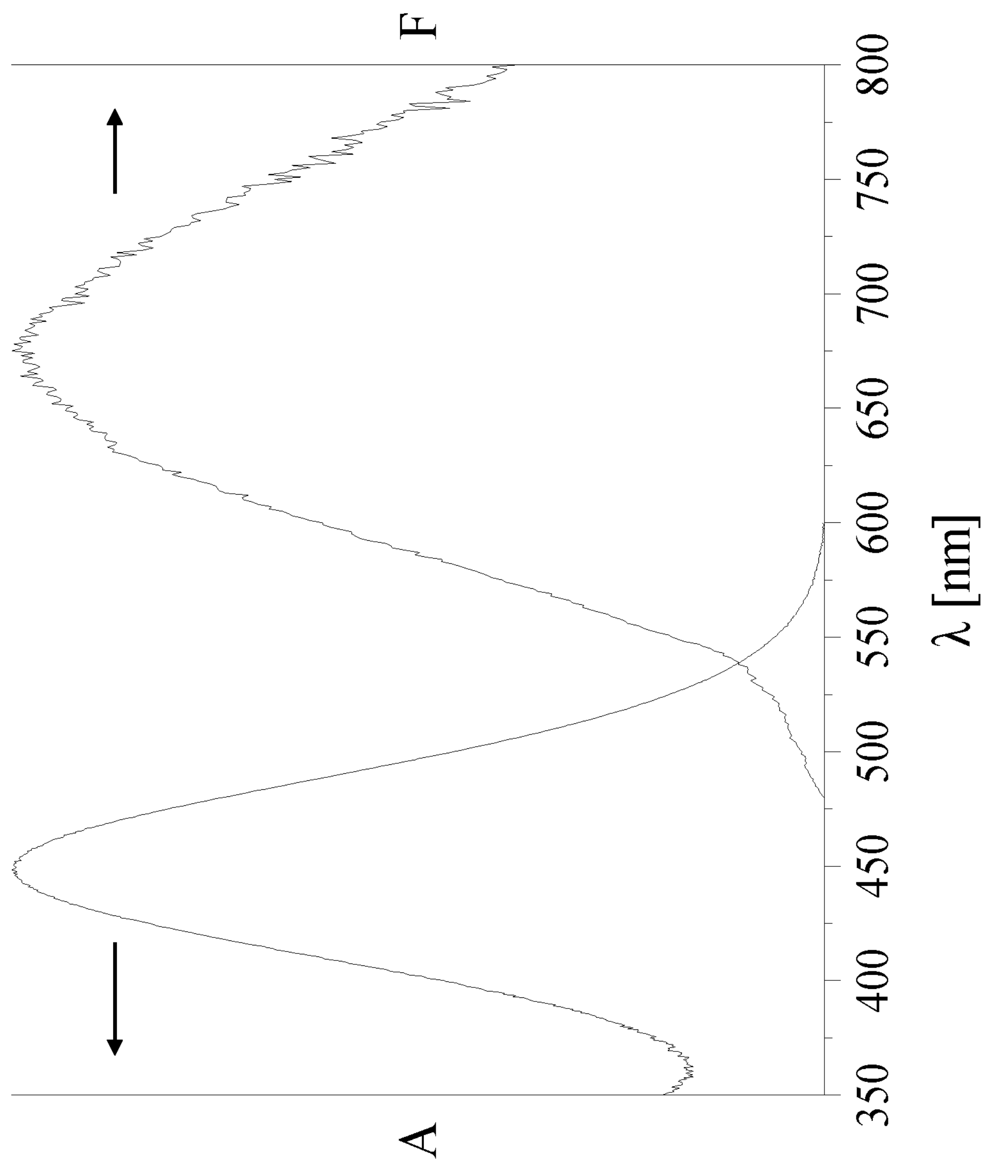
FIG. 7 shows the normalized UV/vis absorption and emission spectra of guanidine-based compound 23 (c[23]=$1\times10^{-5}$ M) in acetonitrile/water mixture ($MeCN/H_2O$) with 5 vol % $H_2O$. Absorption and emission are separated by a Stokes shift of >220 nm.

Normalized UV/vis absorption and emission ($\lambda_{ex}$=448 nm) spectra of guanidine-based compound 23 at a fixed concentration were recorded in EtOAc, MeCN and in a MeCN/$H_2O$ mixture with 5 vol % $H_2O$. Very large Stokes shifts between 200 nm and 230 nm were observed (FIG. 5-7). This example illustrates how the functionalization of a benzodiazole core with a polar guanidine group results in a fluorescent organic molecule soluble in polar organic solvents and polar organic solvent/water mixtures while showing very strongly Stokes shifted fluorescence.

Example 14

Figure 8:
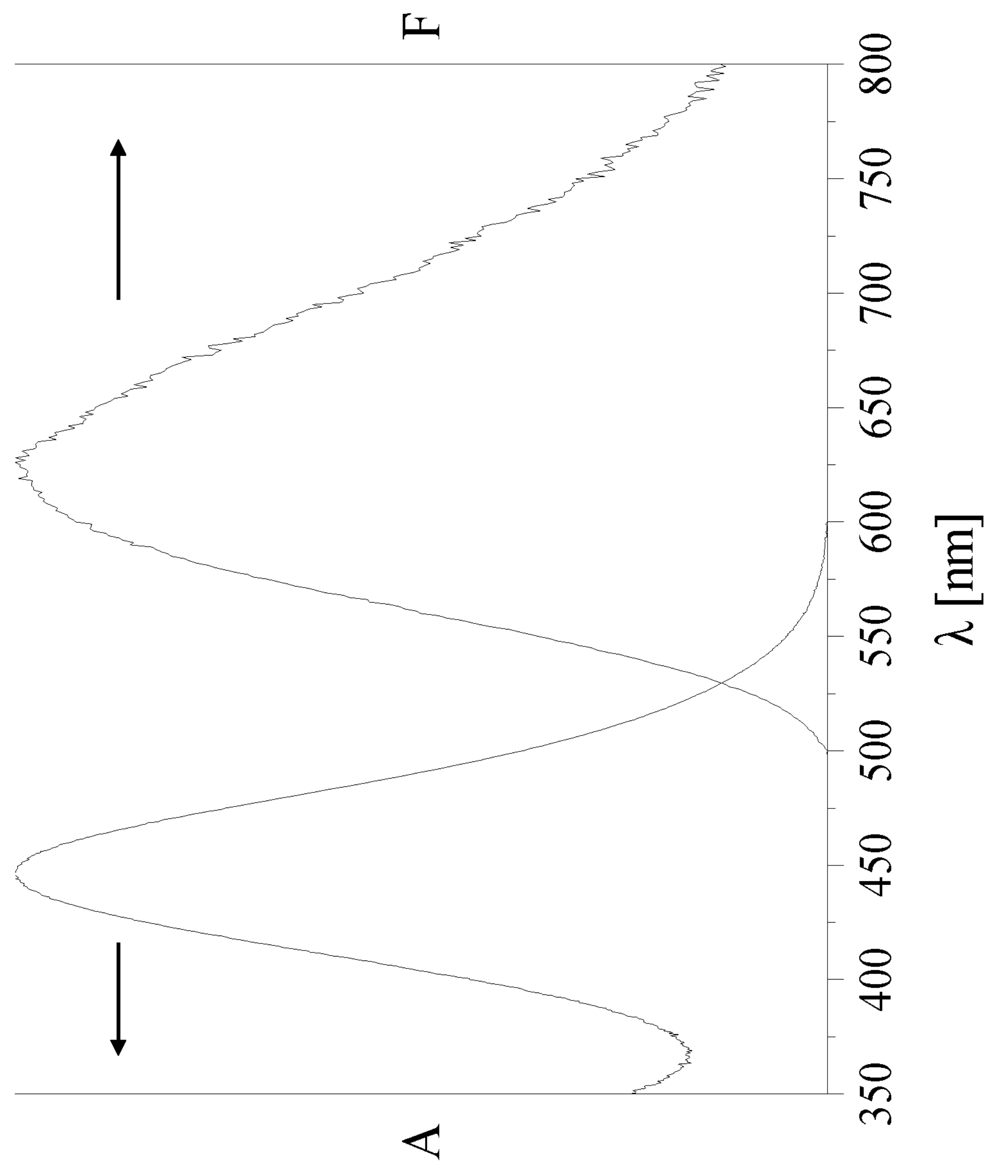
FIG. 8 shows normalized UV/vis absorption and emission spectra of guanidinium-based compound 25 (c[25]=$1\times10^{-5}$ M) in $CHCl_3$. Absorption and emission are separated by a Stokes shift of >180 nm. Therein the expression "c[25]" stands for the concentration of the compound 25.
Figure 9:
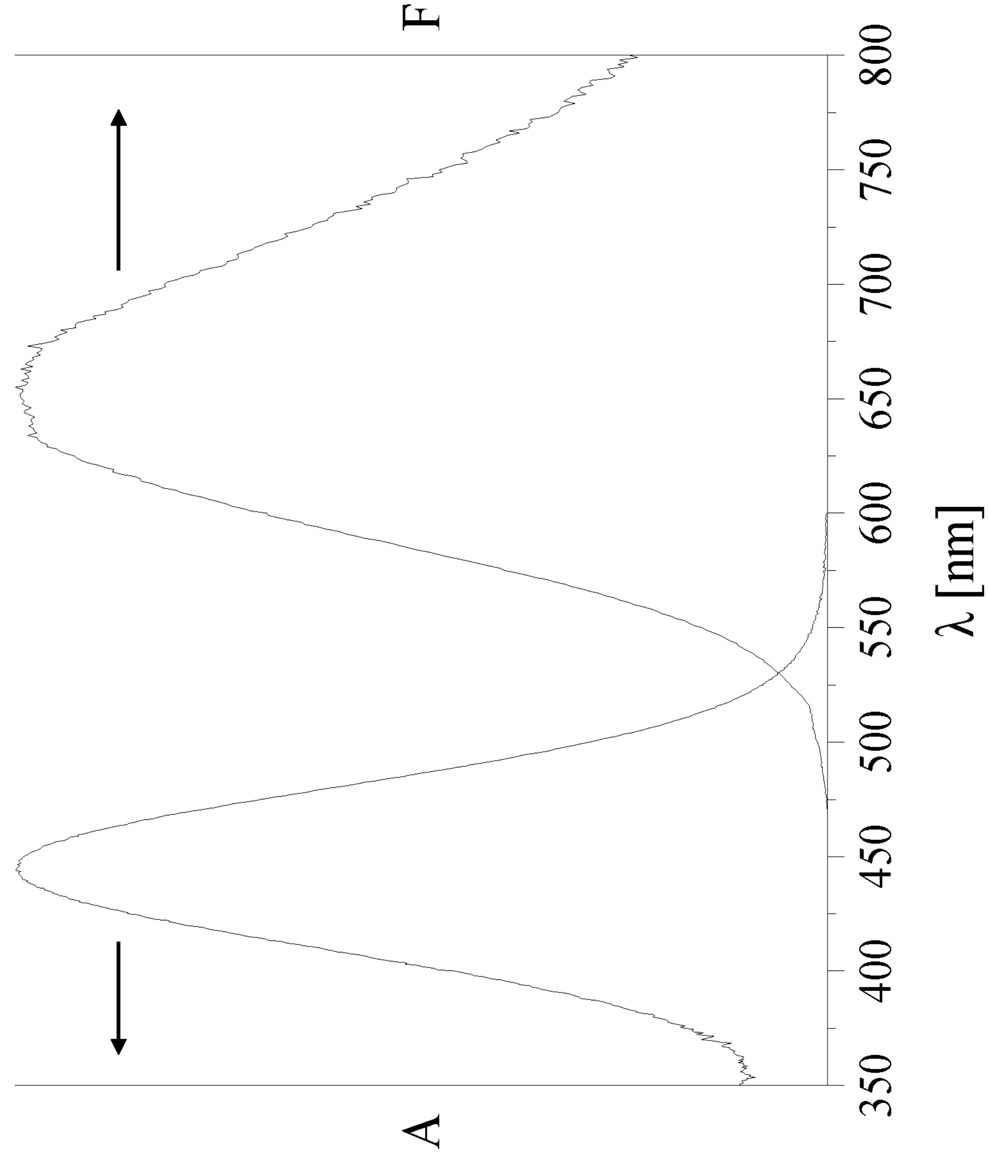
FIG. 9 shows normalized UV/vis absorption and emission spectra of guanidinium-based compound 25 ($c[25]=1\times10^{-5}$ M) in MeCN. Absorption and emission are separated by a Stokes shift of >210 nm.

Normalized UV/vis absorption and emission spectra of guanidinium-based compound 25 at a fixed concentration were recorded in $CHCl_3$ and MeCN. Sizable Stokes shifts of 180 nm and 210 nm were observed (FIGS. 8 and 9) as a result of the effective intramolecular charge transfer process established from the two electron-donating groups (guanidinium and tertiary amine) to the electron-accepting benzodiazole in solvents of different polarity.

Example 15

Figure 10:
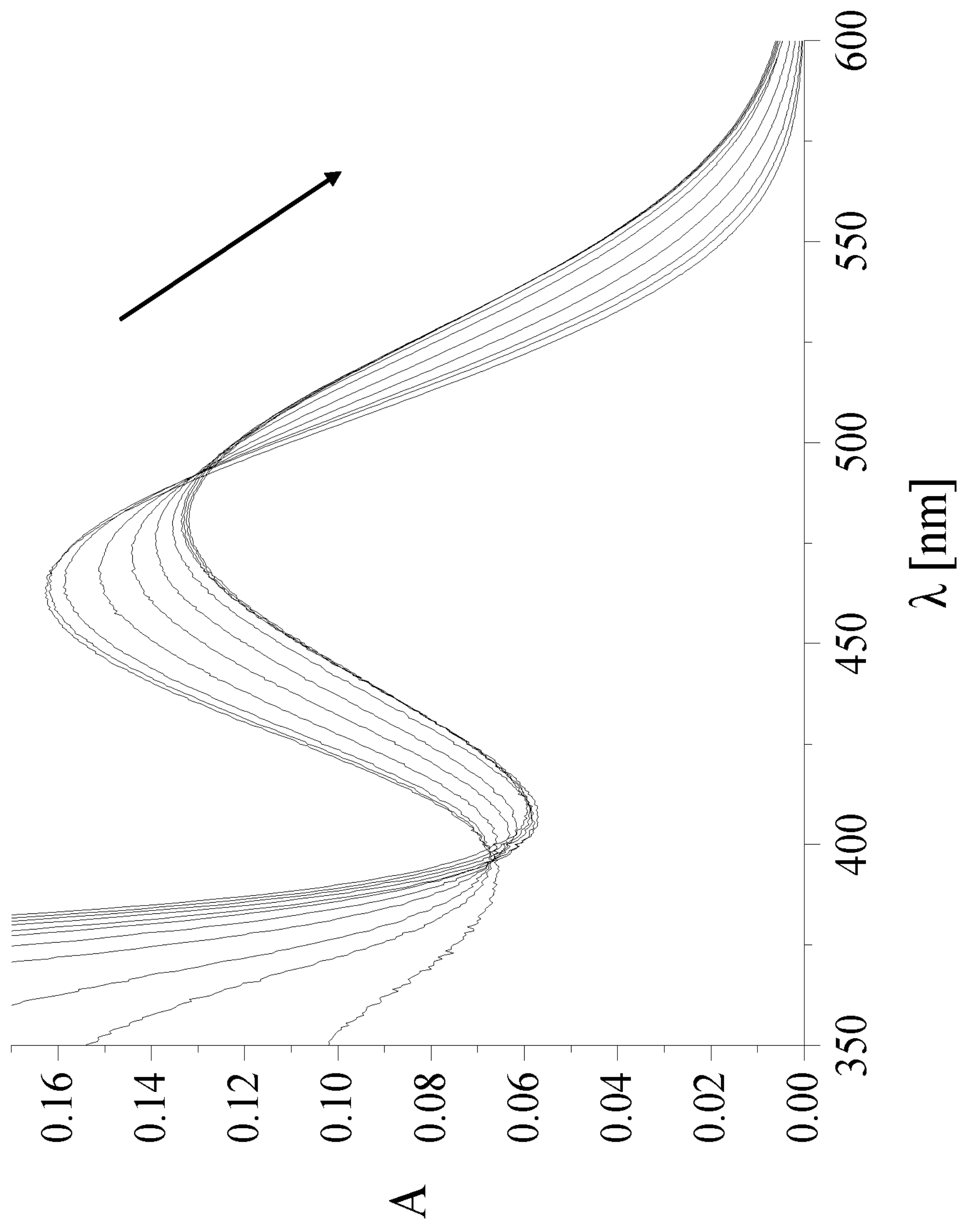
FIG. 10 shows UV/vis absorption spectra of the titration of thiourea-based compound 19 ($c[19]=2.2\times10^{-5}$ M) with enoxacin tetrabutylammonium (ENOX-TBA) salt in MeCN. Concentrations of ENOX-TBA [in $10^{-5}$ M]: 0, 0.2, 0.4, 0.9, 1.3, 1.8, 2.2, 2.9, 3.5, 4.2 to 4.8. The band shows a decrease and red shift. The concentration of compound 19 was kept constant during the titration.
Figure 11:
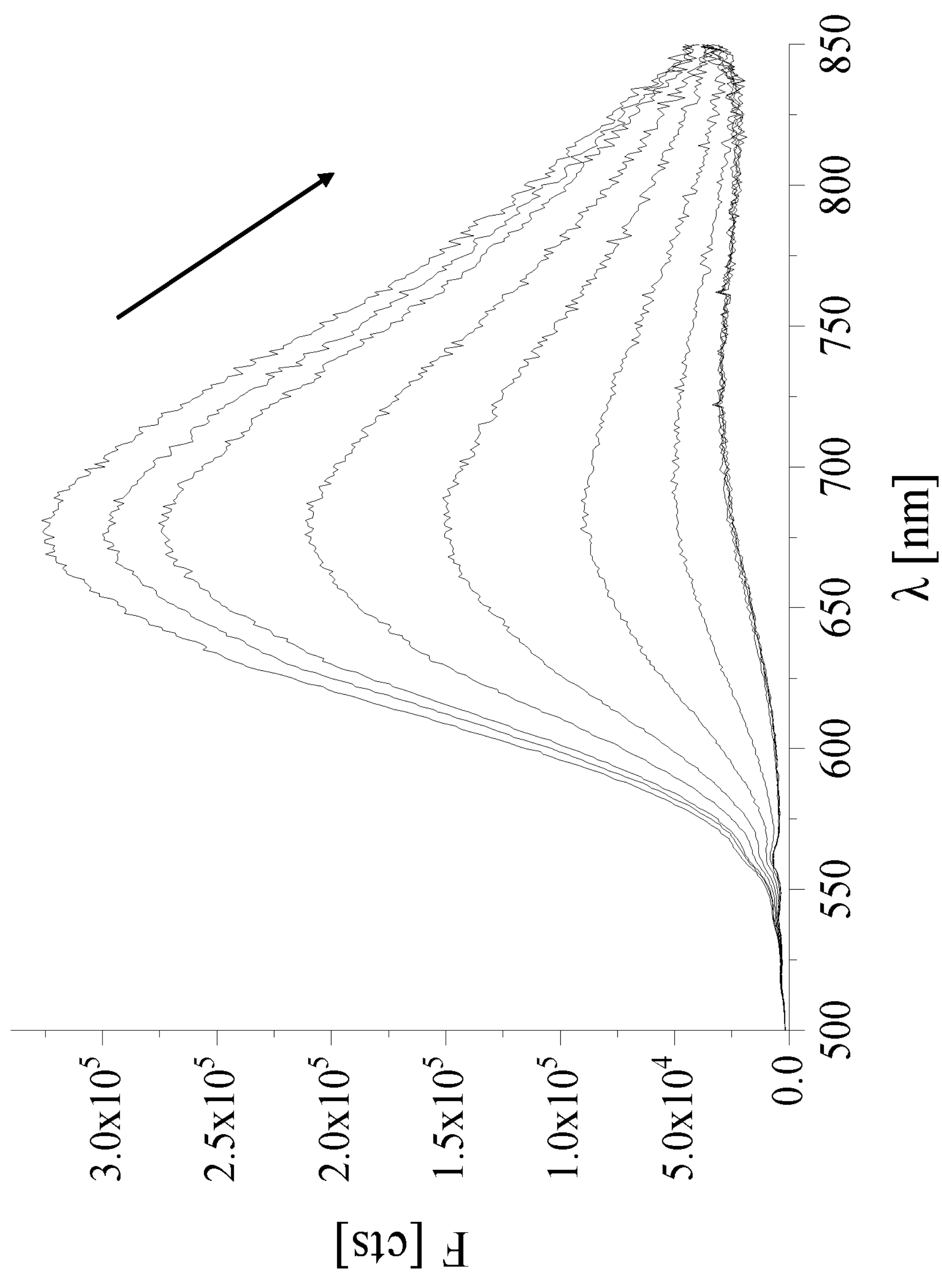
FIG. 11 shows a decrease and red shift in fluorescence emission of compound 19 upon titration with increasing concentrations of ENOX-TBA in MeCN. Conditions as in FIG. 10.

This example illustrates the titration of the thiourea-based compound 19 with the ammonium salt of the antibiotic enoxacin (ENOX-TBA) in MeCN. A decrease and red shift of the band at 462 in absorption (FIG. 10) confirms the binding of the carboxylate moiety of ENOX-TBA to the thiourea recognition site of compound 19 by means of hydrogen bond interactions in the ground state. The bathochromic shift of the absorption band upon binding can be rationalized considering that the donor-acceptor interaction between the thiourea and benzoxadiazole is reinforced with the charge donation of the electron-rich carboxylate anion to the thiourea through such supramolecular interactions. These changes in the ground state are accompanied by a quenching and a red shift of the fluorescence emission response of 19 (FIG. 11) upon analyte binding, demonstrating the utility of these probes as fluorescent indicators. The estimated binding constant for this interaction was calculated to be $K_{19}$/ENOX-TBA=4.3x$10^{-6}$ in MeCN.

Example 16

Figure 12:
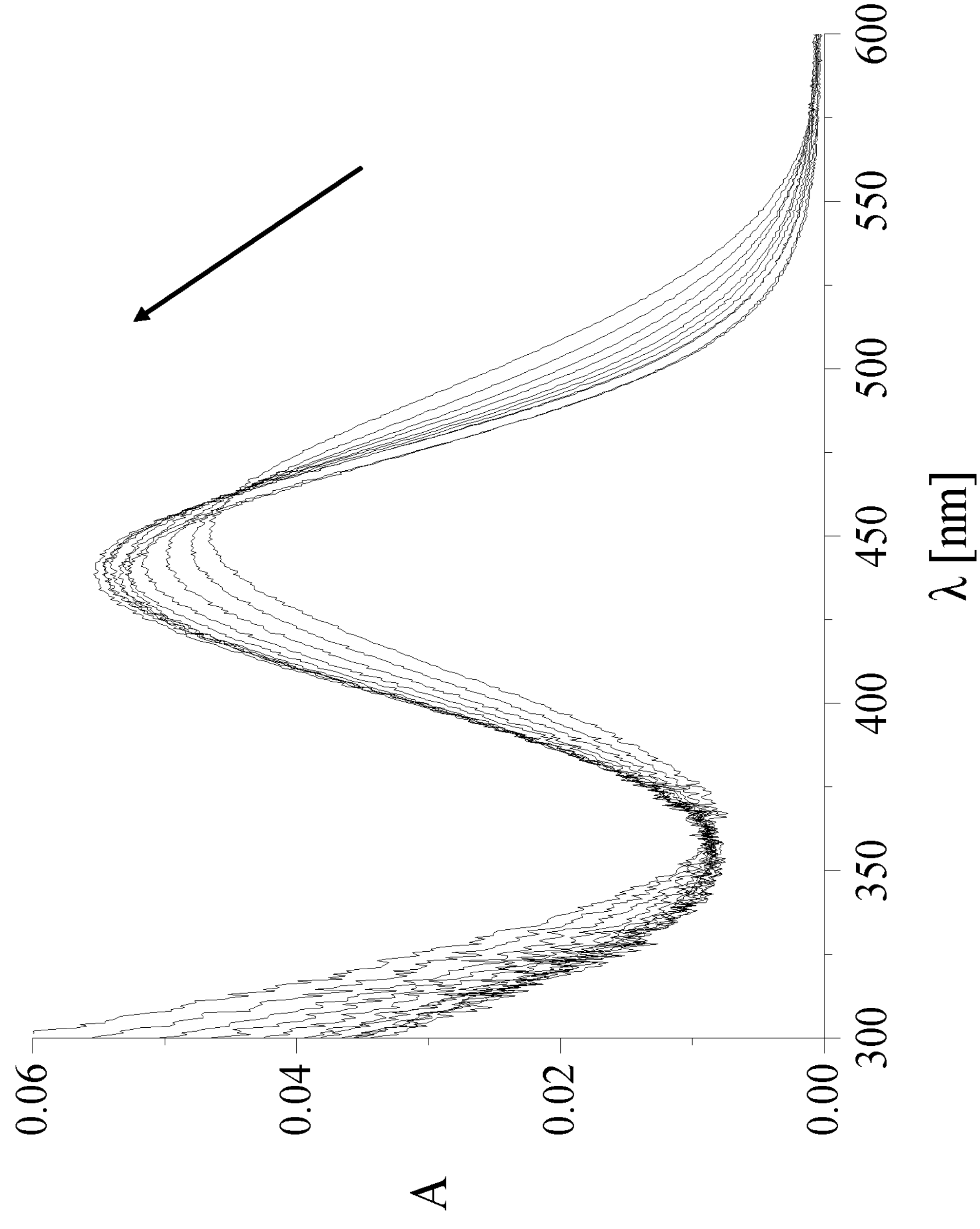
FIG. 12 shows UV/vis absorption spectra of the titration of guanidine-based compound 23 ($c[23]=1\times10^{-5}$ M) with perfluorooctanoic acid (PFOA) in EtOAc. Concentrations of PFOA [in $10^{-5}$ M]: 0, 0.2, 0.4, 0.6, 0.8, 1.0, 1.2, 1.4, 1.6, 1.8 to 2.0. The band shows an increase and blue shift. The concentration of compound 19 was kept constant during the titration.
Figure 13:
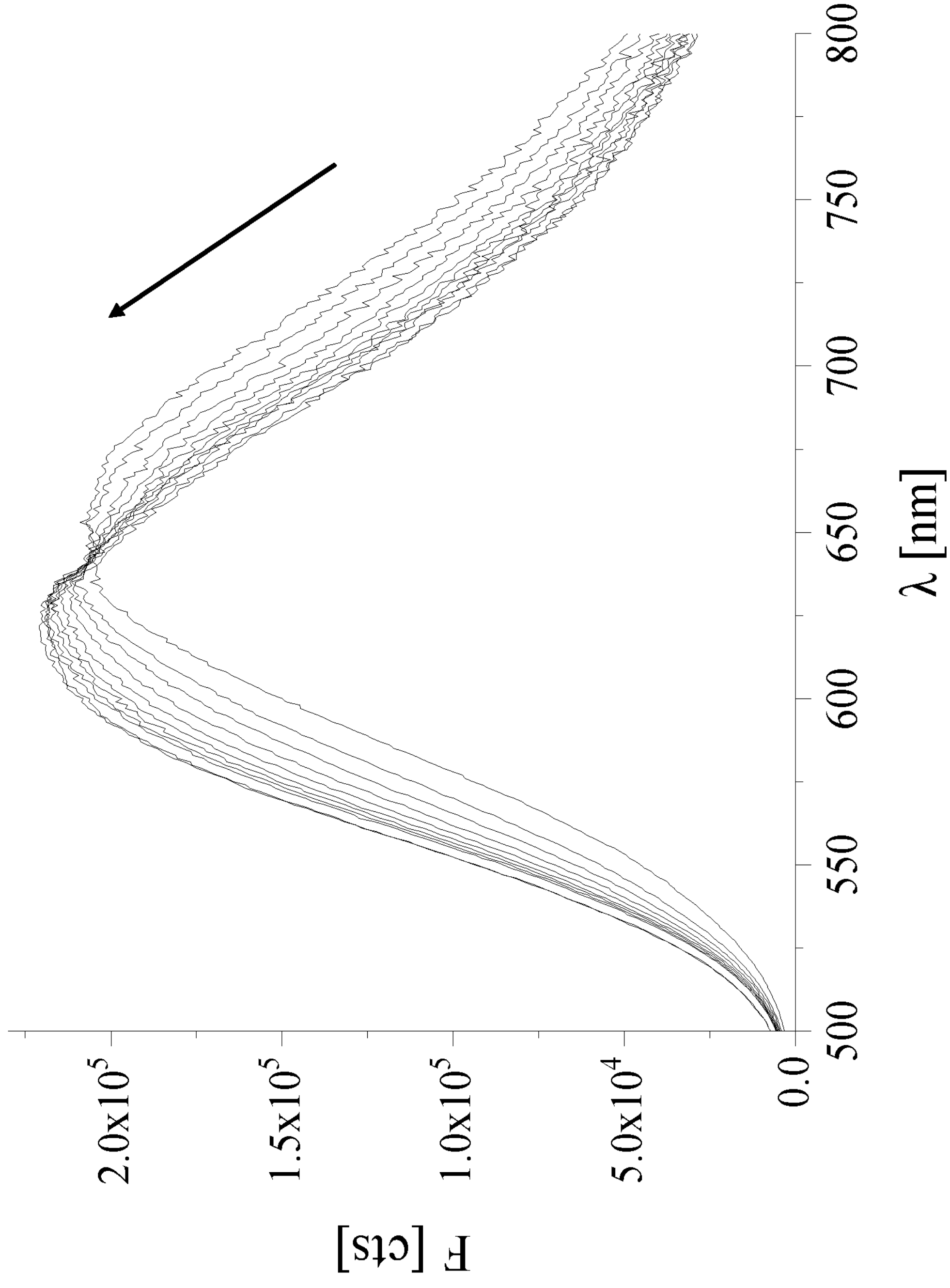
FIG. 13 shows an increase and blue shift in fluorescence emission of compound 23 upon titration with increasing concentrations of PFOA in EtOAc. Conditions as in FIG. 12.
Figure 14:
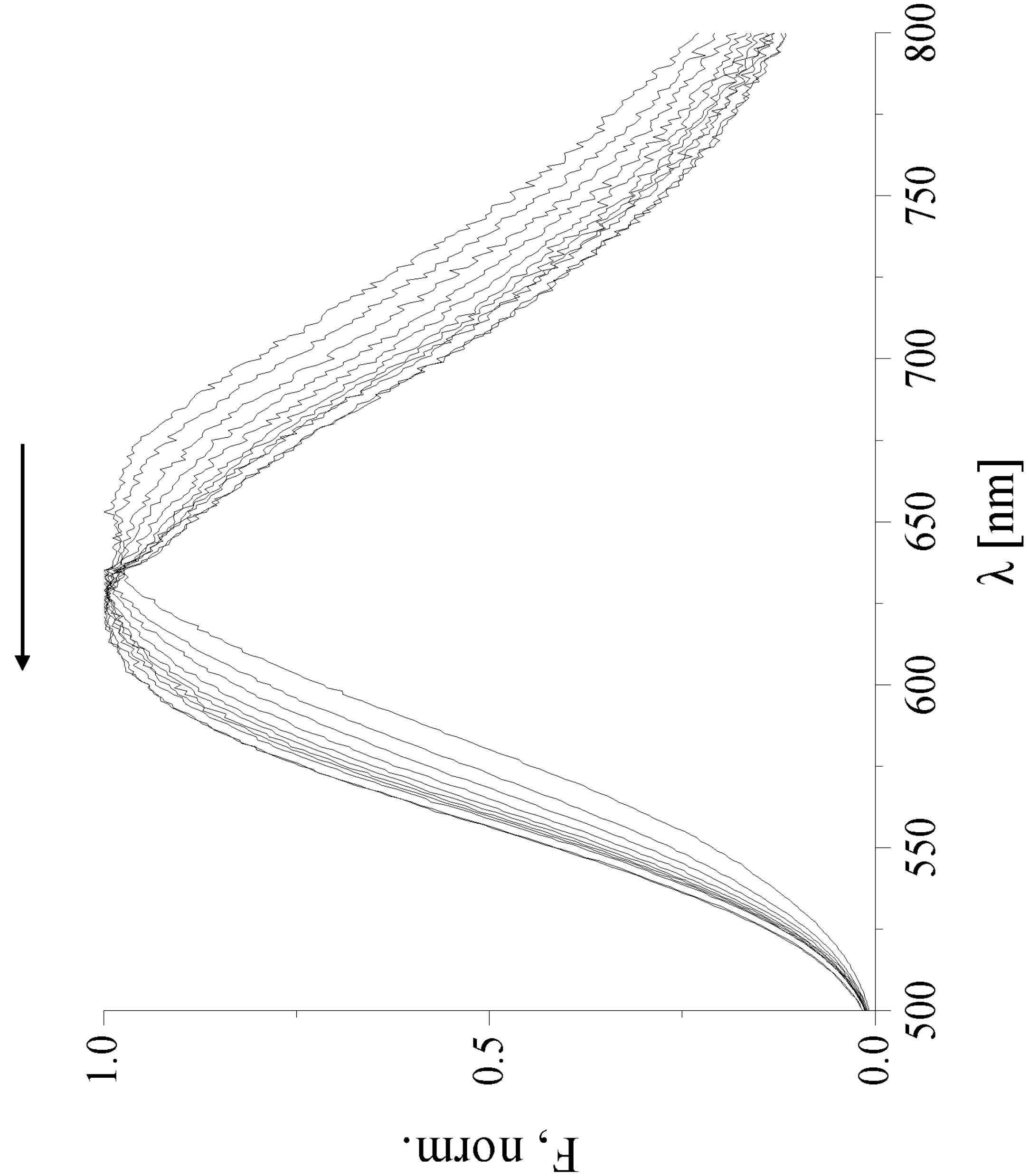
FIG. 14 shows the normalized spectra of FIG. 13 with the resulting blue shift.
Figure 15:
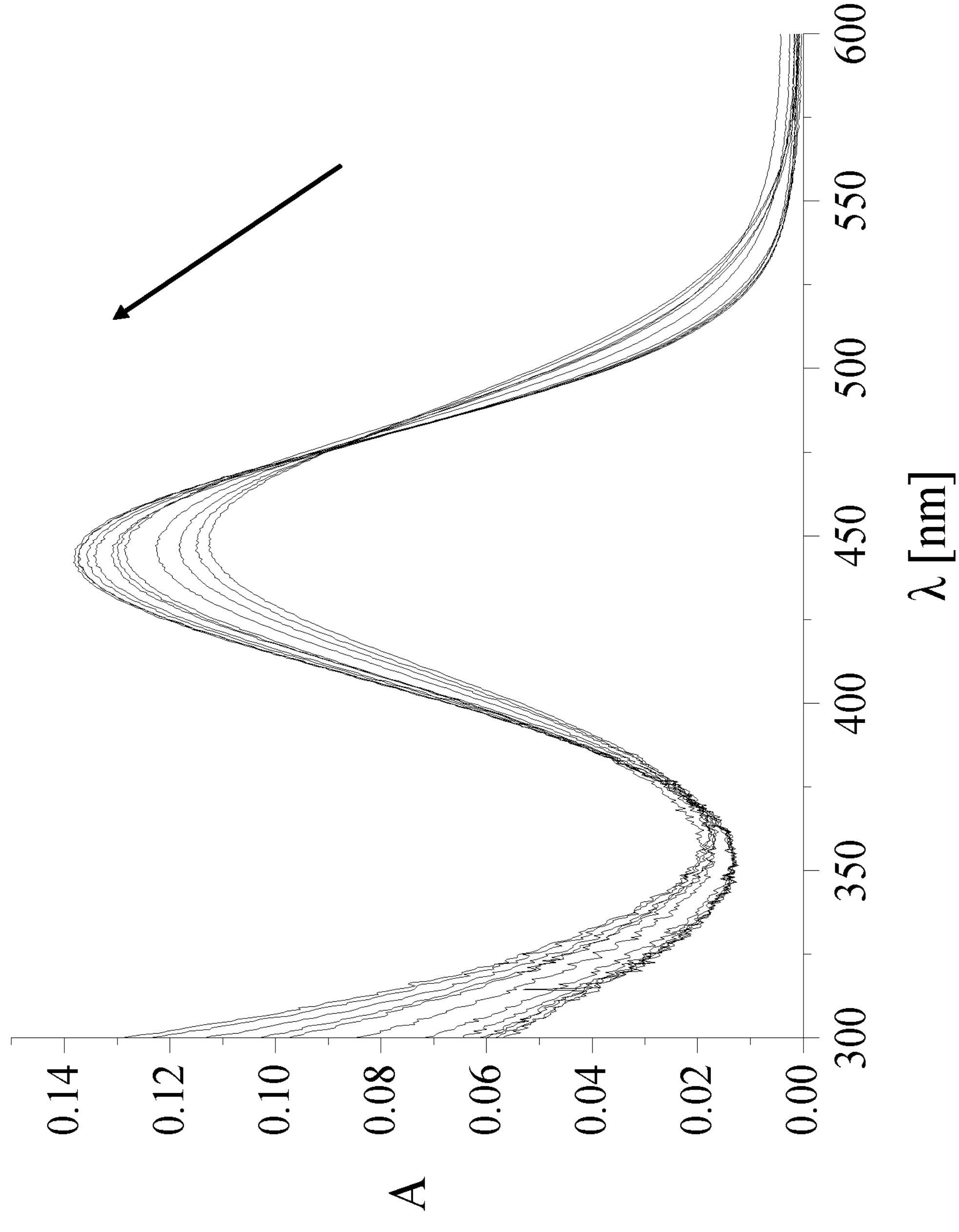
FIG. 15 shows the UV/vis absorption titration of the guanidine-based compound 23 ($c[23]=1\times10^{-5}$ M) with PFOA in MeCN. Concentrations of PFOA [in $10^{-5}$ M]: 0, 0.2, 0.4, 0.6, 0.8, 1.0, 1.2, 1.4, 1.6, 1.8, 2.0 to 3.2. The band shows an increase and blue shift. The concentration of compound 19 was kept constant during the titration.
Figure 16:
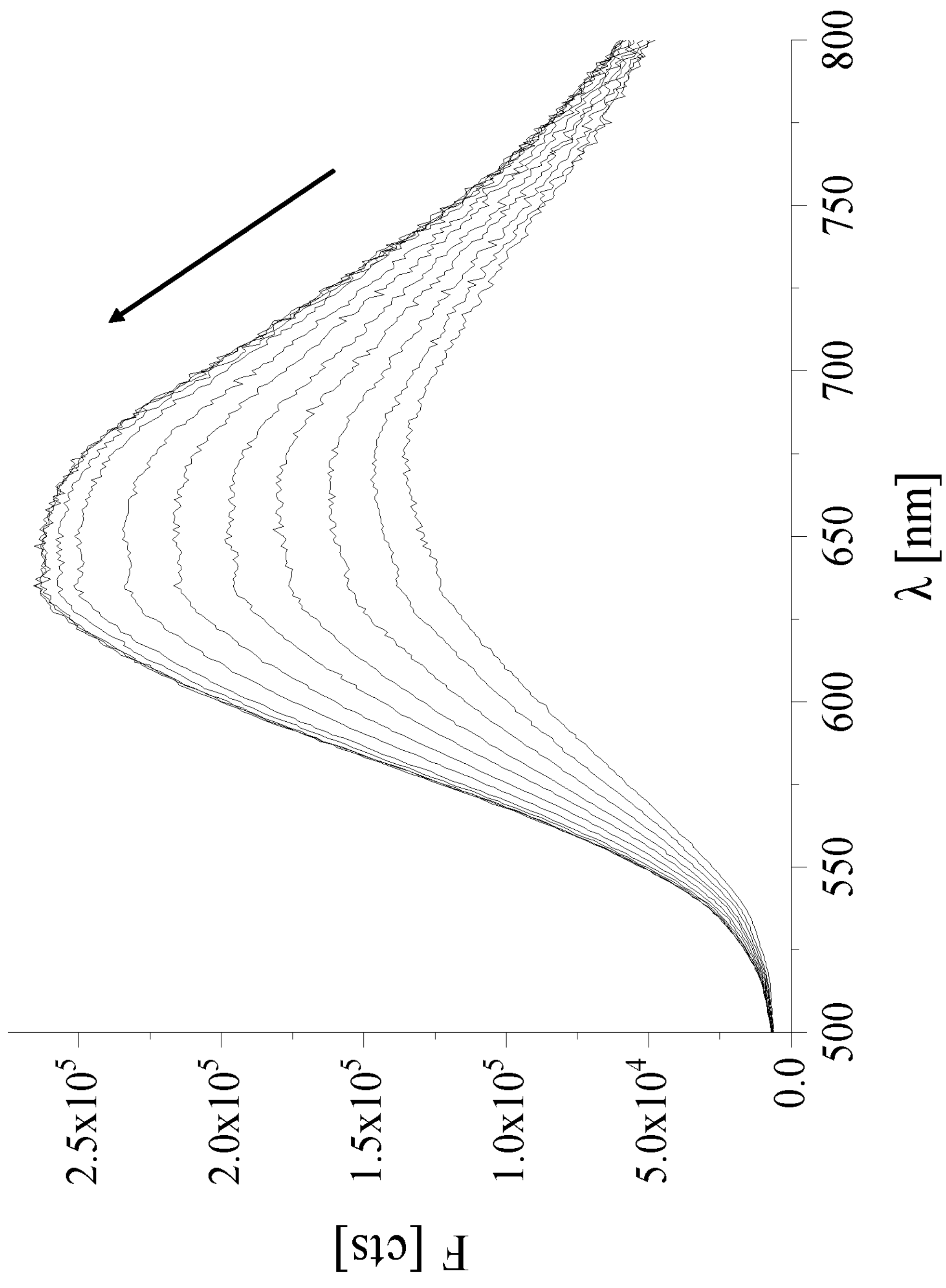
FIG. 16 shows an increase and blue shift in fluorescence emission of compound 23 upon titration with increasing concentrations of PFOA in MeCN. Conditions as in FIG. 15.
Figure 17:
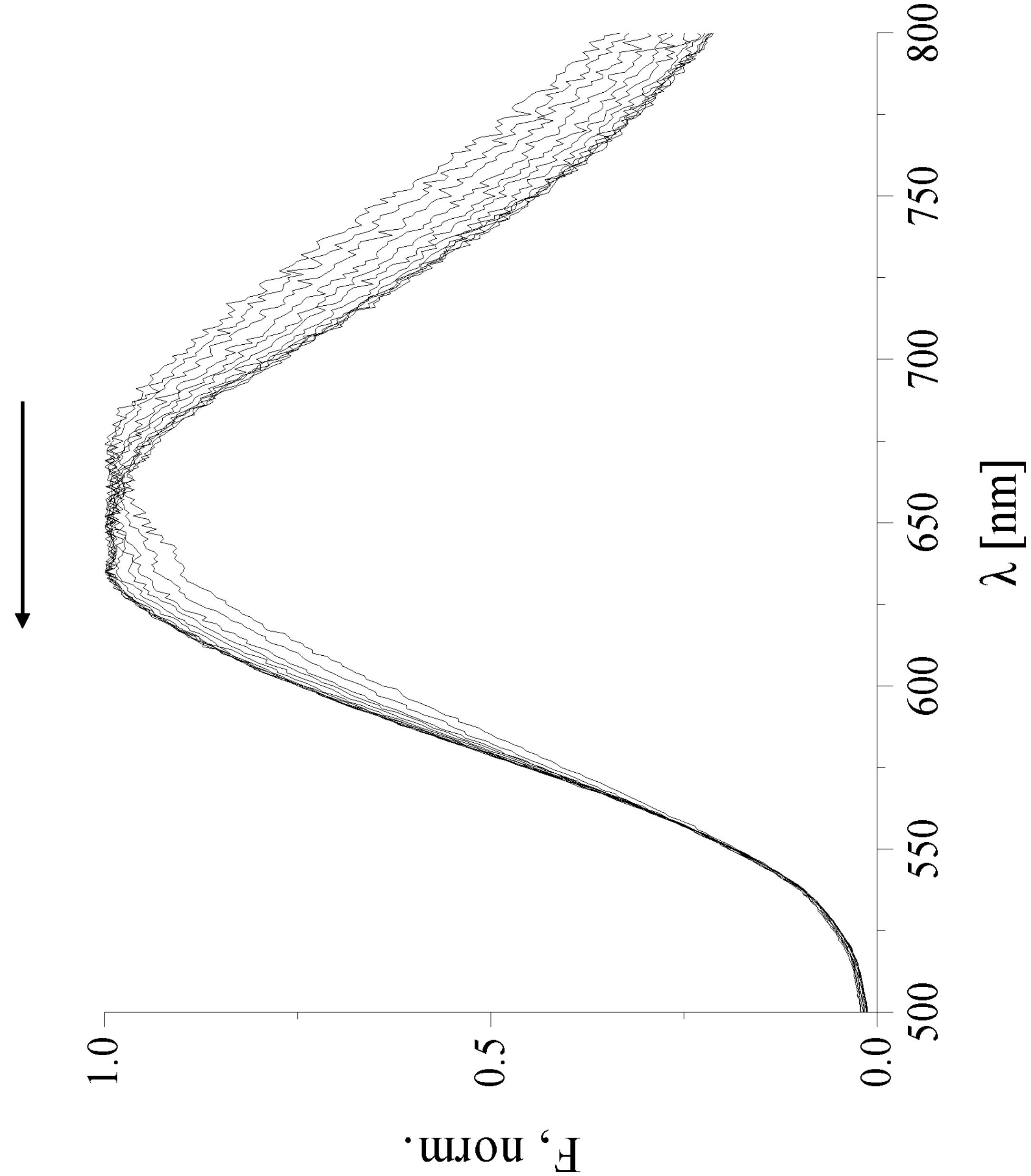
FIG. 17 shows the normalized spectra of FIG. 16 with the resulting blue shift.
Figure 18:
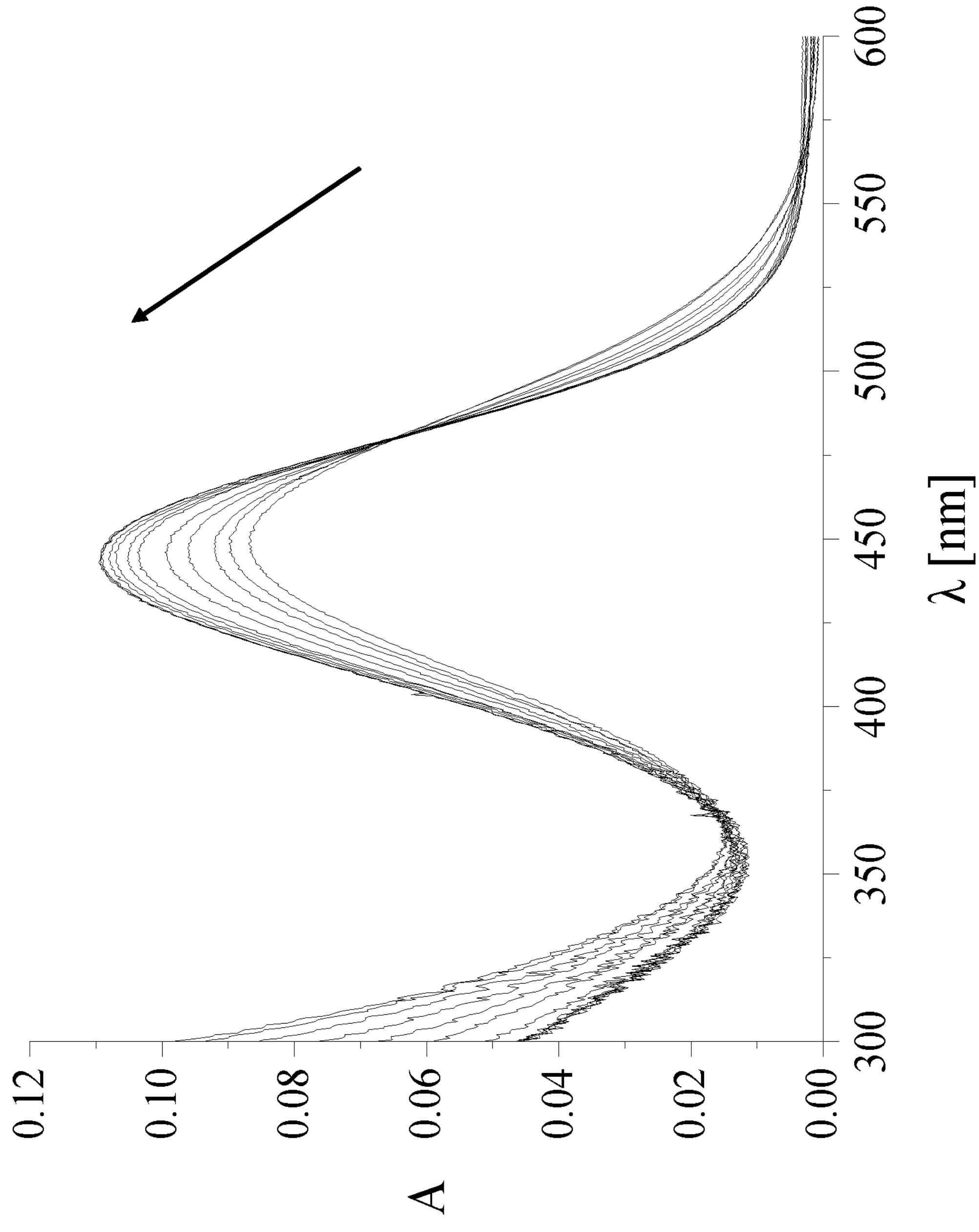
FIG. 18 shows UV/vis absorption titration of the guanidine-based compound 23 ($c[23]=1\times10^{-5}$ M) with PFOA in $MeCN/H_2O$ (5 vol % $H_2O$). Concentrations of PFOA [in $10^{-5}$ M]: 0, 0.2, 0.3, 0.5, 0.7, 0.9, 1.1, 1.2, 1.6, 1.8 to 2.8. The band shows an increase and blue shift. The concentration of compound 19 was kept constant during the titration.
Figure 19:
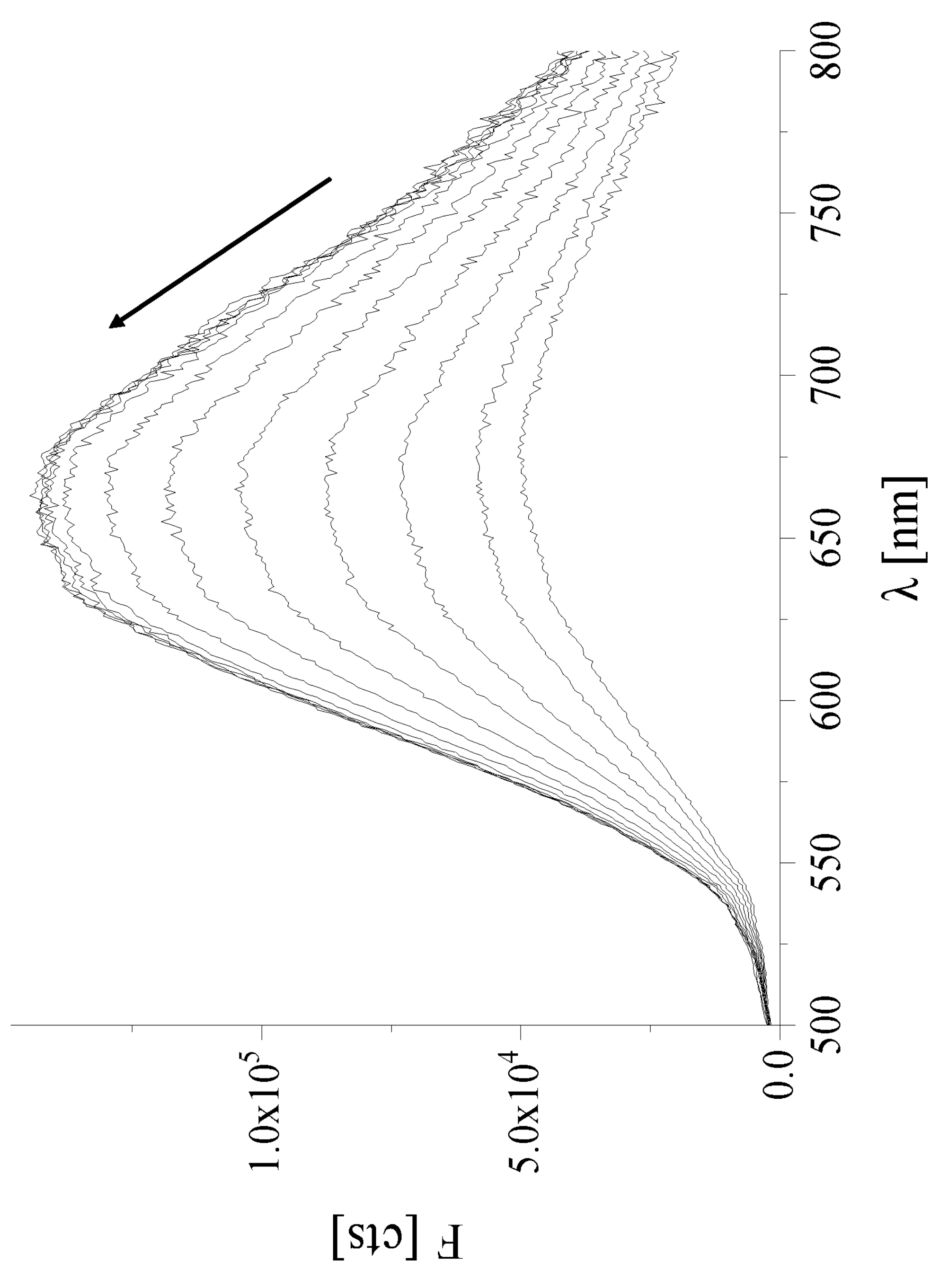
FIG. 19 shows an increase and blue shift in fluorescence emission of compound 23 upon titration with increasing concentrations of PFOA in $MeCN/H_2O$ (5 vol % $H_2O$). Conditions as in FIG. 18.
Figure 20:
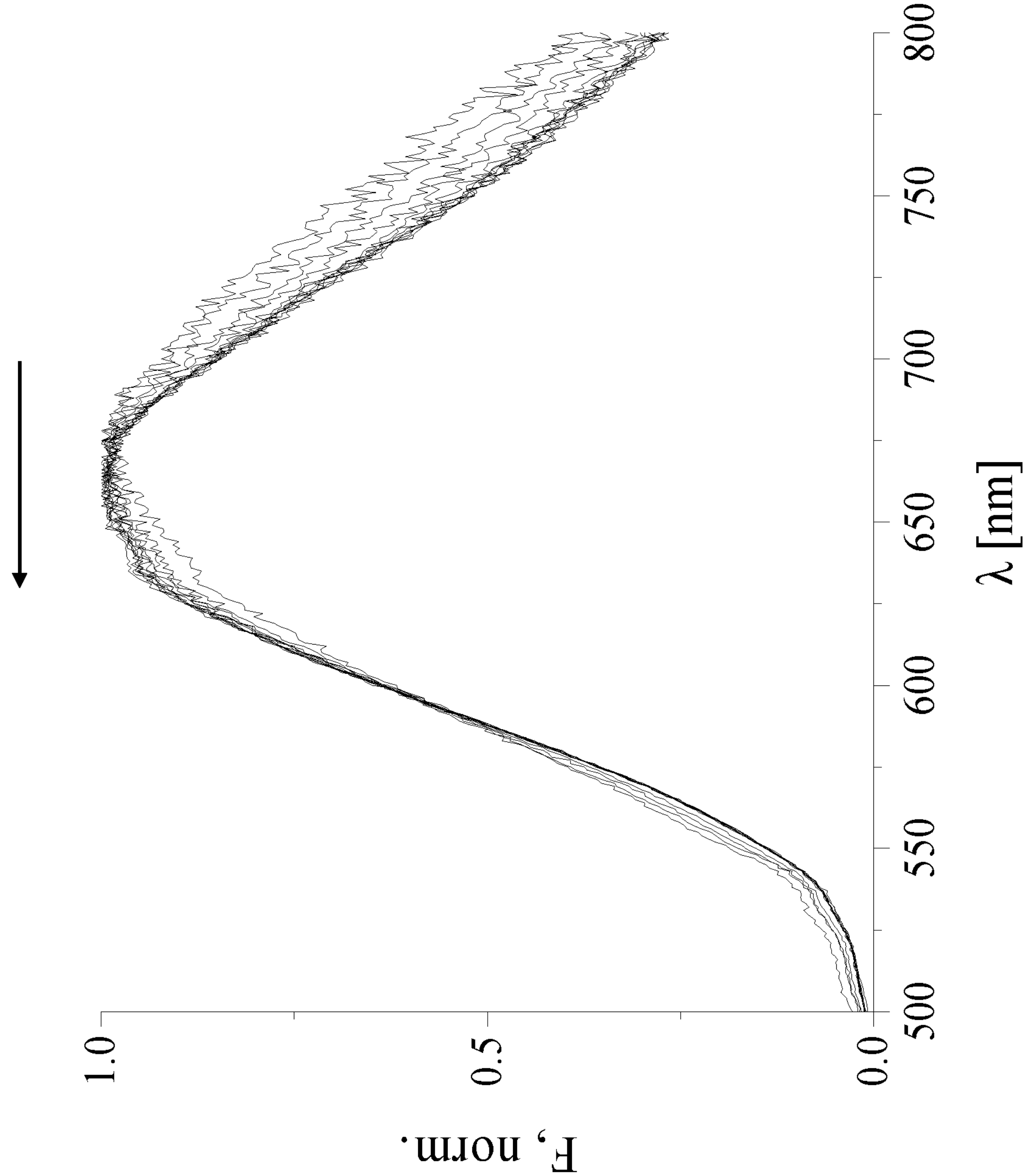
FIG. 20 shows the normalized spectra of FIG. 19 with the resulting blue shift.

This example illustrates the titration of the guanidine-based compound 23 with PFOA in polar solvents: EtOAc, MeCN and MeCN/$H_2O$ mixtures (1, 5, 10 and 25 vol % of $H_2O$). In all solvents, an increase and blue shift of the benzodiazole absorption band was observed (FIGS. 12, 15 and 18). This is the result of the protonation of the guanidine recognition moiety by the PFOA acid and the subsequent binding of the resulting PFOA carboxylate to the in situ generated guanidinium's NH hydrogen-bond donors. The bathochromic shift of the absorption band upon binding can be, in this case, rationalized considering that the donor-acceptor interaction is weaker when comparing a benzodiazole functionalized with a guanidinium to a benzodiazole functionalized with the corresponding guanidine.

Example 17

Figure 21:
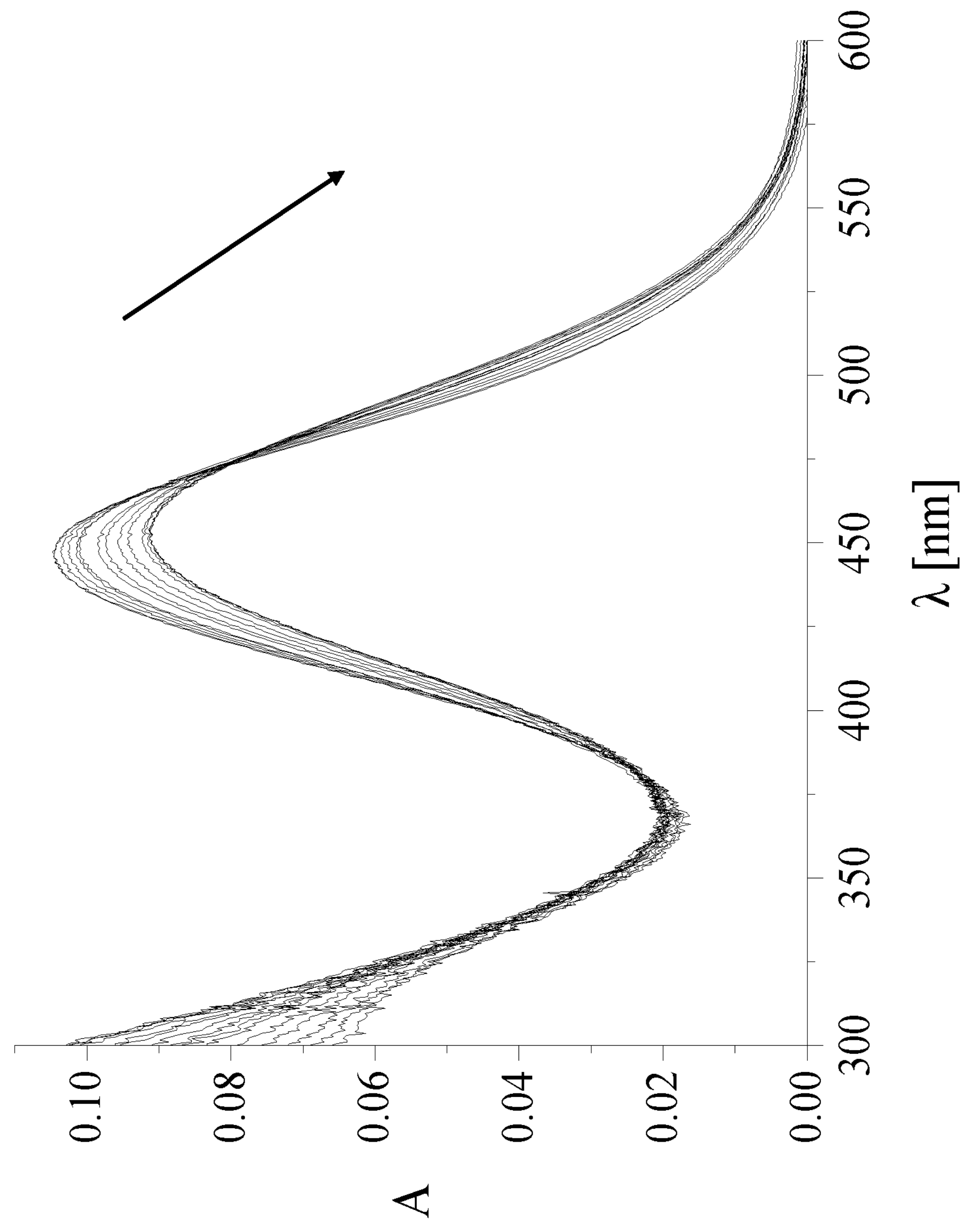
FIG. 21 shows the UV/vis absorption titration of the guanidinium-based compound 25 ($c[25]=9\times10^{-6}$ M) with tetrabutylammonium acetate (TBA-OAc) in $CHCl_3$. Concentrations of TBA-OAc [in $10^{-6}$ M]: 0, 0.9, 1.8, 2.7, 3.6, 4.5, 5.4, 6.3, 7.2, 8.1, 9.0, 9.9, 10.8, 14.3 to 28.7. The band shows a decrease and red shift. The concentration of compound 19 was kept constant during the titration.
Figure 22:
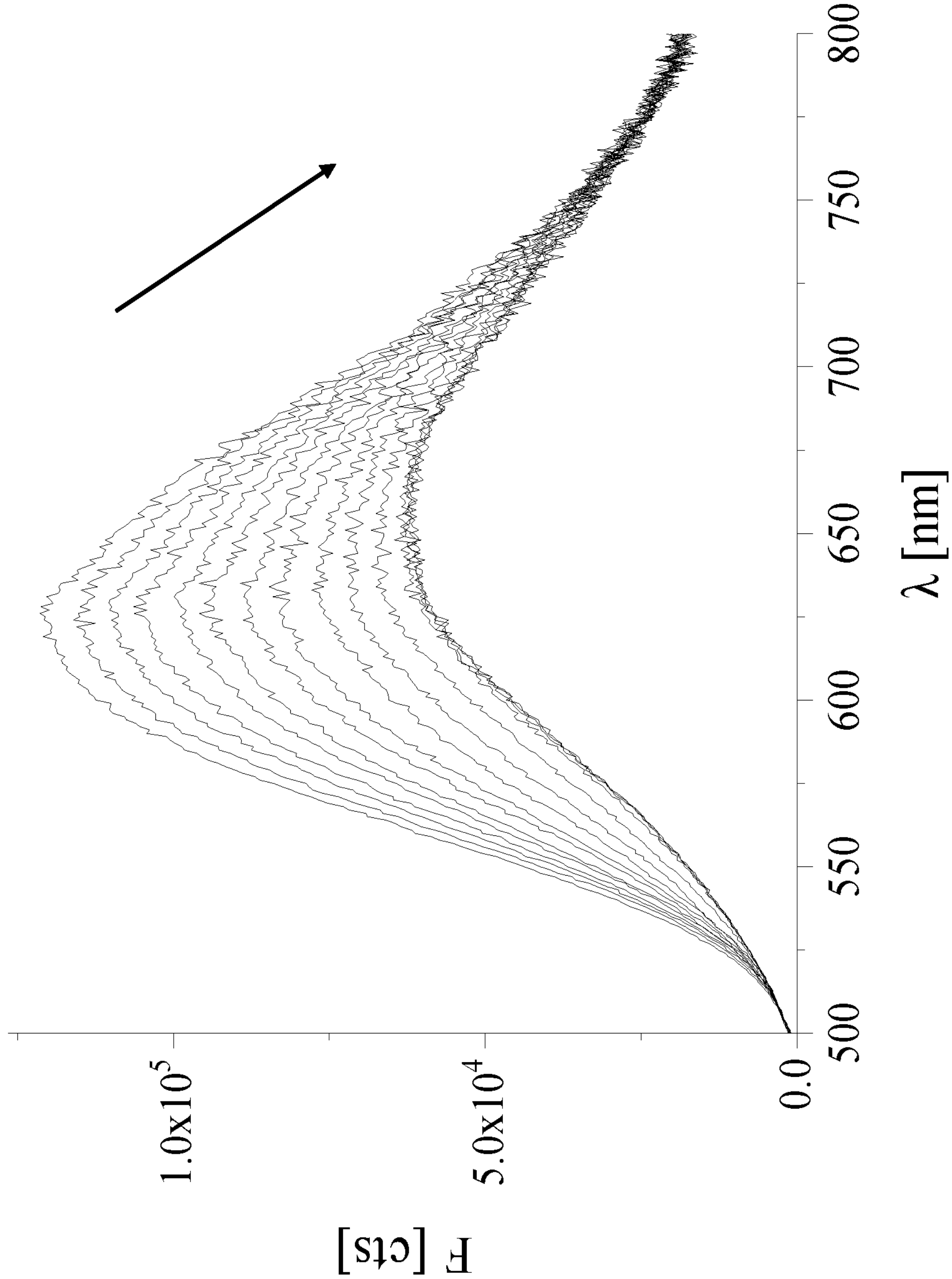
FIG. 22 shows a decrease and red shift in fluorescence emission of compound 25 upon titration with increasing concentrations of TBA-OAc in $CHCl_3$. Conditions as in FIG. 21.
Figure 23:
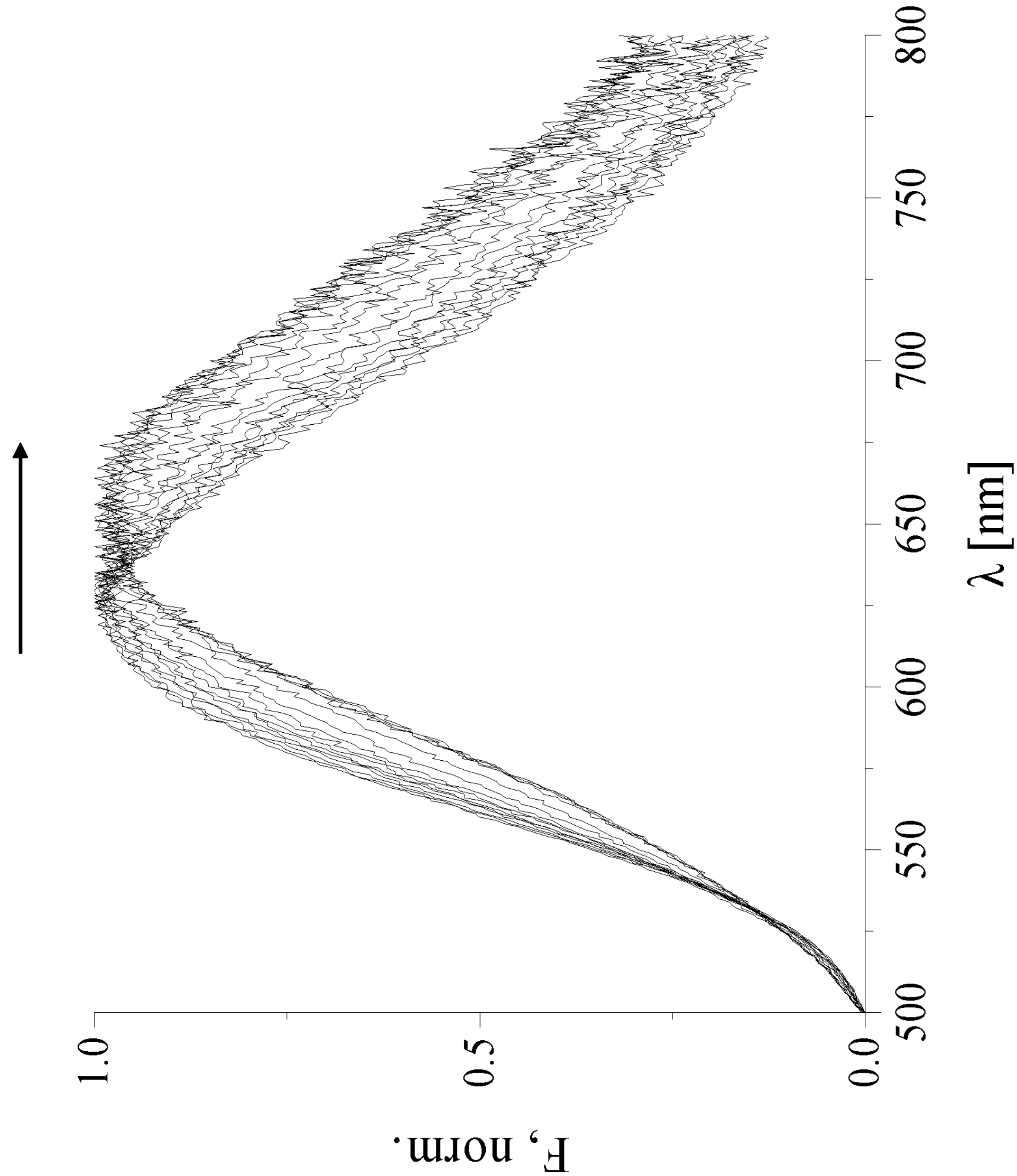
FIG. 23 shows the normalized spectra of FIG. 22 with the resulting red shift.
Figure 24:
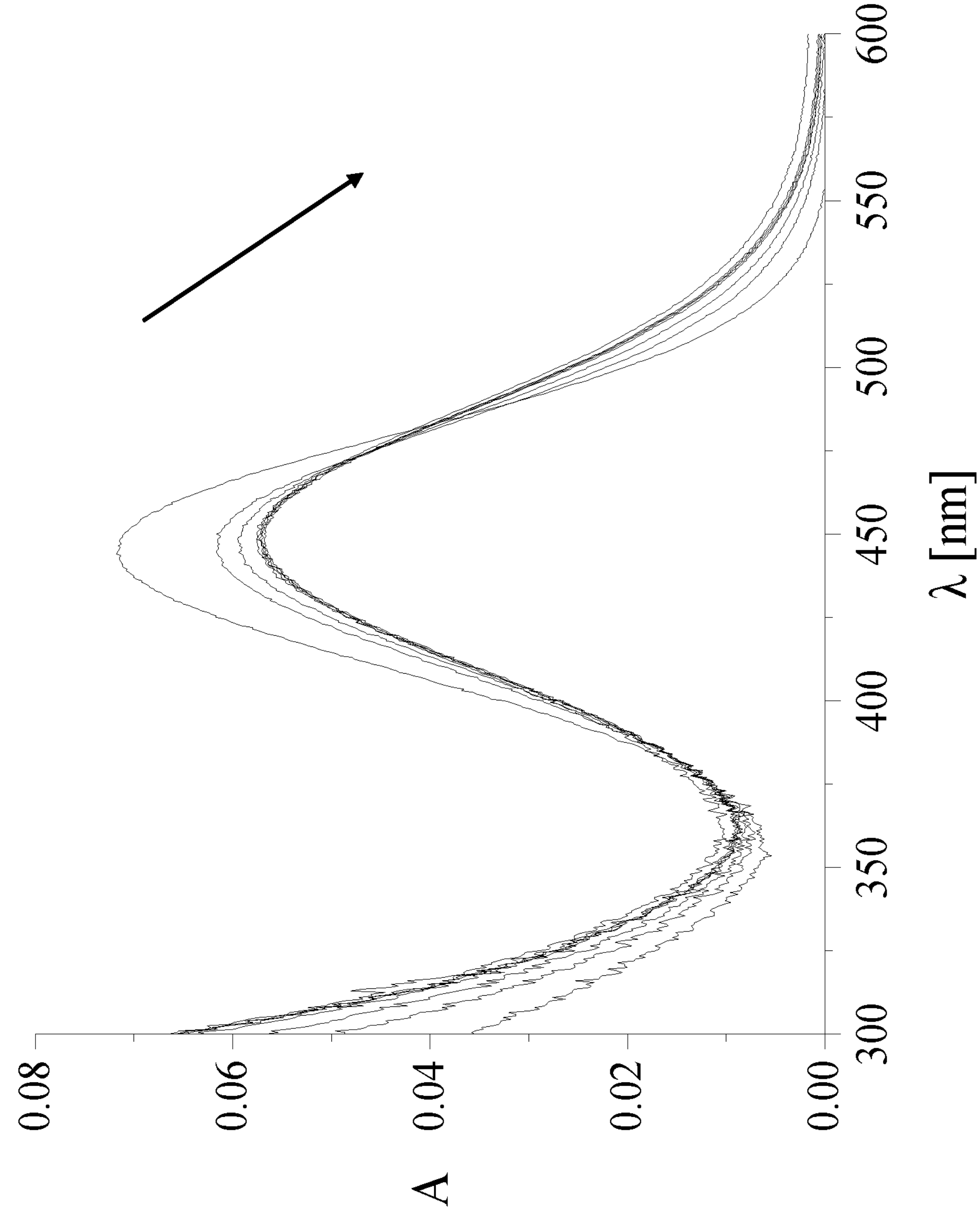
FIG. 24 shows the UV/vis absorption titration of the guanidinium-based compound 25 ($c[25]=9\times10^{-6}$ M) with TBA-OAc in MeCN. Concentrations of TBA-OAc [in $10^{-6}$ M]: 0, 1.5, 3.0, 4.5, 6.0, 7.5, 9.0, 12.1 to 24.0. The band shows a decrease and red shift. The concentration of compound 19 was kept constant during the titration.
Figure 25:
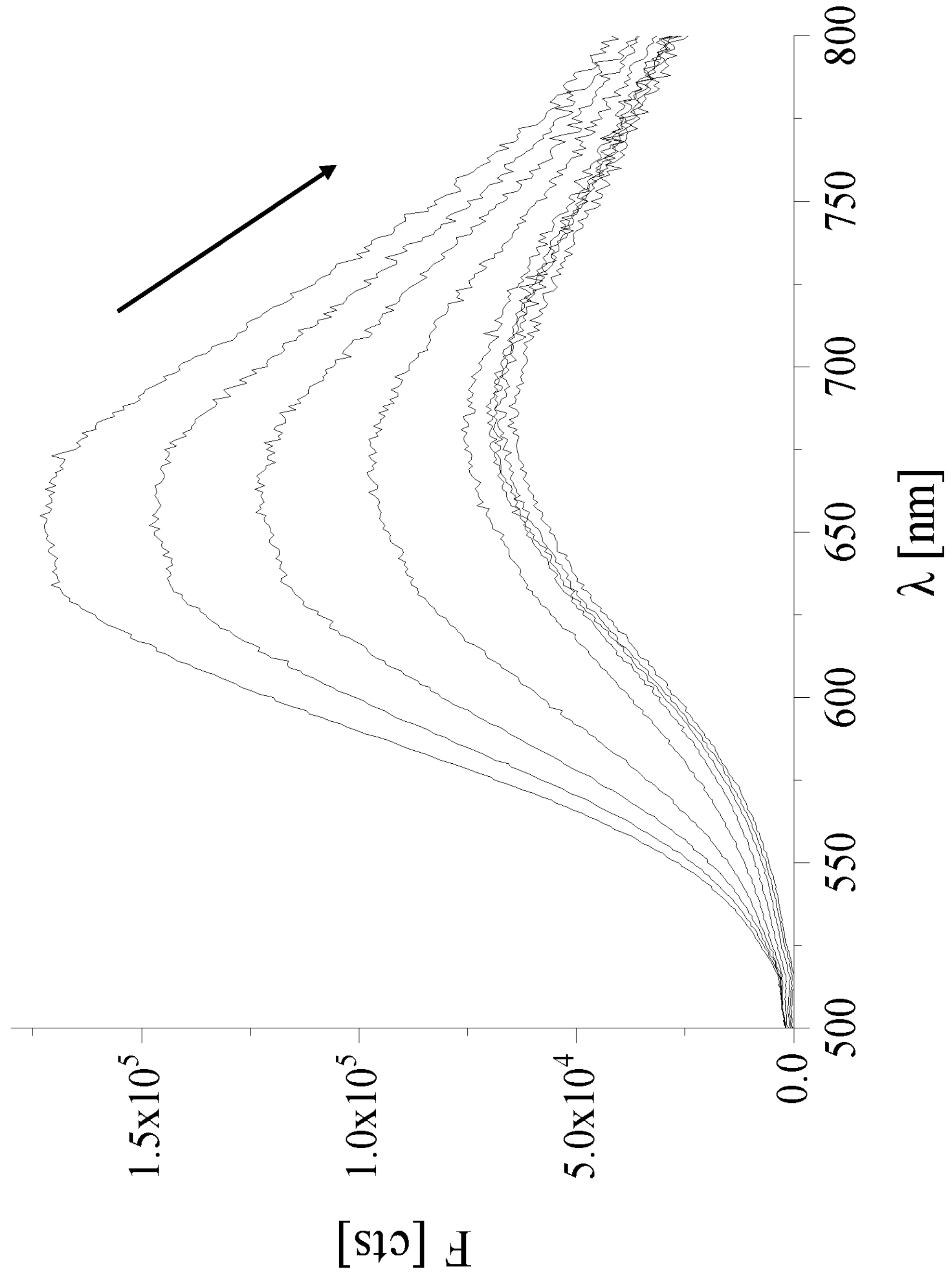
FIG. 25 shows a decrease and red shift in fluorescence emission of compound 25 upon titration with increasing concentrations of TBA-OAc in MeCN. Conditions as in FIG. 24.
Figure 26:
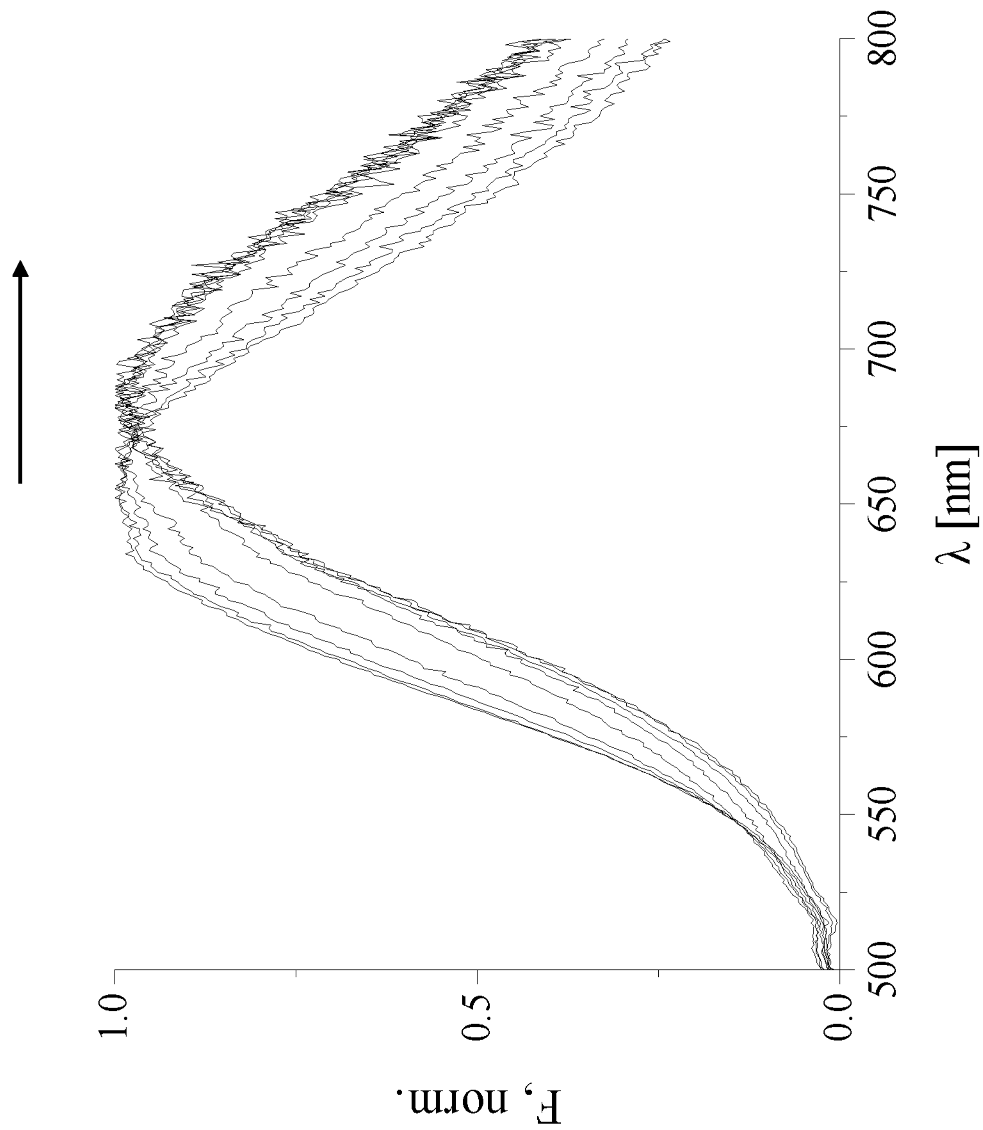
FIG. 26 shows the normalized spectra of FIG. 25 with the resulting red shift.

This example shows the titration of the guanidinium-based compound 25 with tetrabutylammonium acetate (TBA-OAc) in $CHCl_3$ and MeCN (FIGS. 21 and 24). In both solvents, a decrease and a red shift in the absorption band of 25 at 450 nm (FIGS. 21 and 24) confirms the binding of the carboxylate moiety of TBA-OAc to the guanidinium recognition site of compound 25 by means of hydrogen bond interactions in the ground state. The bathochromic shift of the absorption band upon binding can be rationalized considering that the donor-acceptor interaction between the guanidinium and the benzoxadiazole is reinforced by a charge donation of the electron-rich acetate anion to the guanidinium. These changes in the ground state are accompanied by a quenching and a red shift of the fluorescence emission response of 25 (FIGS. 22, 23, 25 and 26) upon analyte binding demonstrating the utility of these probes as fluorescent indicators.

Example 18

Preparation of MIP-ENOX@$SiO_2$ Core-Shell Particles

Figure 28:
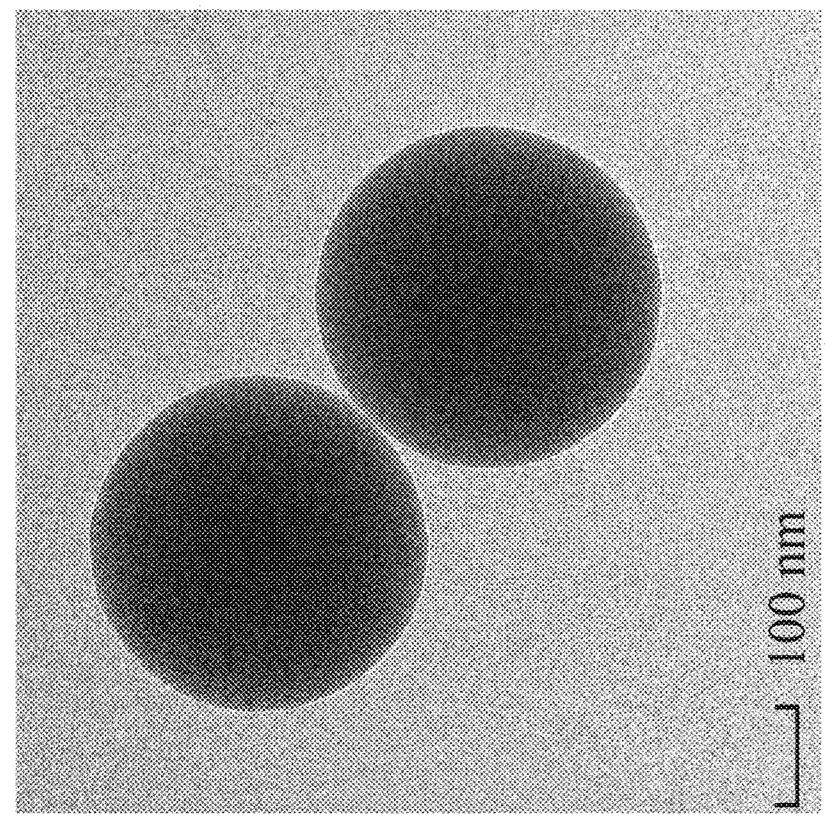
FIG. 28 shows two representative TEM images of $SiO_2$ cores according to example 19 described below as used for the preparation of silica core/molecularly imprinted polymer (MIP) shell particles.
Figure 28:
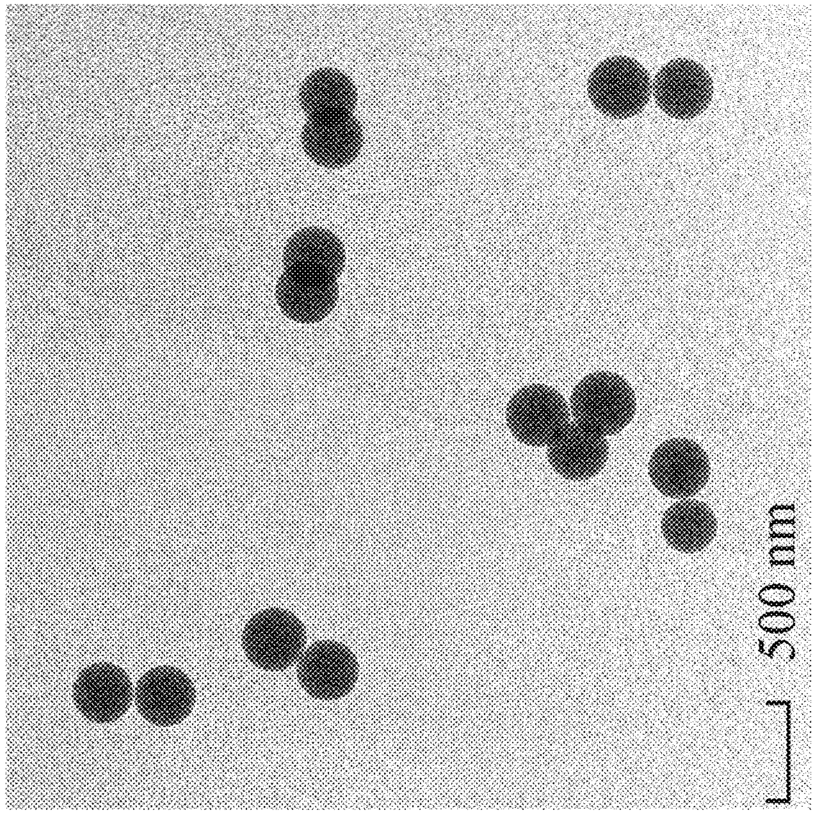
Figure 29:
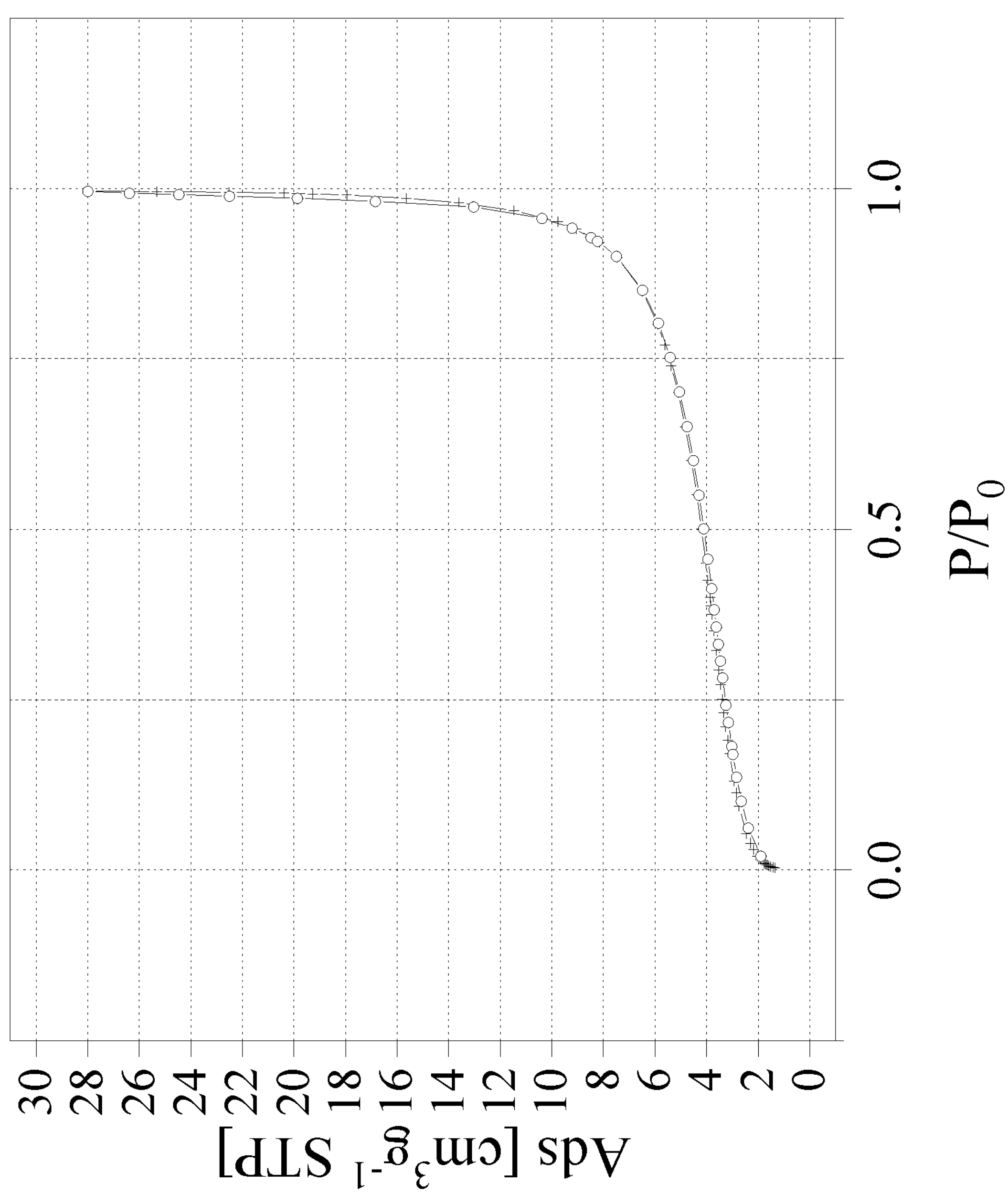
FIG. 29 shows the adsorption (cross) and desorption (circle) of $N_{2(g)}$ by the silica particles with increasing and decreasing gas pressure, respectively, determining the surface area of the particles according to the Brunauer-Emmett-Teller (BET) model to be $11.81\pm0.03$ $m^2$ $g^{-1}$ particles (y axis—adsorbed and desorbed $N_{2(g)}$, $cm^3$ $g^{-1}$ particles, x axis—relative gas pressure, $P/P_0$).
Figure 30:
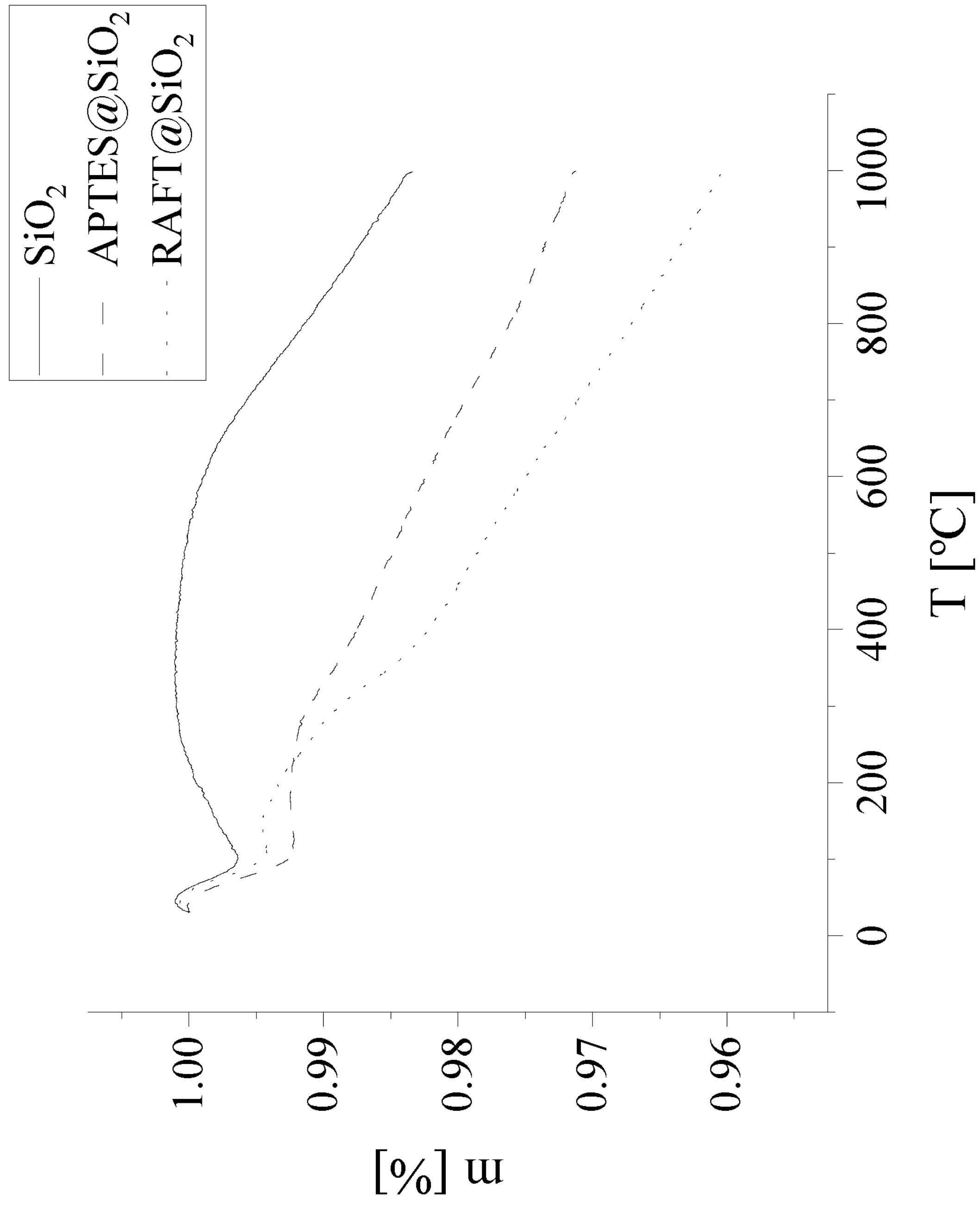
FIG. 30 shows the percentage mass loss of calcinated silica nanoparticles (solid), APTES@$SiO_2$ (dashed) and RAFT @$SiO_2$ (dotted) after treatment by thermogravimetric analysis (TGA). The samples were heated progressively using in a first step an oxidizing synthetic air atmosphere (80 mL $min^{-1}$) with a heating program consisting of a ramp of 10° C. $min^{-1}$ from 25° C. to 1000° C. and in a second step an isotherm (synthetic air, 80 mL $min^{-1}$) at 1000° C. for 10 min. The percentage mass loss was determined for $SiO_2$ (2.1%), APTES @$SiO_2$ (3.1%) and RAFT @$SiO_2$ (4.3%).
Figure 31:
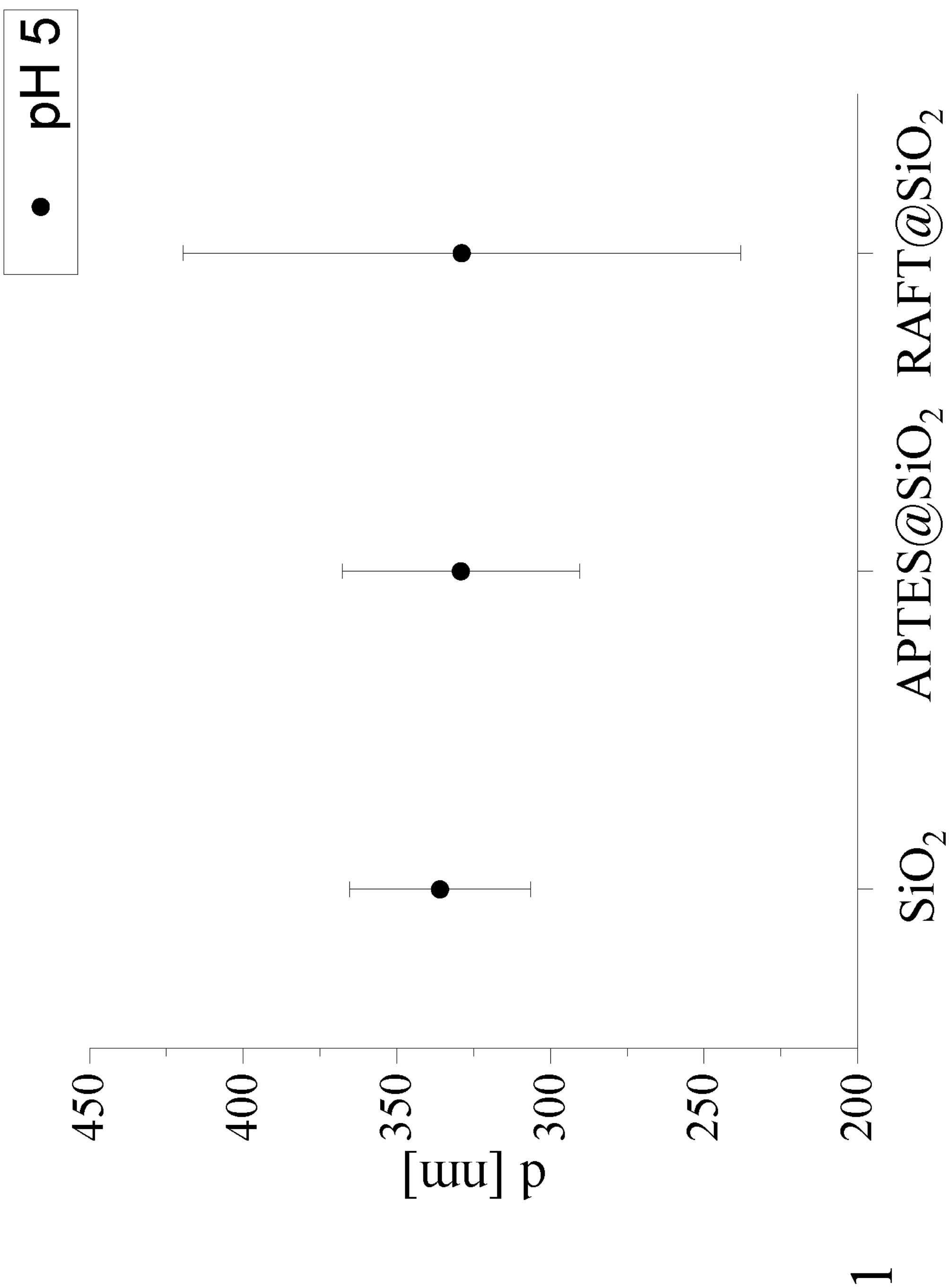
FIG. 31 shows the average size distribution for silica core formation, APTES@$SiO_2$ and RAFT@$SiO_2$ according to example 19 described below.
Figure 32:
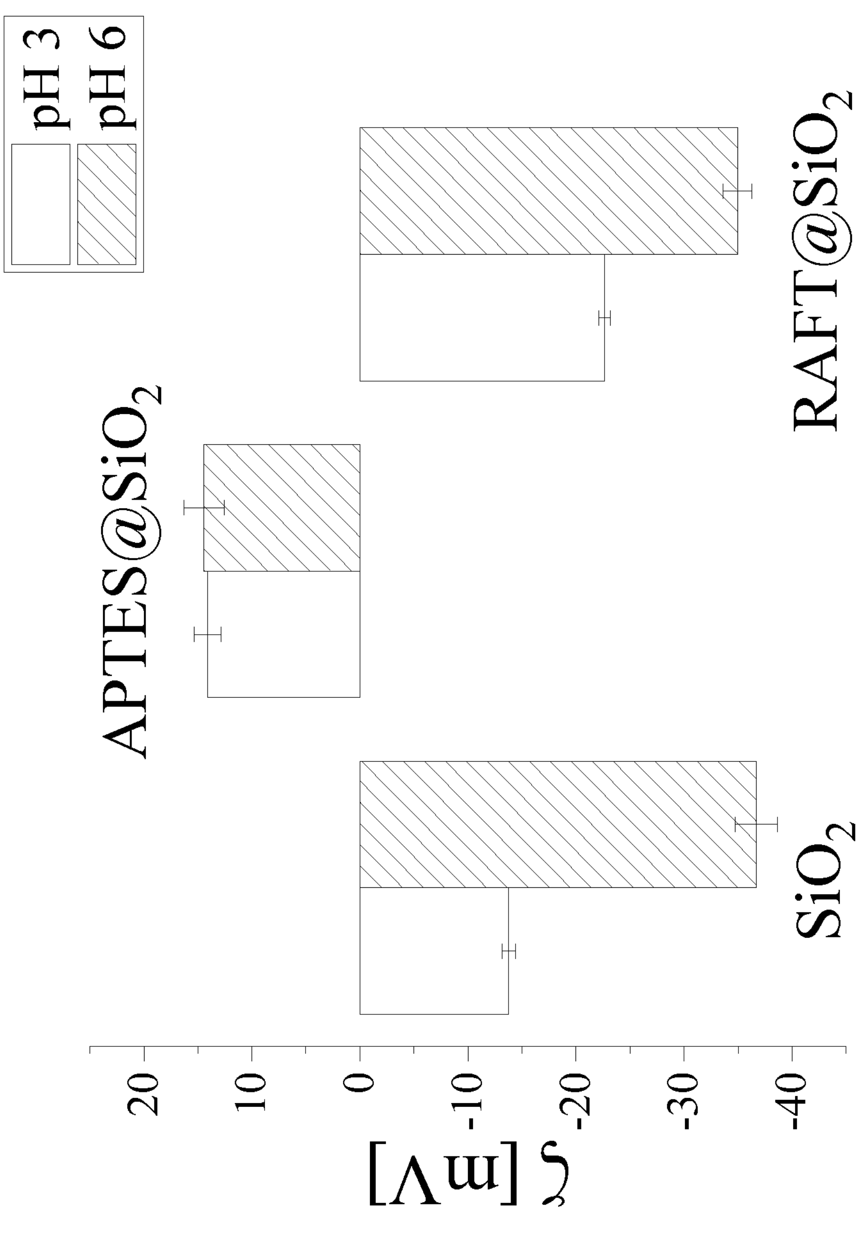
FIG. 32 shows the zeta potential of 0.1 mg $mL^{-1}$ aqueous suspensions of silica nanoparticles, APTES@$SiO_2$ and RAFT@$SiO_2$ at both pH 3 and pH 6. The zeta potential changes with the different functionalization steps. Silica particles show a negative zeta potential due to the silanol groups on the surface of the particles. Upon functionalization with APTES, the zeta potential turns positive due to the free amino groups. Finally, upon coupling of the RAFT agent to the free amino groups, the zeta potential is negative once again.

Silica beads were synthesized by the Stöber method. 65 mL ethanol (96%), 121 mL Millipore water and 14 mL ammonia solution (32%) were mixed together at 300 rpm in a 1 L Erlenmeyer flask. 18 mL TEOS was mixed with 182 mL EtOH (96%), and quickly added to the base solution. The mixture was stirred overnight at 300 rpm. The resulting particles were washed three times with ethanol (96%) by centrifugation and redispersion, then dried overnight under vacuum. The silica particles were characterized by TEM (FIG. 28), $N_2$ absorption-desorption (FIG. 29), TGA (FIG. 30) and DLS (FIG. 31). Their size was determined to 336±16 nm by DLS; the surface area was determined to 11.81±0.03 $m^2$ $g^{-1}$ according to the BET model by analysis of the $N_2$ absorption-desorption measurements; overall mass loss was determined to be 2.1% by TGA; and the Zeta potentials were determined to −36.67±1.96 at pH 6 and −13.77±0.61 at pH 3. The silica particles show a negative Zeta potential due to the silanol groups on the surface of the particles.

Modification of the silica particles with (3-aminopropyl) triethoxysilane (APTES) was performed by weighing 1 g of silica particles into a 2-necked round bottomed flask equipped with a magnetic stirrer and connected to a reflux condenser. The particles were dispersed in 50 mL anhydrous toluene and heated to 120° C. under argon. 4 mL of APTES was added and the reaction allowed to proceed for 16 h. The particles were then washed three times with 96% ethanol. The particles (APTES@$SiO_2$) were dried overnight under vacuum at room temperature. The APTES @$SiO_2$-functionalized silica particles were characterized by TGA (FIG. 30) and DLS (FIG. 31). Their size was determined to 329±39 nm by DLS (intensity mean); the overall mass loss was determined to 3.1% by TGA; the Zeta potentials were determined to 14.43±1.86 at pH 6 and 14.08±1.23 at pH 3. Upon functionalization with APTES, the Zeta potential turns positive due to the free amino groups that are partly protonated.

Figure 33:
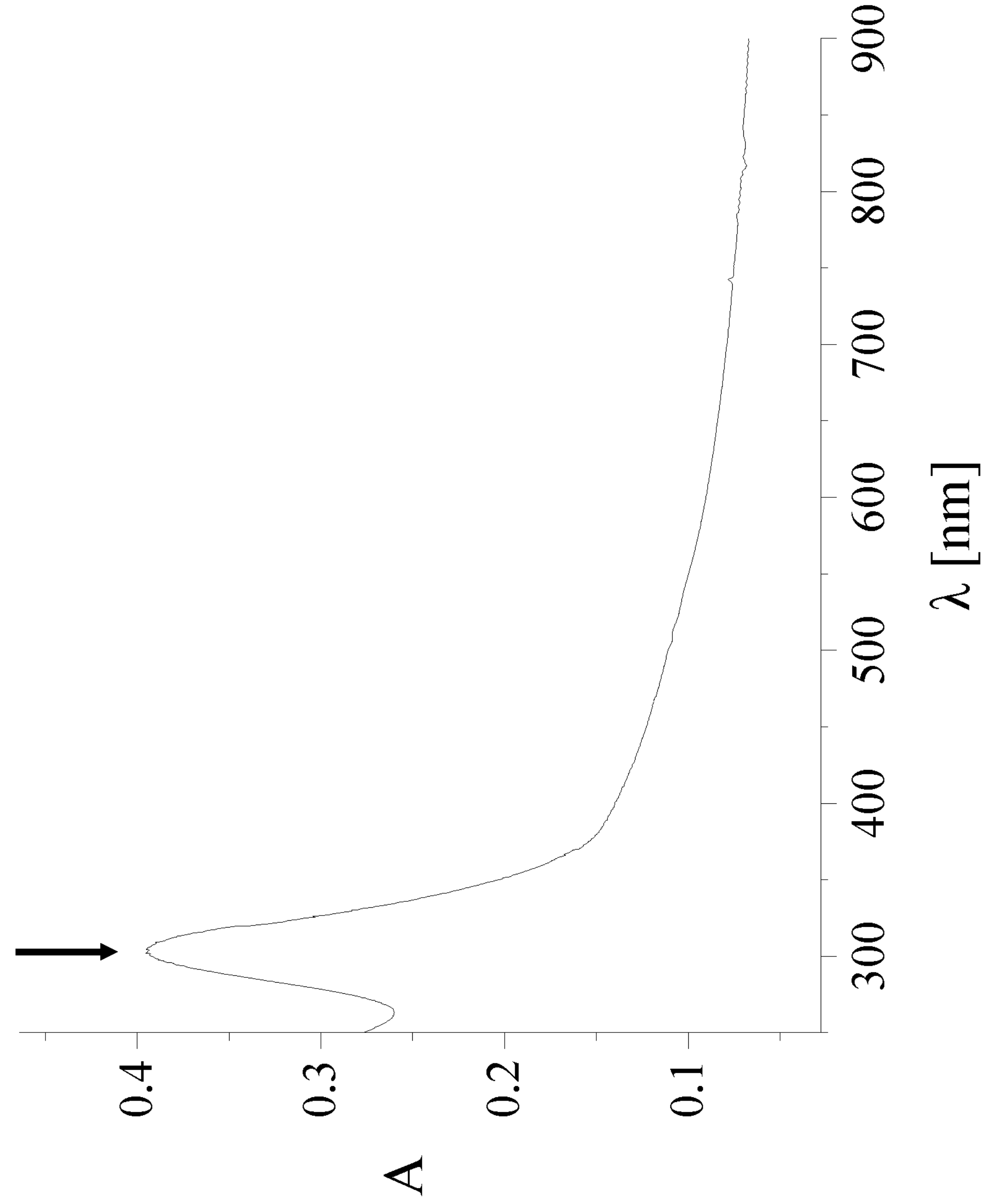
FIG. 33 shows the UV/vis absorption of RAFT @$SiO_2$. The band at 304 nm confirms the successful coupling of the RAFT agent to the APTES@$SiO_2$.

Modification of AV 1ES@$SiO_2$ particles with RAFT agent 4-cyano-4-(phenylcarbonothioylthio)pentanoic acid (CPDB) was performed by weighing 800 mg APTES@$SiO_2$ into a 20 mL vial equipped with a magnetic stirrer. Simultaneously, 428.9 mg CPDB, 146.6 μL ethylchloroformate and 213.0 μL triethyl amine were dissolved in 7 mL anhydrous tetrahydrofuran (THF) and mixed together in an acetone/liquid nitrogen bath at −70° C. for 40 min. Afterwards, the cooled solution was added to the particles and left to react at room temperature for 24 h at 700 rpm. The particles were precipitated in hexane, washed twice with THF and once with acetone. Then, the RAFT@$SiO_2$ particles were dried overnight in a vacuum. The RAFT@$SiO_2$ particles were characterized by TGA (FIG. 30), DLS (FIG. 31) and UV/vis absorption spectroscopy (FIG. 33). The size was determined to 329±91 nm by DLS (intensity mean); the overall mass loss was determined to 4.3% by TGA; the zeta potentials were determined to be −26.63±0.50 at pH 6 and −34.95±1.32 at pH 3. Upon coupling of the RAFT agent to the free amino groups, the zeta potential is negative again. A UV/vis spectrum of the RAFT@$SiO_2$ particles showed a band at 304 nm, confirming the successful coupling of the RAFT agent to the APTES@$SiO_2$.

Template preparation: Enoxacin tetrabutylammonium (ENOX-TBA) was used as template for the synthesis of silica core-MIP shell MIP-ENOX@$SiO_2$ particles. The template preparation was done by dissolving 160 mg TBA-OH× 30 $H_2O$ in 8 mL MeCN and adding an equimolar portion of this solution to the template. The solution was left in a thermomixer for 1 h (20° C., 900 rpm). Then, the template was concentrated in a vacuum at 200 mbar for 15 min and at 0 mbar for 1 h and later overnight in a vacuum oven.

Figure 27:
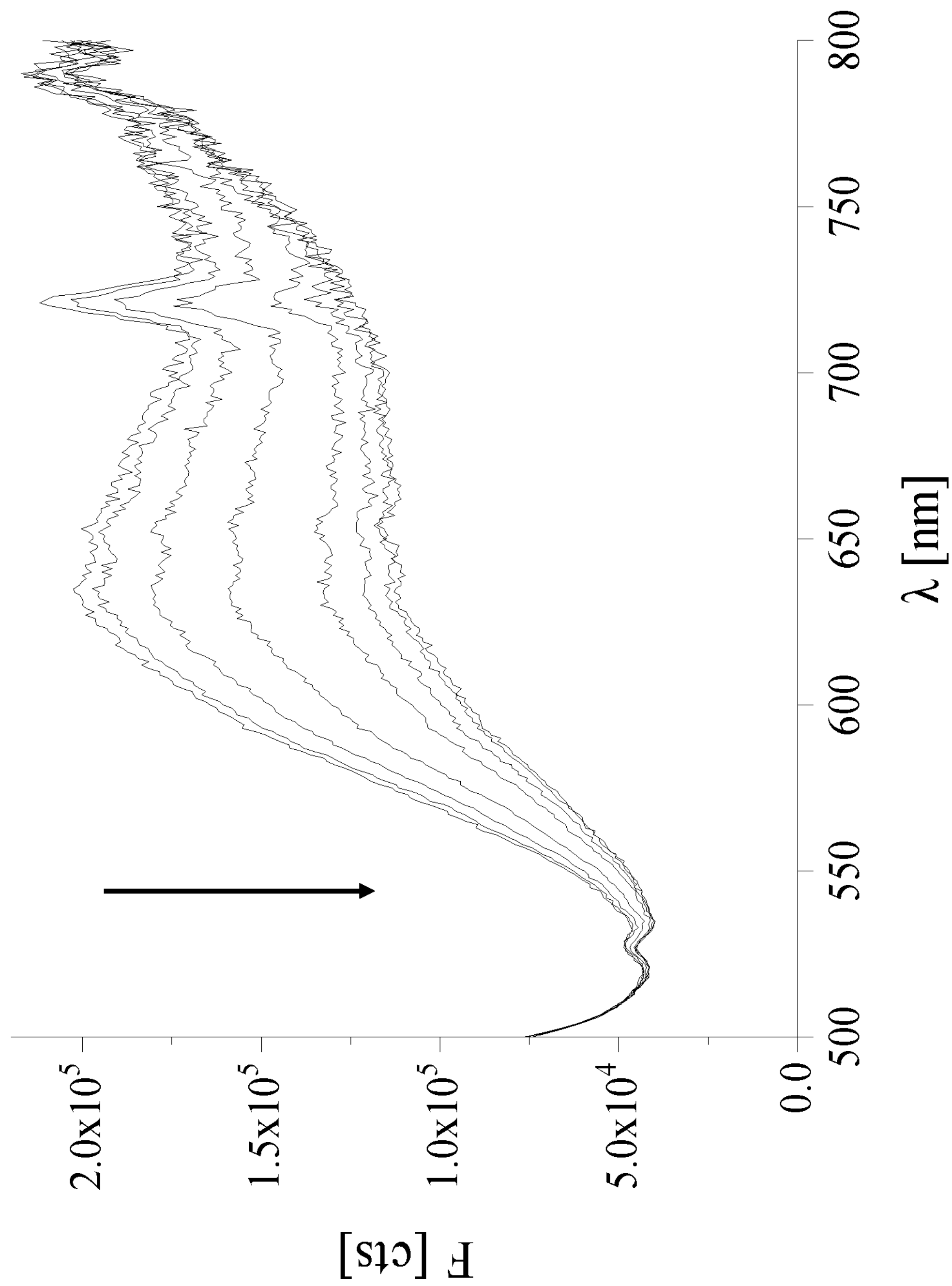
FIG. 27 shows a decrease in fluorescence emission of compound 19 within a MIP matrix (0.21 mg/mL) upon titration with increasing concentrations of ENOX-TBA in MeCN. Concentrations of ENOX-TBA [in $10^{-6}$ M]: 0, 5, 10, 15, 24, 48, 67, 91 to 111.
Figure 34:
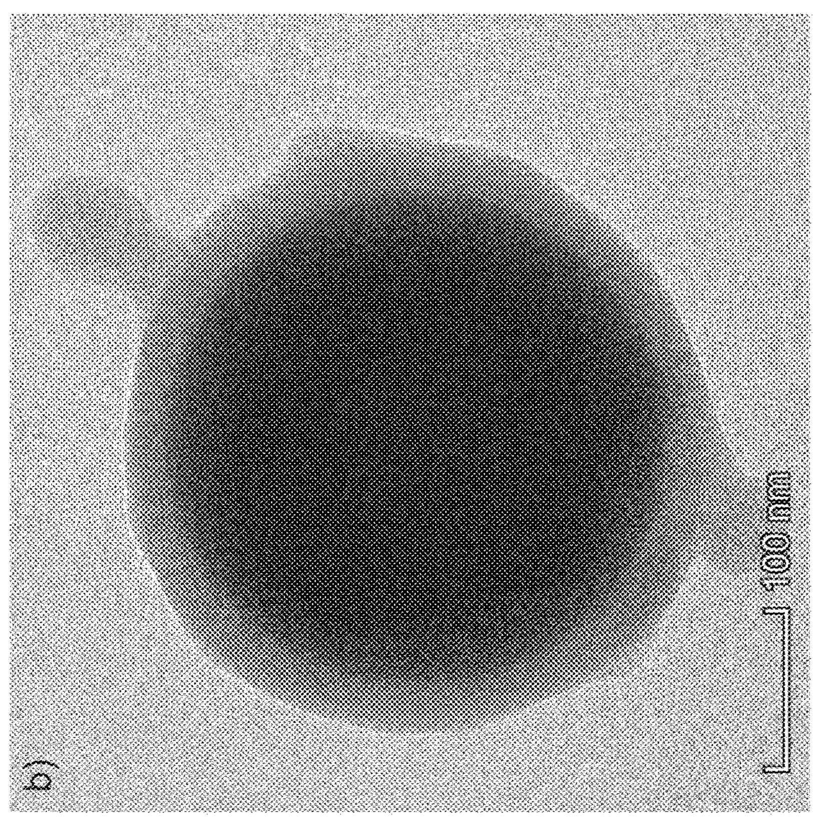
FIG. 34 shows representative TEM images of MIP-ENOX @$SiO_2$ according to example 19 described below. The shell thickness was determined to 34±4 nm.
Figure 34:
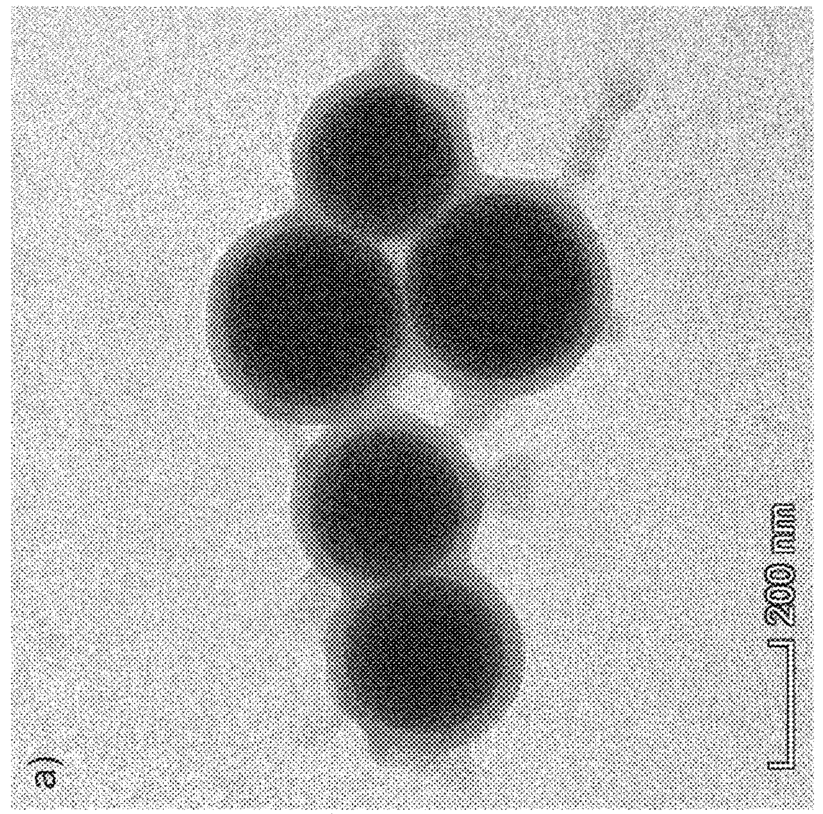

To prepare a fluorescent molecularly imprinted polymer layer on the $SiO_2$ particle cores compound 19 (0.66 mg, 0.0015 mmol), ENOX-TBA (0.84 mg, 0.0015 mmol), HEMA (6.95 μL, 0.056 mmol) and EGDMA (15.73 μL, 0.083 mmol) were dissolved in 1.75 mL MeCN using an ultrasonic bath for 10 min. Afterwards, 10 mg of RAFT agent-functionalized $SiO_2$ particles were added and sonicated for another 10 min. Later, 2,2'-azobis(2,4-dimethyl) valeronitrile (ABDV, 0.6 mg, 0.0024 mmol) was added under cooling with ice and the solution was flushed with Argon for 5 min. The mixture was polymerized for 18 h at 50° C. and then for 2 h at 70° C. After adding 30 mL hexane, the synthesized particles were washed once with 15 mL $CHCl_3$ and twice with 15 mL MeCN with centrifugation at 9000 rpm for 5 min in between. For the removal of the template, a MeOH/acetic acid 99/1 (v/v) mixture was used. Subsequently, the particles were washed again with MeCN three times (centrifugation at 9000 rpm for 5 min) and left in the vacuum oven overnight for drying. The MIPs were both characterized by TEM (FIG. 34) and fluorescence titrations (FIG. 27 and example 19).

Example 19

Titration of MIP-ENOX@$SiO_2$ Core-Shell Particles with ENOX-TBA in MeCN

A 0.21 mg $mL^{-1}$ suspension of MIP-ENOX@$SiO_2$ core-shell particles embedding compound 19 was prepared in MeCN and was titrated with ENOX-TBA in MeCN. Increasing volumes of the template solution were added to a 2 mL suspension of the MIP-ENOX@$SiO_2$ core-shell particles to obtain the following concentrations of ENOX-TBA [in $10^{-6}$ M]: 0, 5, 10, 15, 24, 48, 67, 91 to 111. The resultant fluorescence spectra were recorded and a quenching in fluorescence was observed (FIG. 27).

In addition to the above, aspects of the present application can be worded as follows:

1. Synthesis and application of every kind of benzodiazole dyes functionalized with electron-donating groups (urea, thiourea, guanidine and guanidinium) as the sensor recognition unit in direct electronic conjugation with another electron-donating group forming a “push-pull-push” π-electron system.
2. Use of the electron-donating group, which is part of the conjugated system of the dye, as binding unit for an analyte with the aim of producing strong spectroscopic changes. Introduction in their molecular structure, functional groups such as urea, thiourea or guanidinium as electron-donating groups and binding units for oxo compounds.
3. Method for the fluorometric and colorimetric sensing of organic molecules containing oxygen atoms in their structure.
4. Incorporation of similar classes of these dyes into solid matrixes comprising polymer matrixes, nano-or microparticles, i.e. adapting the suggested D-A-D dyes for covalent links with a polymer network during its formation, whether in the shape of a layer or as a particle or bead.
5. Introduction of polymerizable units into the D-A-D molecule for the covalent incorporation of the D-A-D dyes into polymeric materials and covalent binding onto substrate surfaces.
6. Providing water solubility of the suggested D-A-D dyes by the use of charged/polar functional groups.
7. In the case of the guanidinium based D-A-D dyes, different counterions of the guanidinium moiety will lead to the possibility of tuning the magnitude of the emission spectral shifts upon target analyte binding.
8. Providing large Stokes shifts of the suggested D-A-D dyes for better detection and compatibility with biological environments.
9. Control of the spectroscopic properties and the binding properties by specifically adapting the electron-donating and electron-withdrawing groups of the suggested D-A-D dyes.

Thus, a molecular probe, an analyte sensitive layer, a molecularly imprinted polymer, a sensor arrangement—each comprising said dye encompassing the D-A-D motif are suggested as well as its (their) use for different analytical purposes and imaging are suggested.

Abbreviations abs=absorption
ABDV=2,2'-azobis(2,4-dimethylvaleronitrile)
AIBN=2,2'-azobisisobutyronitrile
APTES=(3-aminopropyl)triethoxysilane
ATRP=atom transfer radical polymerization
BD=benzodiazole
CMPP=2-(4-chloro-2-methylphenoxy)propanoic acid
CPDB=4-cyano-4-(phenylcarbonothioylthio)pentanoic acid
CRP=controlled radical polymerization
CT=charge transfer
FASAAs=N-alkyl perfluoroalkane sulphonamido acetic acids
2,4-D=2,4-dichlorophenoxyacetic acid
2,4-DP=Dichlorprop, (R)-2-(2,4-dichlorophenoxy)propanoic acid
DA, D-A=donor-acceptor
DAD, D-A-D=donor-acceptor-donor
DMF=N,N-dimethylformamide
ECHA=European Chemical Agency
EDC=N-(3-dimethylaminopropyl)-N'-ethylcarbodiimide hydrochloride
EGDMA=ethylene glycol dimethacrylate
em=emission
ENOX-TBA=enoxacin, tetrabutylammonium salt
EtOAc=ethyl acetate
FAB=fast atom bombardment
FRCAs=fluorotelomer carboxylic acids
FSM-16=mesoporous material
FTSAs=fluorotelomer sulphonic acids
FTUCAs=fluorotelomer unsaturated carboxylic acids
HEMA=2-hydroxyethylmethacrylate
HMS=mesoporous material
HPLC=high performance (high pressure) fluid chromatography
HRMS=high resolution MS
ICT=intramolecular charge transfer, internal charge transfer
KSW-2=mesoporous material
MCM-41=mesoporous material
MCPA=2-methyl-4-chlorophenoxyacetic acid
MCPB=4-(4-chloro-o-tolyloxy)butyric acid,
4-(4-chloro-2-methylphenoxy)butanoic acid
MeCN=Methyl cyanide, acetonitrile
MeOH=methanol
MIP=molecularly imprinted polymer
MIP@PS=MIP shell or layer on polystyrene core
MIP@SiO2=MIP shell on silica core, core-shell particle
MS=mass spectrometry
MSU-n=mesoporous material
MSU-V=mesoporous material
NBD=nitro-benzoxadiazole
MR=near infrared (spectral range)
NMP=nitroxide mediated polymerization
NSAIDs=nonsteroidal anti-inflammatory drugs
PEG=polyethylene glycol
PFAAs=perfluoroalkyl acids
PFOA=perfluorooctanoic acid
PFPAs=perfluoroalkyl phosphonic acids
PFPiAs=perfluoroalkyl phosphinic acids
PFESAs=perfluoroether sulphonic acids
PFECAs=perfluoroether carboxylic acids
PFSA=perfluorosulfonic acids
PFCAs=perfluoroalkyl carboxylic acid(s)
PFOS=perfluorooctanne sulfate
PS=polystyrene
RAFT=reversible addition-fragmentation chain transfer
RDRP=reversible-deactivation radical polymerizations
REACH=Registration, Evaluation, Authorisation and Restriction of Chemicals
SBA-n=mesoporous material
SFRP=stable free radical polymerization
SVHC=substance of very high concern
TBA-OAc=tetrabutylammonium acetate
TBA-OH=tetrabutylammonium hydroxide
TEM=transmission electron microscopy
TEOS=tetraethylorthosilicate
TGA=thermogravimetric analysis
TOF=time of flight
UVM-7=mesoporous material
UVM-8=mesoporous material The present invention has been explained with reference to various illustrative embodiments and examples. These embodiments and examples are not intended to restrict the scope of the invention, which is defined by the claims and their equivalents. As is apparent to one skilled in the art, the embodiments described herein can be implemented in various ways without departing from the scope of what is invented. Various features, aspects, and functions described in each of the embodiments can be combined with features, aspects, and functions as described in other embodiments.

The invention claimed is:

1. A dye comprising an electron donor-electron acceptor-electron donor motif, wherein the electron donor-electron acceptor-electron donor motif comprises a structure according to formula 1:

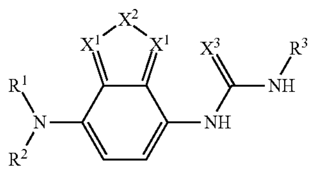

(1)

wherein, independently from each other, $R^1$=H, $C_nF_{2n+1}$, $C_5NH_4$, $C_4N_2H_3$,
$(CH_2)_nQ$, $(C_6H_{5-m})Q_m$ or $(OCH_2CH_2)_nQ$, wherein m=1,2, 3 or 4, and Q is selected from:
H,
$C(H)=CH_2$,
$OC(O)C(H)=CH_2$, $OC(O)C(CH_3)=CH_2$,
$N(H)CC(H)=CH_2$, $N(H)CC(CH_3)=CH_2$,
$Si(OH)_3$, $Si(OCH_3)_3$, $Si(OC_2H_5)_3$,
OH, SH, $NH_2$, $NO_2$, CN, $CF_3$, C≡CH, $N=N^+=N^-$, F, Cl, Br, I, $C_2H_3O$, $C_6H_5$,
C(O)F, C(O)Cl, C(O)Br, C(O)I, $CF_3SO_3$,
$B(OZ)_2$, OZ, C(O)Z, C(O)OZ, C(O)NHZ, $C(O)NZ_2$, and SSZ, wherein
Z=H, $C_nH_{2n+1}$, $C_nF_{2n+1}$, $C_nH_{2n}C(H)=CH_2$, $C_nH_{2n}C≡CH$,
$C_6H_4C(H)=CH_2$, $C_6H_5$, $CH_2C_6H_5$, $C_5NH_4$ or $C_4N_2H_3$,
wherein n=1 to 20;

$R^2$=H, $C_nF_{2n+1}$, $C_5NH_4$, $C_4N_2H_3$,
$(CH_2)_nQ$ or $(C_6H_{5-m})Q_m$, wherein m=1, 2, 3 or 4, and Q is selected from:
H,
$C(H)=CH_2$,
$OC(O)C(H)=CH_2$, $OC(O)C(CH_3)=CH_2$,
$N(H)CC(H)=CH_2$, $N(H)CC(CH_3)=CH_2$,
$Si(OH)_3$, $Si(OCH_3)_3$, $Si(OC_2H_5)_3$,
OH, SH, $NH_2$, $NO_2$, CN, $CF_3$, C≡CH, $N=N^+=N^-$, F, Cl, Br, I, $C_2H_{30}$, $C_6H_5$,
C(O)F, C(O)Cl, C(O)Br, C(O)I, $CF_3SO_3$,
$B(OZ)_2$, OZ, C(O)Z, C(O)OZ, C(O)NHZ, $C(O)NZ_2$, and SSZ, wherein
Z=H, $C_nH_{2n+1}$, $C_nF_{2n+1}$, $C_nH_{2n}C(H)=CH_2$, $C_nH_{2n}C≡CH$,
$C_6H_4C(H)=CH_2$, $C_6H_5$, $CH_2C_6H_5$, $C_5NH_4$ or $C_4N_2H_3$,
wherein n=1 to 20;

$R^3$=H, $C_nF_{2n+1}$, $C_5NH_4$, $C_4N_2H_3$, $C(O)C_6H_5$, $C(S)C_6H_5$, $(CH_2)_nQ$ or $(C_6H_{5-m})Q_m$, wherein m=1, 2, 3 or 4, and Q is selected from:
H,
$C(H)=CH_2$,
$OC(O)C(H)=CH_2$, $OC(O)C(CH_3)=CH_2$,
$N(H)CC(H)=CH_2$, $N(H)CC(CH_3)=CH_2$,
$Si(OH)_3$, $Si(OCH_3)_3$, $Si(OC_2H_5)_3$,
OH, SH, $NH_2$, $NO_2$, CN, $CF_3$, C≡CH, $N=N^+=N^-$, F, Cl, Br, I, $C_2H_3O$, $C_6H_5$,
C(O)F, C(O)Cl, C(O)Br, C(O)I, $CF_3SO_3$,
$B(OZ)_2$, OZ, C(O)Z, C(O)OZ, C(O)NHZ, $C(O)NZ_2$, and SSZ, wherein
Z=H, $C_nH_{2n+1}$, $C_nF_{2n+1}$, $C_nH_{2n}C(H)=CH_2$, $C_nH_{2n}C≡CH$,
$C_6H_4C(H)=CH_2$, $C_6H_5$, $CH_2C_6H_5$, $C_5NH_4$ or $C_4N_2H_3$,
wherein n=1 to 20;

$X^1$=N, C(CN), C(COOEt) or $C(NO_2)$;

$X^2$=$C(CH_3)_2$, Si $(CH_3)_2$, O, S, Se or Te; and $X^3$=O, S, NH or $NH_2^+X^-$, wherein $X^-$ is selected from: $F^-$, $Cl^-$, $Br^-$, $I^-$, $NO_3^-$, $PF_6^-$, $ClO_4$, $BF_4^-$, $B_4^-$, $B[3,5\text{-}(CF_3)_2C_6H_3]_4^-$, $B(C_6H_5)_4^-$, $Al[OC(CF_3)_3]_4^-$, $H_2BO_3^-$, $BrO_3^-$, $HCO_3^-$, $H_2NCO_2^-$, $C_6H_5CO_2^-$, $C_6H_5CH_2^-$, and $RCOO^-$, wherein R=saturated alkyl or unsaturated alkyl or aryl.

2. The dye according to claim 1, wherein the donor-acceptor-donor motif is selected according to:
formula (1), comprising a polymerizable monomer when $R^1$ is $(CH_2)_nQ$, $(C_6H_{5-m})Q_m$ or $(OCH_2CH_2)_nQ$ with m=1, 2, 3 or 4, and wherein Q is selected from: $C(H)=CH_2$, $OC(O)C(H)=CH_2$, $OC(O)C(CH_3)=CH_2$, $N(H)CC(H)=CH_2$, $N(H)CC(CH_3)=CH_2$ and $C_2H_3O$, wherein n=1 to 20;

or, formula (1), comprising a polymerizable monomer when $R^3$ is $(CH_2)_nQ$ or $(C_6H_{5-m})Q_m$ with m=1, 2, 3 or 4, and wherein Q is selected from: $C(H)=CH_2$, $OC(O)C(H)=CH_2$, $OC(O)C(CH_3)=CH_2$, $N(H)CC(H)=CH_2$, $N(H)CC(CH_3)=CH_2$ and $C_2H_3O$, wherein n=1 to 20.

3. The dye according to claim 1, wherein the donor-acceptor-donor motif is selected according to:
formula (1), comprising a polymerizable crosslinker when both substituents $R^1$ and $R^2$ or $R^1$ and $R^3$ are $(CH_2)_nQ$ or $(C_6H_{5-m})Q_m$ with m=1, 2, 3 or 4, and wherein Q is selected from: $C(H)=CH_2$, $OC(O)C(H)=CH_2$, $OC(O)C(CH_3)=CH_2$, $N(H)CC(H)=CH_2$, $N(H)CC(CH_3)=CH_2$ and $C_2H_3O$, wherein n=1 to 20.

4. The dye according to claim 1, wherein the donor-acceptor-donor motif is selected according to:
formula (1), comprising a silane derivative when one of the substituents $R^1$ or $R^3$ or $R^1$ and $R^3$ is or are $(CH_2)_nQ$ or $(C_6H_{5-m})Q_m$, wherein m=1, 2, 3 or 4, and Q is selected from: $Si(OH)_3$, $Si(OCH_3)_3$ or $Si(OC_2H_5)_3$ wherein n=1 to 20.

5. The dye according to claim 1, wherein
$R^1$=$CH_3$, $CH_2CH_2OH$, $CH_2CH_2OC(O)C(H)=CH_2$ or $CH_2CH_2OC(O)C(CH_3)=CH_2$;
$R^2$=H, $CH_3$ or $C_2H_5$;
$R^3$=$C_6H_4NO_2$, $C(O)C_6H_5$, $CH_2CH_2OC(O)C(H)=CH_2$ or $CH_2CH_2OC(O)C(CH_3)=CH_2$;
$X^2$=O;
$X^3$=S, NH, $NH_2^+X^-$, wherein $X^-$ is selected from: $Cl^-$ and $PF_6^-$, resulting, accordingly, in $[\sim NH_2^+/Cl^-]$ or $[\sim NH_2^+/PF_6^-]$, respectively.

6. A molecular probe for detection of an analyte comprising an organic oxo compound, an organic oxo acid and/or an anion thereof,
wherein the molecular probe comprises a dye according to claim 1,
wherein the molecular probe is able to indicate the presence of the analyte by changing a fluorescence property selected from: a fluorescence intensity, a Stokes shift of a fluorescence, a fluorescence lifetime, and/or a fluorescence yield.

7. The molecular probe according to claim 6, wherein the analyte is selected from:

a perfluoroalkyl acid (PFAA) or perfluoroalkyl carboxylic acid (PFCA), a perfluoroalkyl sulfonic acid (PFSA), a perfluoroalkyl phosphonic acid (PFPA), a perfluoroalkyl phosphinic acid (PFPiA), a N-Alkyl perfluoroalkane sulphonamido acetic acid (FASAA), a perfluoroether sulphonic acid (PFESA), a perfluoroether carboxylic acid (PFECA), a fluorotelomer sulphonic acid (FTSA), a fluorotelomer carboxylic acid (FRCA), a fluorotelomer unsaturated carboxylic acid (FTUCA); a herbicide or its degradation product selected from: a glyphosate analyte selected from Glyphosate (GPS); Methylphosphonic acid (MPA); Aminomethylphosphonic acid (AMPA), 3-Methylphosphinicopropionic acid (MPPA), and Butylphosphonic acid (BPA);

an auxin mimic selected from: dicamba, MCPA, 2,4-D, aminopyralid, tridopyr, 2,4-DP, MCPB, 2,4-DB, quinclorac, naptalam, MCPP/CMPP, clopyralid, picloram and diflufenzopyr and their alkali, alkaline earth, transition, post-transition and metalloid metal salts; enoxacine, ampicillin, amoxicillin, sialic acid, ciprofloxacin, cetirizine, atorvastatin, flurbiprofen, ragaglitazar, γ-aminobutyric acid, (S)glutamic acid, ibotenic acid, thioibotenic acid, baclofen, phaclofen, saclofen, oseltamivir active principle, lovastatin active principle, losartan active principle, clopidogrel active principle and their alkali, alkaline earth, transition, post-transition and metalloid metal salts.

8. An analyte-sensitive layer for detection of an organic oxo compound, an organic oxo acid and/or an anion thereof, wherein the analyte-sensitive layer comprises a dye according to claim 1, wherein the dye is adsorbed at, covalently bound to and/or sterically entrapped within a matrix, wherein the matrix comprises a glass, a semiconductor, a ceramic, or a polymer.

9. The analyte-sensitive layer according to claim 8, wherein the matrix is a polymer and the polymer is a molecularly imprinted polymer.

10. The analyte-sensitive layer according to claim 9, wherein the molecularly imprinted polymer is disposed on a solid substrate selected from: a polymer, a silica, or a polymer core/silica shell particle.

11. A sensor arrangement for detection of an analyte in a liquid sample, the liquid sample comprising an organic oxo compound, an organic oxo acid and/or an anion thereof, wherein the sensor arrangement comprises an analyte-sensitive layer according to claim 8.

12. The sensor arrangement according to claim 11, further comprising:

a light source, adapted for emitting light in a wavelength range from 400-500 nm;

a measuring device for detecting and/or quantifying a fluorescence light in a wavelength range from 500-700 nm and outputting an output signal; and a control and processing unit (CPU) adapted to calculate an amount of the analyte corresponding to the output signal and/or to quantitatively evaluate a concentration of the analyte in the sample.

13. A molecularly imprinted polymer for detection of an analyte comprising an organic oxo compound, an organic oxo acid and/or an anion thereof, wherein the molecularly imprinted polymer comprises a dye according to claim 1.

14. A method of a quantitative or qualitative detection of an analyte selected from an organic oxo compound, an organic oxo acid or an anion thereof in a liquid sample or in an organic extract of the liquid sample, wherein the sample presumably contains the analyte, wherein the detection is based on an optical measurement of a fluorescence property of a dye according to claim 1, the method comprising the steps:

providing the sample, contacting the dye with the sample, exposing the sample to an excitation light, measuring a fluorescence property of the sample selected from the list consisting of: a fluorescence intensity at an emission wavelength peak, a shift or change of a fluorescence related peak, and detecting the analyte quantitatively or qualitatively.

* * * * *